(12) United States Patent
Ogura

(10) Patent No.: US 7,516,450 B2
(45) Date of Patent: Apr. 7, 2009

(54) REMOTE MANAGEMENT SYSTEM, INTERMEDIARY APPARATUS THEREFOR, AND METHOD OF UPDATING SOFTWARE IN THE INTERMEDIARY APPARATUS

(75) Inventor: Masaaki Ogura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 922 days.

(21) Appl. No.: 10/668,007

(22) Filed: Sep. 23, 2003

(65) Prior Publication Data

US 2004/0148379 A1    Jul. 29, 2004

(30) Foreign Application Priority Data

Sep. 24, 2002  (JP)  ............... 2002-276482
Sep. 5, 2003   (JP)  ............... 2003-313730

(51) Int. Cl.
G06F 9/44 (2006.01)

(52) U.S. Cl. ............ 717/168; 717/169; 717/170; 717/171; 717/172; 717/173; 717/174; 717/175; 717/176; 717/177; 717/178

(58) Field of Classification Search ......... 717/168–178; 709/203

See application file for complete search history.

(56) References Cited

U.S. PATENT DOCUMENTS

| | | | |
|---|---|---|---|
| 3,870,138 A | 3/1975 | Sato et al. | |
| 4,203,663 A | 5/1980 | Ogura et al. | |
| 4,341,462 A | 7/1982 | Ogura | |
| 4,391,507 A | 7/1983 | Mori et al. | |
| 4,640,608 A | 2/1987 | Higaya et al. | |
| 4,860,115 A | 8/1989 | Ogura | |
| 4,876,609 A | 10/1989 | Ogura | |
| 4,965,871 A | 10/1990 | Ogura et al. | |
| 5,019,916 A | 5/1991 | Ogura | |
| 5,512,979 A | 4/1996 | Ogura | |
| 5,727,248 A | 3/1998 | Ogura | |
| 5,835,911 A * | 11/1998 | Nakagawa et al. | 707/203 |
| 5,867,714 A * | 2/1999 | Todd et al. | 717/172 |
| 5,893,005 A | 4/1999 | Ogura | |
| 6,009,274 A * | 12/1999 | Fletcher et al. | 717/173 |
| 6,038,399 A * | 3/2000 | Fisher et al. | 717/178 |
| 6,202,070 B1 * | 3/2001 | Nguyen et al. | 707/104.1 |

(Continued)

OTHER PUBLICATIONS

U.S. Appl. No. 12/104,962, filed Apr. 17, 2008, Watanabe.

Primary Examiner—Wei Y Zhen
Assistant Examiner—Junchun Wu
(74) Attorney, Agent, or Firm—Oblon, Spivak, McClelland, Maier & Neustadt, P.C.

(57) ABSTRACT

A remote management system for performing remote management of electronic apparatuses via a communication line and an intermediary apparatus by a managing apparatus is provided. The managing apparatus includes a storage part storing first software for updating second software of each of the electronic apparatuses and a software transmitting part that transmits the first software to the intermediary apparatus. The intermediary apparatus includes a storage part, a software writing part that writes the first software to the second storage part, and a software transmitting part that transmits the first software to one of the electronic apparatuses which one requires the second software thereof to be updated. The electronic apparatuses each includes a non-volatile storage part storing the second software and a software updating part that updates the second software based on the first software received from the intermediary apparatus.

18 Claims, 40 Drawing Sheets

U.S. PATENT DOCUMENTS

| | | | |
|---|---|---|---|
| 6,263,497 B1 * | 7/2001 | Maeda et al. | 717/170 |
| 6,363,282 B1 * | 3/2002 | Nichols et al. | 607/30 |
| 6,557,054 B2 * | 4/2003 | Reisman | 710/33 |
| 6,578,142 B1 * | 6/2003 | Anderson et al. | 713/2 |
| 6,658,464 B2 * | 12/2003 | Reisman | 709/219 |
| 6,678,888 B1 * | 1/2004 | Sakanishi | 717/172 |
| 6,687,901 B1 * | 2/2004 | Imamatsu | 717/173 |
| 6,735,768 B1 * | 5/2004 | Tanaka | 717/174 |
| 6,769,009 B1 * | 7/2004 | Reisman | 709/201 |
| 6,820,259 B1 * | 11/2004 | Kawamata et al. | 717/173 |
| 6,834,301 B1 * | 12/2004 | Hanchett | 709/223 |
| 6,904,592 B1 * | 6/2005 | Johnson | 717/168 |
| 6,990,660 B2 * | 1/2006 | Moshir et al. | 717/171 |
| 7,000,229 B2 * | 2/2006 | Gere | 717/169 |
| 7,096,311 B2 * | 8/2006 | Chiang | 711/100 |
| 7,103,650 B1 * | 9/2006 | Vetrivelkumaran et al. | 709/221 |
| 7,111,292 B2 * | 9/2006 | Bonnett et al. | 717/171 |
| 7,150,013 B2 * | 12/2006 | Kim | 717/168 |
| 7,158,248 B2 * | 1/2007 | Smith et al. | 358/1.15 |
| 7,162,717 B1 * | 1/2007 | Harris | 717/168 |
| 2003/0193906 A1 * | 10/2003 | Andrews et al. | 370/329 |
| 2004/0148379 A1 | 7/2004 | Ogura | |

* cited by examiner

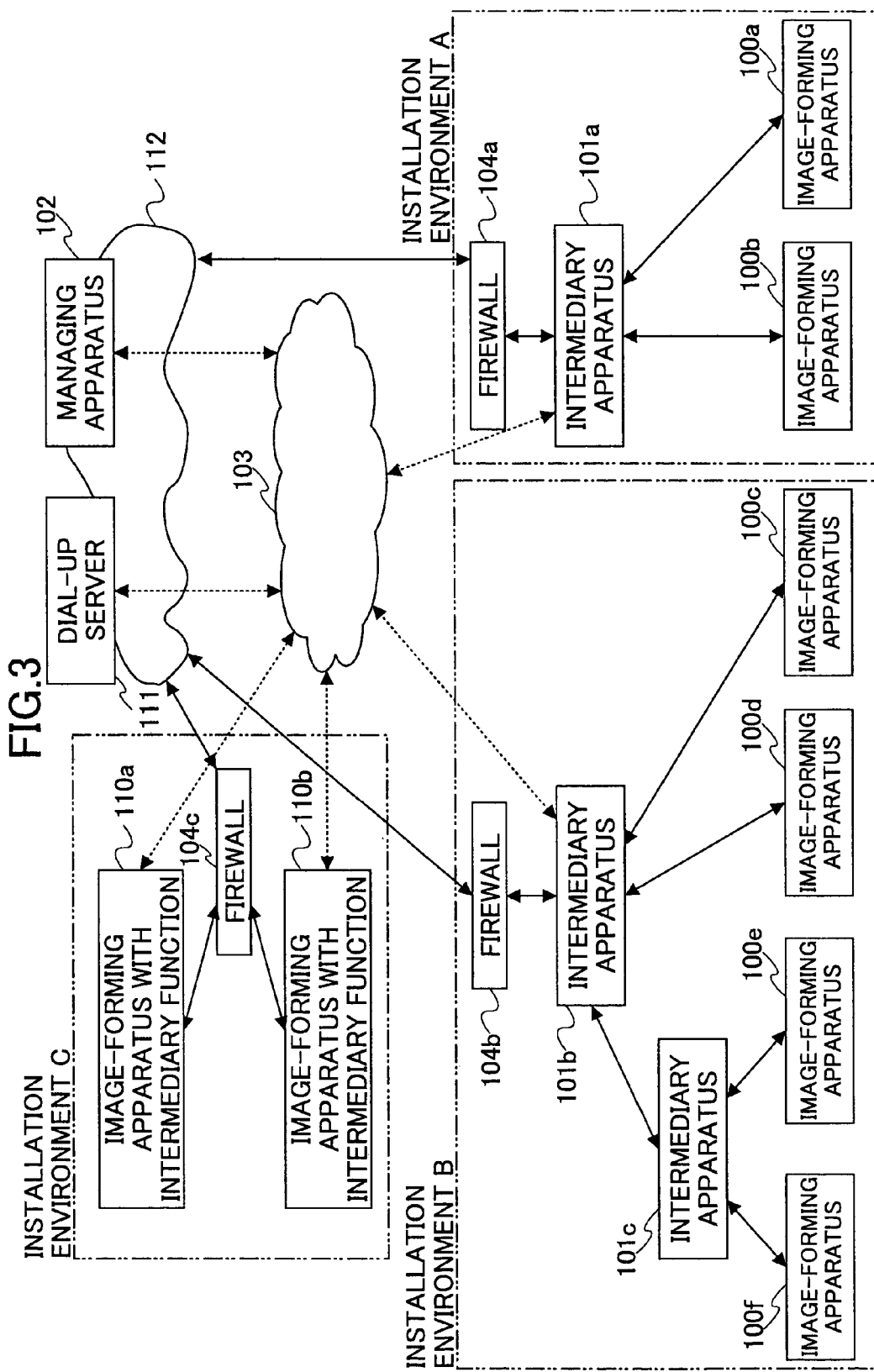

FIG.12

| CODE | CONTENTS (DETECTED SC) |
|---|---|
| TYPE A | •DISABLE HARDWARE RESOURCES<br>•CANNOT BE CANCELED BY USER OR "SC RESET" FROM MANAGING APPARATUS |
| TYPE B | •DISABLE ONLY PARTICULAR FUNCTION |
| TYPE C | •DISPLAY NO "SC" ON OPERATION PART<br>•LOG SC OCCURRENCE INTERNALLY |
| TYPE D | •DISABLE HARDWARE RESOURCES<br>•CAN BE CANCELED BY SWITCHING OFF AND ON MAIN POWER SUPPLY OR SOFT POWER SUPPLY KEY |

FIRMWARE UPDATE/APPARATUS SELECTION

1. SPECIFY BY FILE ; ABC. Ver

2. MANUAL INPUT ; A123-123456

SET | END

FIG.16

FIRMWARE UPDATE/PERFORMANCE DATE SETTING

1. TRANSMISSION DATE AND TIME ; 2002/8/25 12:20

2. UPDATE DATE AND TIME ; 2002/8/25 19:20

SET | END

FIG.20

FIRMWARE UPDATE/FIRMWARE CHECK/OBJECT APPARATUS NUMBER          TOTAL NUMBER : 1240

| NO. | TYPE/ SERIAL NO. | TRANSMISSION DATE AND TIME | UPDATE DATE AND TIME | MAIN FIRMWARE | CONTROLLER FIRMWARE | DF FIRMWARE |
|---|---|---|---|---|---|---|
| 1 | A123-456789 | 2002/08/31 10:20 | 2002/08/31 18:20 | VerA→C | VerC→D | VerC→D |
| 2 | ... | ... | ... | ... | ... | ... |
| 3 | ... | ... | ... | ... | ... | ... |
| ... | | | | | | |
| 1240 | ... | ... | ... | ... | ... | ... |

END

FIG.21

FIRMWARE UPDATE/FIRMWARE CHECK/UNREGISTERED APPARATUS NUMBER    TOTAL NUMBER : 10

| NO. | TYPE/ SERIAL NO. | TRANSMISSION DATE AND TIME | UPDATE DATE AND TIME | REASON |
|-----|------------------|----------------------------|----------------------|--------|
| 1   | A123-456789      | 2002/08/31 10:20           | 2002/08/31 18:20     | UNREGISTERED |
| 2   | ...              | ...                        | ...                  | ...    |
| ... |                  |                            |                      |        |
| 10  |                  |                            |                      | DIAL-UP |

END

FIG.22

| NO. | TYPE/ SERIAL NO. | TRANSMISSION DATE AND TIME | UPDATE DATE AND TIME | MAIN FIRMWARE | CONTROLLER FIRMWARE | DF FIRMWARE |
|---|---|---|---|---|---|---|
| 1 | A123-456789 | 2002/08/31 10:20 | 2002/08/31 18:20 | VerA→C | VerC→D | VerC→D |
| 2 | : | : | : | : | : | : |
| 3 | : | : | : | : | : | : |
| 4 | : | : | : | : | : | : |
| 5 | : | : | : | : | : | : |
| 6 | : | : | : | : | : | : |
| 7 | : | : | : | : | : | : |
| 8 | : | : | : | : | : | : |
| 9 | : | : | : | : | : | : |
| 10 | : | : | : | : | : | : |
| 11 | : | : | : | : | : | : |

FIG.24

| NO. | TYPE/ SERIAL NO. | UPDATE NECESSITY | UPDATE DATE AND TIME | COMMENT |
|---|---|---|---|---|
| 1 | A123-456789 | YES | 2002/08/31 10:20 | |
| 2 | A214-507890 | YES | 2002/09/05 18:20 | |
| 3 | ... | NO | | |
| 4 | ... | YES | ... | |
| 5 | ... | NO | | |
| 6 | ... | YES | ... | |
| 7 | ... | YES | ... | |

FIG.25

| NO. | TYPE/ SERIAL NO. | STATUS | TRANSMISSION RATE 1 | TRANSMISSION RATE 2 | TRANSMISSION DATE AND TIME | UPDATE DATE AND TIME | UPDATE PERFORMANCE DATE AND TIME | MAIN FIRMWARE | CONTROLLER FIRMWARE | DF FIRMWARE |
|---|---|---|---|---|---|---|---|---|---|---|
| 1 | A123-456789 | CONNECTING | 10MB | 20MB | ... | ... | ... | VerC | VerD | VerD |
| 2 | | DOWNLOADING | 5MB | 5MB | | | | | | |
| 3 | ... | WAITING FOR UPDATING | 0.5MB | 50MB | ... | ... | ... | ... | ... | ... |
| 4 | ... | UPDATING | ... | ... | ... | ... | ... | ... | ... | ... |
| 5 | ... | UPDATING SUCCEEDED | ... | ... | ... | ... | ... | ... | ... | ... |
| 6 | ... | ... | ... | ... | ... | ... | ... | ... | ... | ... |
| 7 | ... | ... | ... | ... | ... | ... | ... | ... | ... | ... |
| 8 | ... | ... | ... | ... | ... | ... | ... | ... | ... | ... |

FIG.31

| NO. | TYPE/ SERIAL NO. | UPDATE NECESSITY | UPDATE DATE AND TIME | COMMENT |
|---|---|---|---|---|
| 1 | A123-456789 | YES | 2002/08/31 10:20 | |
| 2 | A214-507890 | YES | 2002/09/05 18:20 | BEFORE CANCELLATION |
| 3 | ... | NO | | |
| 4 | ... | YES | ... | |
| 5 | ... | NO | | |
| 6 | ... | YES | ... | |
| 7 | ... | YES | ... | |

FIG.32

| NO. | TYPE/ SERIAL NO. | UPDATE NECESSITY | UPDATE DATE AND TIME | COMMENT |
|---|---|---|---|---|
| 1 | A123-456789 | YES | 2002/08/31 10:20 | |
| 2 | A214-507890 | NO | | AFTER CANCELLATION |
| 3 | ... | NO | | |
| 4 | ... | YES | ... | |
| 5 | ... | NO | | |
| 6 | ... | YES | ... | |
| 7 | ... | YES | ... | |

FIG.34

| NO. | TYPE/ SERIAL NO. | UPDATE NECESSITY | UPDATE DATE AND TIME | COMMENT |
|---|---|---|---|---|
| 1 | A123-456789 | YES | 2002/08/31 10:20 | |
| 2 | A214-507890 | YES | 2002/09/05 18:20 | BEFORE COPYING |
| 3 | ... | NO | | |
| 4 | ... | YES | ... | |
| 5 | ... | NO | | |
| 6 | ... | YES | ... | |
| 7 | ... | YES | ... | |

FIG.35

| NO. | TYPE/ SERIAL NO. | UPDATE NECESSITY | UPDATE DATE AND TIME | COMMENT |
|---|---|---|---|---|
| 1 | A123-456789 | YES | 2002/08/31 10:20 | |
| 2 | A214-507890 | YES | 2002/09/05 18:40 | AFTER COPYING |
| 3 | ... | NO | | |
| 4 | ... | YES | ... | |
| 5 | ... | NO | | |
| 6 | ... | YES | ... | |
| 7 | ... | YES | ... | |

FIG.36

| ITEM | VALUE | UPDATE DATE AND TIME |
|---|---|---|
| DEFERMENT MANAGEMENT PARAMETER | 20 MIN. | 2002/08/10 10:20 |

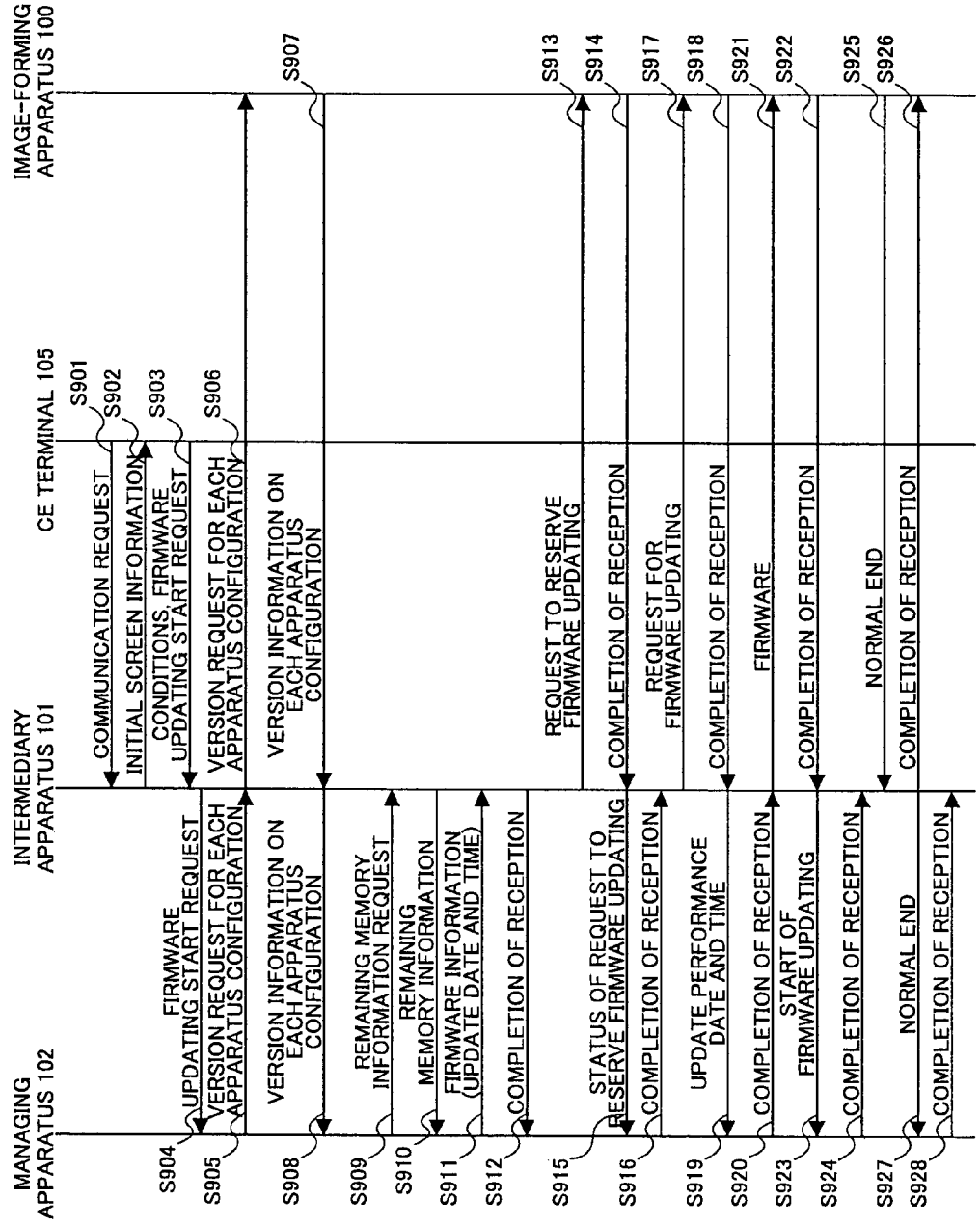

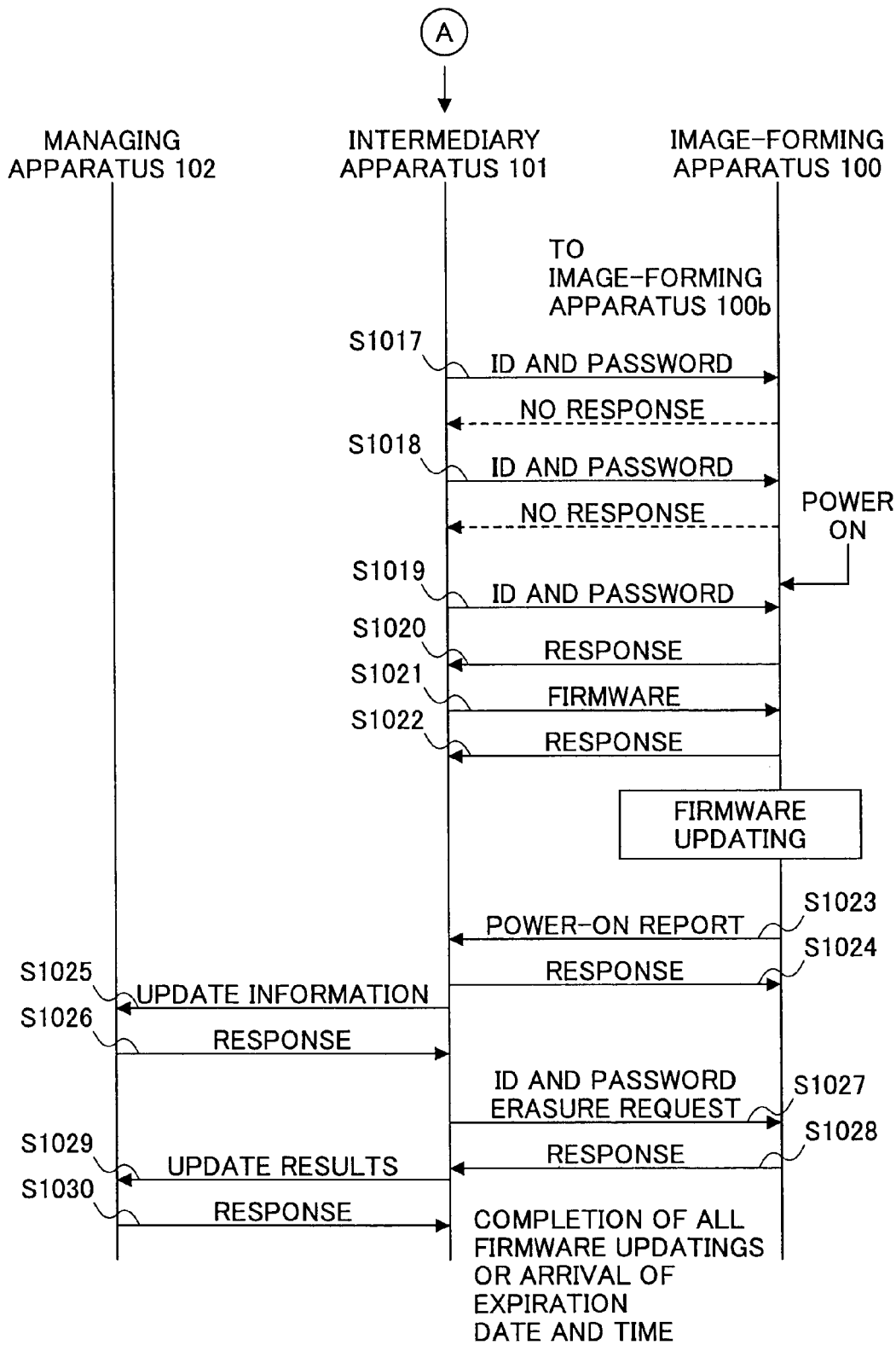

FIG.46

| NO. | TYPE/ SERIAL NO. | UPDATE START DATE AND TIME | UPDATE END DATE AND TIME | UPDATE RESULT |
|---|---|---|---|---|
| 1 | A013-123456 | 2003/5/30 10:30 | 2003/6/10 16:30 | UPDATING COMPLETED |
| 2 | A013-654321 | 2003/5/30 10:30 | 2003/6/10 16:30 | WAITING FOR RE-UPDATING |
| 3 | A013-123321 | 2003/5/30 10:30 | 2003/6/10 16:30 | ERROR |

FIG.47A

| TYPE AND SERIAL NO.1, TYPE AND SERIAL NO.2, TYPE AND SERIAL NO.3 | UPDATE START DATE AND TIME | UPDATE END DATE AND TIME |

FIG.47B

| INTERMEDIARY APPARATUS INFORMATION | TYPE AND SERIAL NO.1, TYPE AND SERIAL NO.2, TYPE AND SERIAL NO.3 | UPDATE START DATE AND TIME | UPDATE END DATE AND TIME |

REMOTE MANAGEMENT SYSTEM, INTERMEDIARY APPARATUS THEREFOR, AND METHOD OF UPDATING SOFTWARE IN THE INTERMEDIARY APPARATUS

BACKGROUND OF THE INVENTION

1. Field of the Invention

The present invention relates to a remote management system composed of an electronic apparatus and a managing apparatus that performs remote management of the electronic apparatus via a communication line (network), an intermediary apparatus that controls the communication between the electronic apparatus and the managing apparatus, a method of updating software in the intermediary apparatus, and a program for causing a computer controlling the intermediary apparatus to realize necessary functions according to the present invention.

2. Description of the Related Art

There have been proposed conventional remote management systems in which the managing apparatus (external apparatus) of a service (management) center performs remote management of apparatuses to be managed (managed apparatuses) via a public line or a communication line (network) such as the Internet and an intermediary apparatus. The managed apparatuses are electronic apparatuses including image processing apparatuses such as a printer, a facsimile (FAX) machine, a digital copier, a scanner, and a digital multi-function apparatus, network appliances, automatic vending machines, medical equipment, power supply units, air conditioning systems, and systems for measuring gas, water, and electricity.

Generally, an electronic apparatus as a managed apparatus in such remote management systems contain a central processing unit (CPU) controlling the operation of the entire electronic apparatus, and a memory storing software (a program) for causing the CPU to perform the control.

Normally, a ROM is employed as the memory for storing software including a program for controlling the basic operation of a communication device, and a variety of parameters and program codes.

The electronic apparatus is subjected to design change in order to improve its performance or eliminate its deficiencies. This may require the updating (upgrading the version) of the software (for instance, firmware controlling the operation of a hardware resource) in some cases.

Such updating of the software of an electronic apparatus (including updating such as the rewriting of parameters) has been performed by a service engineer (customer engineer) visiting a place where the electronic apparatus requiring software updating is located, such as the office of an apparatus user, and replacing the internal ROM of the electronic apparatus with a new one.

On the other hand, it has been recently the case that at the time of shipping an electronic apparatus from a factory, software for controlling the operation of the electronic apparatus is written to a non-volatile memory (non-volatile memory part) such as EPROM (erasable programmable read-only memory) or a flash ROM, and the non-volatile memory is mounted on the electronic apparatus. In this case, the software of the non-volatile memory can be updated by inputting software through the SCSI port, the RS-232-C port, or the IC card slot of the electronic apparatus using a predetermined device.

With respect to the conventional electronic apparatus, however, burning software showing a process to be executed directly in the ROM and updating software by inputting software through the SCSI port, the RS-232-C port, or the IC card slot of the electronic apparatus as required cause the following problems (a) and (b). This takes a lot of time and entails a lot of costs, thus preventing an improvement in serviceability.

(a) In the case of burning software in the ROM, it is necessary to change ROMs by hand in order to update the software. Therefore, a larger number of ROMs to be changed requires more expense, people, and time.

(b) The updating of software can be performed only by changing ROMs or inputting software through the SCSI port, the RS-232-C port, or the IC card slot of the electronic apparatus in a local place. Therefore, the software of a communication device located in a local place can be updated only by a service engineer directly visiting the local place or by sending software beforehand by another means such as mail so that the software is updated locally.

Accordingly, recently, there have been manufactured electronic apparatuses with an electrically rewritable non-volatile memory which electronic apparatuses have the function of updating software in the non-volatile memory based on software transmitted from the managing apparatus via the communication line and the intermediary apparatus (communication control apparatus). Japanese Laid-Open Patent Application No. 2002-288066 discloses such an electronic apparatus.

In the case of updating the software of the electronic apparatus, it is necessary to transmit large-capacity software for updating, or a new version of the software, from the managing apparatus. If the transmission is performed while the electronic apparatus is being intensively used by a user (apparatus user), the transmission may disrupt the operation currently performed by the user. For instance, if the electronic apparatus is a copier, the copying operation may be disrupted. Further, if a plurality of electronic apparatuses are connected to the intermediary apparatus, and each electronic apparatus requires software updating, the managing apparatus is required to repeatedly transmit the same software as many times as the number of electronic apparatuses. Accordingly, the transmission requires a large amount of time, thus increasing the processing load on the managing apparatus and communication costs.

SUMMARY OF THE INVENTION

Accordingly, it is a general object of the present invention to provide a remote management system, an intermediary apparatus, a software updating method, and a program for causing a computer to execute the software updating method in which the above-described disadvantages are eliminated.

A more specific object of the present invention is to provide a remote management system, an intermediary apparatus, a software updating method, and a program for causing a computer to execute the software updating method that can prevent a decrease in the rate of operation of an electronic apparatus due to the updating of its software.

Another more specific object of the present invention is to provide a remote management system, an intermediary apparatus, a software updating method, and a program for causing a computer to execute the software updating method that can reduce a processing load on and the communication costs of an external apparatus (a managing apparatus) resulting from the updating of the software of the electronic apparatus.

The above objects of the present invention are achieved by a remote management system for performing remote management of a plurality of electronic apparatuses via a communication line and an intermediary apparatus by a managing apparatus, wherein: the managing apparatus includes a first storage part storing first software with which second software of each of the electronic apparatuses is overwritten to be updated, and a software transmitting part that transmits the first software to the intermediary apparatus via the communication line; the intermediary apparatus includes a second storage part, a software writing part that writes the first software to the second storage part when acquiring the first software from the managing apparatus, and a software transmitting part that transmits the first software stored in the second storage part to one of the electronic apparatuses which one requires the second software thereof to be updated; and the electronic apparatuses each includes a non-volatile storage part storing the second software controlling an operation of the electronic apparatus and a software updating part that updates the second software stored in the non-volatile storage part based on the first software when receiving the first software from the intermediary apparatus.

The above objects of the present invention are also achieved by an intermediary apparatus connected to a managing apparatus via a communication line so as to control communication between the managing apparatus and one or more electronic apparatuses managed remotely by the managing apparatus, the intermediary apparatus including: a storage part; a software writing part that writes first software to the storage part when receiving the first software from the managing apparatus; and a software transmitting part that transmits the first software stored in the storage part to one of the electronic apparatuses each storing second software therein which one requires the second software to be updated.

The above objects of the present invention are also achieved by a software updating method in an intermediary apparatus connected to a managing apparatus via a communication line so as to control communication between the managing apparatus and one or more electronic apparatuses managed remotely by the managing apparatus, the software updating method including the steps of: (a) writing an update date and time to a storage part of the intermediary apparatus when the update date and time is received from the managing apparatus; (b) requesting the managing apparatus to transmit software to the intermediary apparatus when the update date and time in the storage part is reached; and (c) writing the software to the storage part when the software transmitted in response to the step (b) from the managing apparatus is acquired, transmitting the software in the storage part to at least one of the electronic apparatuses which one requires software thereof to be updated, and causing the one of the electronic apparatuses to update the software thereof.

The above objects of the present invention are also achieved by a software updating method in an intermediary apparatus connected to a managing apparatus via a communication line so as to control communication between the managing apparatus and one or more electronic apparatuses managed remotely by the managing apparatus, the software updating method including the steps of: (a) writing software and an update date and time to a storage part of the intermediary apparatus when the software and the update date and time are received from the managing apparatus; and (b) transmitting the software in the storage part to at least one of the electronic apparatuses which one requires software thereof to be updated and causing the one of the electronic apparatuses to update the software thereof when the update date and time in the storage part is reached.

The above objects of the present invention are also achieved by a software updating method in an intermediary apparatus connected to a managing apparatus via a communication line so as to control communication between the managing apparatus and one or more electronic apparatuses managed remotely by the managing apparatus, the software updating method including the steps of: (a) writing first software to a storage part of the intermediary apparatus when the first software is received from the managing apparatus; and (b) transmitting the first software stored in the storage part to one of the electronic apparatuses each storing second software therein which one requires the second software to be updated.

The above objects of the present invention are also achieved by a computer-readable recording medium recording a program for causing a computer to execute a software updating method in an intermediary apparatus connected to a managing apparatus via a communication line so as to control communication between the managing apparatus and one or more electronic apparatuses managed remotely by the managing apparatus, the software updating method including the steps of: (a) writing first software to a storage part of the intermediary apparatus when the first software is received from the managing apparatus; and (b) transmitting the first software stored in the storage part to one of the electronic apparatuses each storing second software therein which one requires the second software to be updated.

The above objects of the present invention are further achieved by a program for causing a computer to execute a software updating method in an intermediary apparatus connected to a managing apparatus via a communication line so as to control communication between the managing apparatus and one or more electronic apparatuses managed remotely by the managing apparatus, the software updating method including the steps of: (a) writing first software to a storage part of the intermediary apparatus when the first software is received from the managing apparatus; and (b) transmitting the first software stored in the storage part to one of the electronic apparatuses each storing second software therein which one requires the second software to be updated.

According to the present invention, it is possible to prevent a decrease in the rate of operation of an electronic apparatus due to the updating of its software. Further, it is also possible to reduce a processing load on and the communication costs of an external apparatus (the managing apparatus) resulting from the updating of the software of the electronic apparatus.

BRIEF DESCRIPTION OF THE DRAWINGS

Other objects, features and advantages of the present invention will become more apparent from the following detailed description when read in conjunction with the accompanying drawings, in which:

FIG. 3 is a diagram showing another configuration of the image-forming apparatus remote management system according to the present invention;

FIG. 12 is a diagram showing a data structure of a table showing reference information for determining the type of an abnormality according to the present invention;

FIG. 15 is a diagram showing an apparatus selection menu screen displayed on the display of the operator terminal of the managing apparatus according to the present invention;

FIG. 16 is a diagram showing a performance date setting screen displayed on the display of the operator terminal of the managing apparatus according to the present invention;

FIG. 20 is a diagram showing an object apparatus number detailed screen displayed on the display of the operator terminal of the managing apparatus according to the present invention;

FIG. 21 is a diagram showing an unregistered apparatus number detailed screen displayed on the display of the operator terminal of the managing apparatus according to the present invention;

FIG. 22 is a diagram showing a configuration of an object apparatus list file in a database of the managing apparatus according to the present invention;

FIG. 24 is a diagram showing a status table (object apparatus management table) in a flash memory of the intermediary apparatus according to the present invention;

FIG. 25 is a diagram showing a status table in the database of the managing apparatus according to the present invention;

FIG. 31 is a diagram showing an example of the contents before updating of a record corresponding to the image-forming apparatus requiring the updating of its firmware in the status table in the flash memory of the intermediary apparatus according to the present invention;

FIG. 32 is a diagram showing an example of the contents of the updated record corresponding to the image-forming apparatus according to the present invention;

FIG. 34 is a diagram showing an example of the contents before updating of the record corresponding to the image-forming apparatus requiring the updating of its firmware in the status table in the flash memory of the intermediary apparatus according to the present invention;

FIG. 35 is a diagram showing an example of the contents of the updated record corresponding to the image-forming apparatus according to the present invention;

FIG. 36 is a diagram showing an example of the contents of a determent management parameter according to the present invention;

FIG. 44 is a diagram showing a seventh communication sequence at the time of the firmware updating operation (third embodiment) in the image-forming apparatus management system according to the present invention;

FIGS. 45A and 45B are diagrams showing an eighth communication sequence at the time of the firmware updating operation (fourth embodiment) in the image-forming apparatus management system according to the present invention;

FIG. 46 is a diagram showing a status table (an object apparatus management table) in the flash memory of the intermediary apparatus according to the fourth embodiment of the firmware updating operation of the present invention;

FIGS. 47A and 47B are diagrams showing formats of information on the communication between a controller of the managing apparatus and the intermediary apparatus according to the fourth embodiment of the firmware updating operation of the present invention.

DETAILED DESCRIPTION OF THE PREFERRED EMBODIMENTS

A description is given below, with reference to the accompanying drawings, of embodiments of the present invention.

First, a description is given of a configuration of a remote management system including an electronic apparatus according to the present invention as an apparatus to be managed (a managed apparatus).

Figure 1:
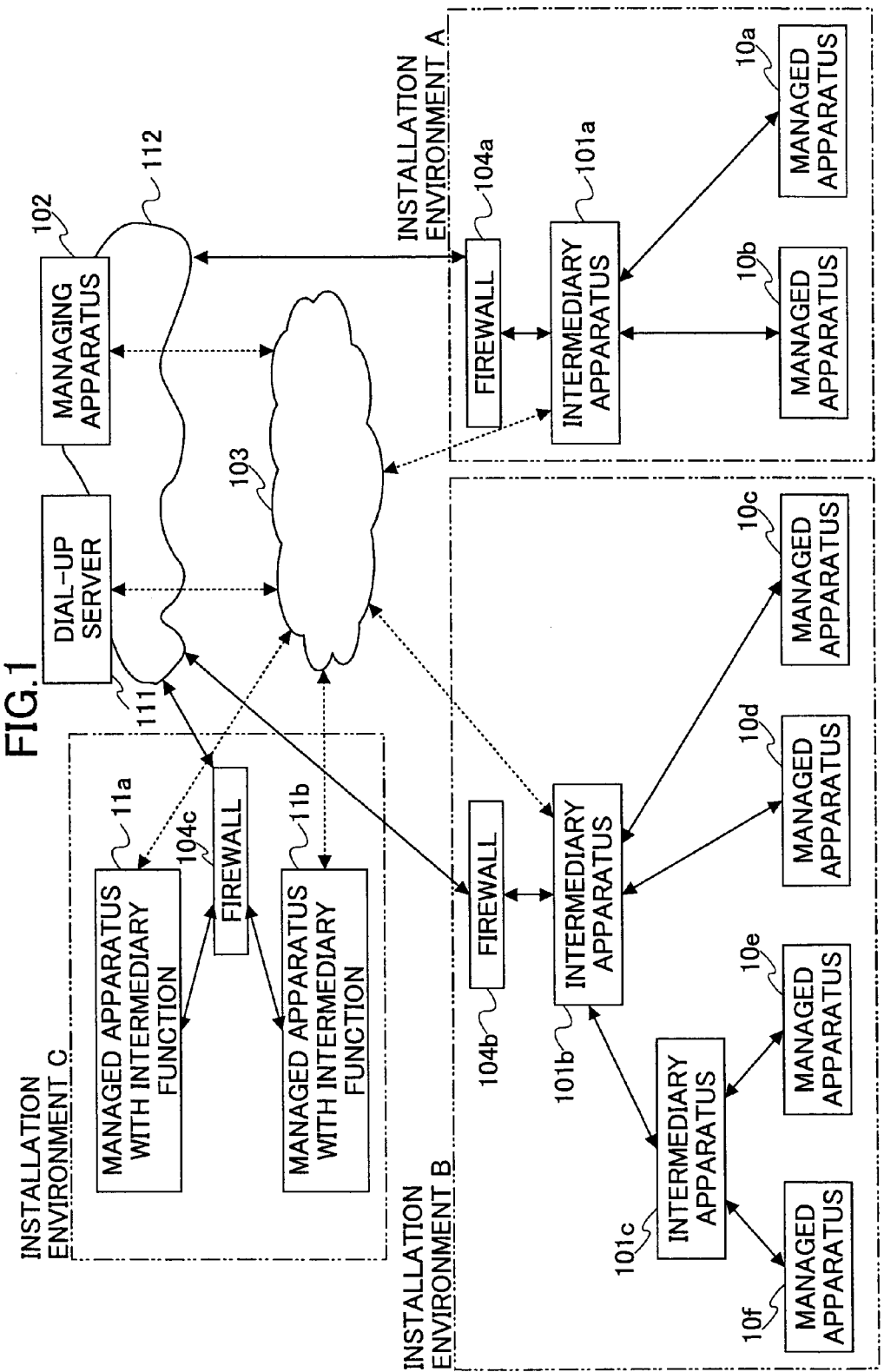
FIG. 1 is a diagram showing a remote management system according to the present invention.

FIG. 1 is a diagram showing a remote management system according to the present invention. In the following description, a network does not include a public line.

The remote management system includes managed apparatuses 10 (10a, 10b, 10c, 10d, 10e, and 10f) that are electronic apparatuses (communication apparatuses) each formed by incorporating a communication function in any of image processing apparatuses such as a printer, a facsimile (FAX) machine, a digital copier, a scanner, and a digital multi-function apparatus, network appliances, automatic vending machines, medical equipment, power supply units, air conditioning systems, and systems for measuring gas, water, and electricity. The remote management system also includes intermediary apparatuses 101 (101a, 101b, and 101c) as external apparatuses (to the managed apparatuses 10). The intermediary apparatuses 101 are remote management intermediary apparatuses that are connected to the managed apparatuses 10 via networks such as LANs (local area networks). The remote management system further includes a managing apparatus 102 that functions as a server apparatus connected to the intermediary apparatuses 101 via a pubic line (telephone line) 103 or the Internet 112. This system allows the managing apparatus 102 to perform centralized remote management of the managed apparatuses 10 via the intermediary apparatuses 101. The managed apparatuses 10 and the intermediary apparatuses 101 are installed in the offices of apparatus users, and the managing apparatus 102 is installed in a service center (management center).

A service that is remotely managed by the managing apparatus 102 via the Internet 112 is referred to as a new remote service (NRS). In order to realize the NRS, the intermediary apparatuses 101 and the managed apparatuses 10 connected to the networks on the apparatus user side include software corresponding to the NRS. Further, a service that is remotely managed by the managing apparatus 102 via the public line 103 is referred to as a customer support system (CSS).

The public line 103 may include a fixed telephone line such as an analog line, an ADSL line, a digital (ISDN) line, or an optical-fiber line, a cellular phone line, and a mobile phone line such as a PHS line.

The intermediary apparatuses 101 and the managed apparatuses 10 may form a variety of hierarchical structures depending on the environment in which they are used.

For instance, in an installation environment A of FIG. 1, the managed apparatuses 10a and 10b are subordinated to the intermediary apparatus 101a that can establish direct connection with the managing apparatus 102 based on HTTP (HyperText Transfer Protocol), thus forming a simple hierarchical structure. Meanwhile, in an installation environment B of FIG. 1, the four managed apparatuses 10c through 10f are installed, which impose a great load on a single intermediary apparatus. Accordingly, there is formed a hierarchical structure where not only the managed apparatuses 10c and 10d but also the intermediary apparatus 101c is subordinated to the intermediary apparatus 101b that can establish direct connection with the managing apparatus 102 based on HTTP (HyperText Transfer Protocol), and the managed apparatuses 10e and 10f are subordinated to the intermediary apparatus 101c. In this case, information transmitted from the managing apparatus 102 to perform remote management of (or remotely manage) the managed apparatuses 10e and 10f reaches the managed apparatuses 10e and 10f via the intermediary apparatus 101b and the intermediary apparatus 101c, which is a node subordinate to the intermediary apparatus 101b.

As in an installation environment C of FIG. 1, managed apparatuses with an intermediary function (hereinafter also referred to simply as managed apparatuses) 11 (11a and 11b), which incorporate the function of the intermediary apparatus 101 into the managed apparatus 10, may be connected to the managing apparatus 102 via the public line 103 or the Internet 112 without going through another intermediary apparatus.

Although not graphically represented, a managed apparatus equivalent to the managed apparatus 10 may be subordinated to the managed apparatus with an intermediary function 11.

A dial-up server 111, which is a relay apparatus, connects the managing apparatus 102 with the intermediary apparatuses 101 or the managed apparatuses 11 via the public line 103 (or a lease line) and the Internet 102 so that the managing apparatus 102 can communicate with the intermediary apparatuses 101 or the managed apparatuses 10 or 11. For instance, at the request (for communication with the managing apparatus 102) of any of the intermediary apparatuses 101 and the managed apparatuses 10 and 11, the dial-up server 111 performs negotiation (or exchanges information on communication) with the requesting apparatus via the public line 103, and connects the managing apparatus 102 and the requesting apparatus via the public line 103 and the Internet 102 so that the managing apparatus 102 and the requesting apparatus can communicate with each other.

Firewalls 104 (104a, 104b, and 104c) are installed in the installation environments A, B, and C, respectively, for security reasons. Each firewall 104 is formed of a proxy server.

Further, a terminal apparatus such as a personal computer or another electronic apparatus (external apparatus) may be connected to any of the managed apparatuses 10 and 11 via the network such as a LAN.

In this remote management system, the intermediary apparatuses 101 include an application program for managing control of the managed apparatuses 10 connected to the intermediary apparatuses 101.

The managing apparatus 102 includes an application program for managing control of the intermediary apparatuses 101 and also managing control of the managed apparatuses 10 via the intermediary apparatuses 101. These nodes including the managed apparatuses 10 in this remote management system are allowed by an RPC (remote procedures call) to transmit a "request" that is a request for processing to the method of one another's application program and acquire a "response" that is the result of the requested processing.

That is, the intermediary apparatuses 101 or the managed apparatuses 10 connected thereto can generate a request to the managing apparatus 102 and transmit the request thereto, and acquire a response to the request. Meanwhile, the managing apparatus 102 can generate a request to the intermediary apparatus 101 side and transmit the request thereto, and acquire a response to the request. This request may also cause the intermediary apparatuses 101 to transmit a variety of requests to the managed apparatuses 10 and acquire responses from the managed apparatuses 10 via the intermediary apparatuses 101.

Figure 2A:
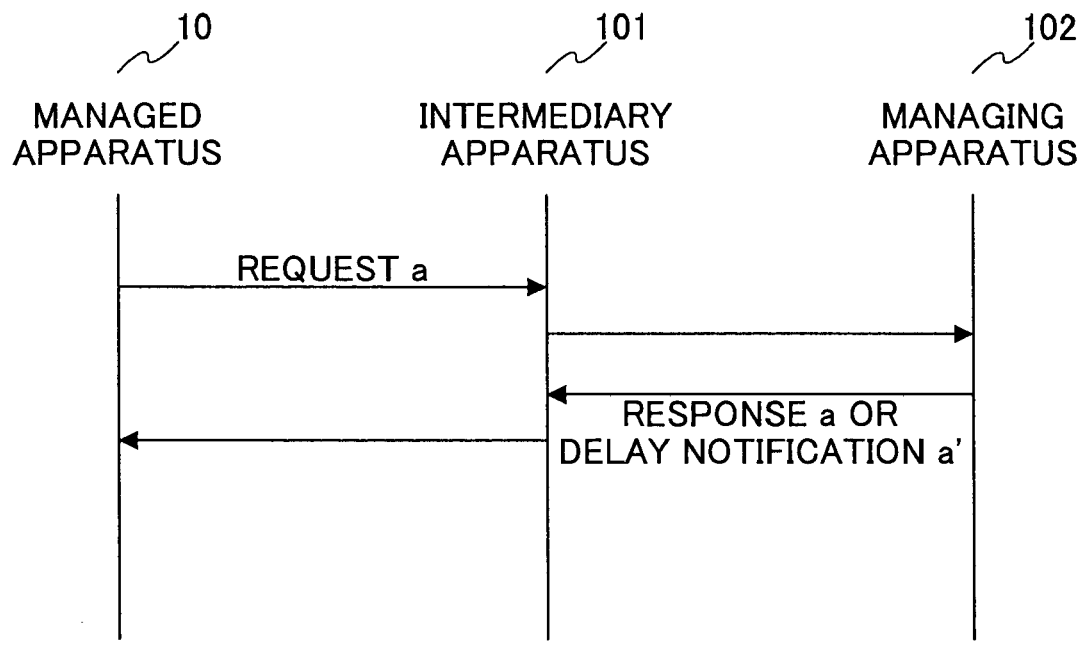
FIGS. 2A and 2B are diagrams showing models of data transmission and reception in the remote management system according to the present invention.
Figure 2B:
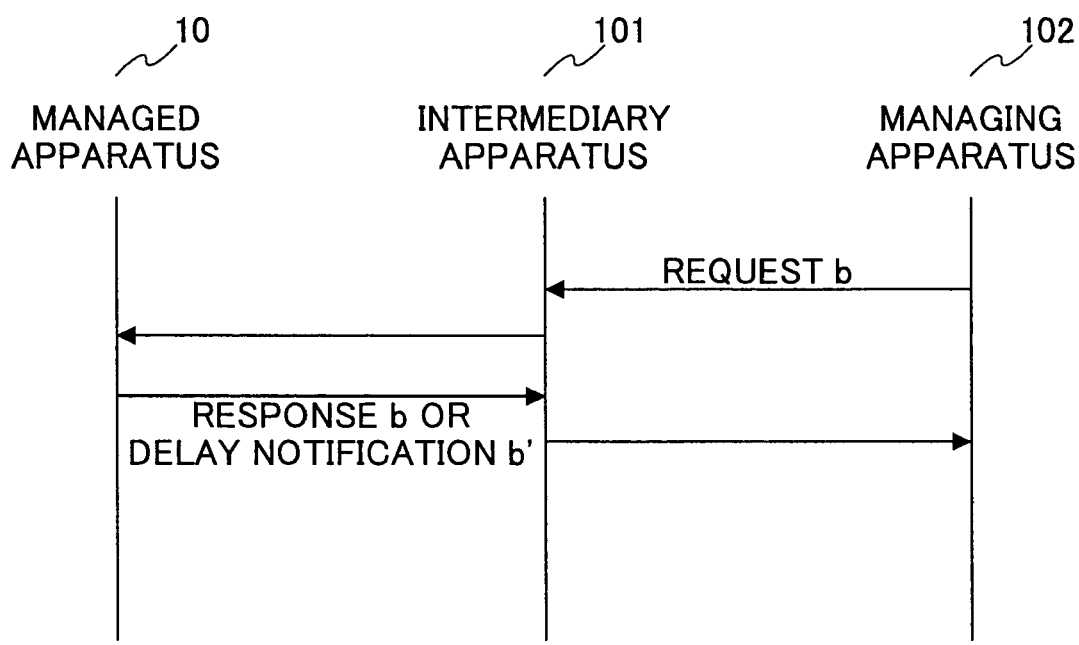

In order to realize the RPC, well-known protocols (communication standards), technologies, and specifications such as SOAP (Simple Object Access Protocol), HTTP, FTP (File Transfer Protocol), COM. (Component Object Model), and CORBA (Common Object Request Broker Architecture) may be employed:

FIGS. 2A and 2B are diagrams showing models of the above-described data transmission and reception.

FIG. 2A shows the case where the managed apparatus 10 generates a request to the managing apparatus 102. In this case, the managed apparatus 10 generates a managed apparatus-side request a, and the managing apparatus 102 receives the request a via the intermediary apparatus 101, and makes a response a to the request a. In FIG. 2A, a plurality of intermediary apparatuses may be employed as the intermediary apparatus 101 as in the installation environment B. Further, in this case, the managing apparatus 102 may return a response delay notification a'. If the managing apparatus 102 receives the request a via the intermediary apparatus 101, and determines that it is impossible to return an immediate response to the request a, the managing apparatus 102 transmits the response delay notification a', and temporarily terminates the connection. Thereafter, the managing apparatus 102 transmits a response to the request a at the next connection.

FIG. 2B shows the case where the managing apparatus 102 makes a request to the managed apparatus 10. In this case, the managing apparatus 102 generates a managing apparatus-side request b, and the managed apparatus 10 receives the request b and makes a response b to the request b. In the case of FIG. 2B, the managed apparatus 10 also makes a response delay notification b' when it is impossible to make an immediate response as in the case of FIG. 2A.

Next, a description is given briefly of a physical configuration of the managing apparatus 102 of FIG. 1. The managing apparatus 102 includes a controller formed of a CPU, a ROM, and a RAM, a database, a modem, and a proxy server. An expatiation is given below of the configuration.

A description is further given briefly of a physical configuration of each intermediary apparatus 101 of FIG. 1. The intermediary apparatus 101 includes a CPU, a ROM, a RAM, a non-volatile memory, and a PHY (physical media interface). An expatiation is given below of the configuration.

Each managed apparatus with an intermediary function 11 may be formed by simply incorporating the unit of the intermediary apparatus 101 into the managed apparatus 10 so as to realize the function of the intermediary apparatus 101. Alternately, the managed apparatus 11 can also realize the function of the intermediary apparatus 101, using hardware resources such as a CPU, a ROM, and a RAM provided in the managed apparatus 10, by causing the CPU to execute a suitable application or program module.

A description is given below of an image-forming apparatus remote management system, which is a more specific example of the remote management system of FIG. 1. In the image-forming apparatus remote management system, an electronic apparatus according to the present invention is to be managed (as a managed apparatus). FIG. 3 is a diagram showing a configuration of the image-forming apparatus remote management system. The entire configuration of FIG. 3 is equal to that of FIG. 1. The difference between the configurations of FIGS. 1 and 3 is that the managed apparatuses 10 are changed to image-forming apparatuses 100 (100a through 100f) and the managed apparatuses 11 are changed to image-forming apparatuses with an intermediary function (hereinafter also referred to simply as image-forming apparatuses) 110 (110a and 110b). Accordingly, a description of the entire configuration of FIG. 3 is omitted.

Each image-forming apparatus 100 is a digital multi-function apparatus having the functions of a copier, a facsimile machine, and a scanner and the function of communicating with an external apparatus. The image-forming apparatus 100 includes an application program for providing services relating to these functions. Further, each image-forming apparatus with an intermediary function 110 is formed by incorporating the function of the intermediary apparatus 101 into the image-forming apparatus 100.

Figure 4:
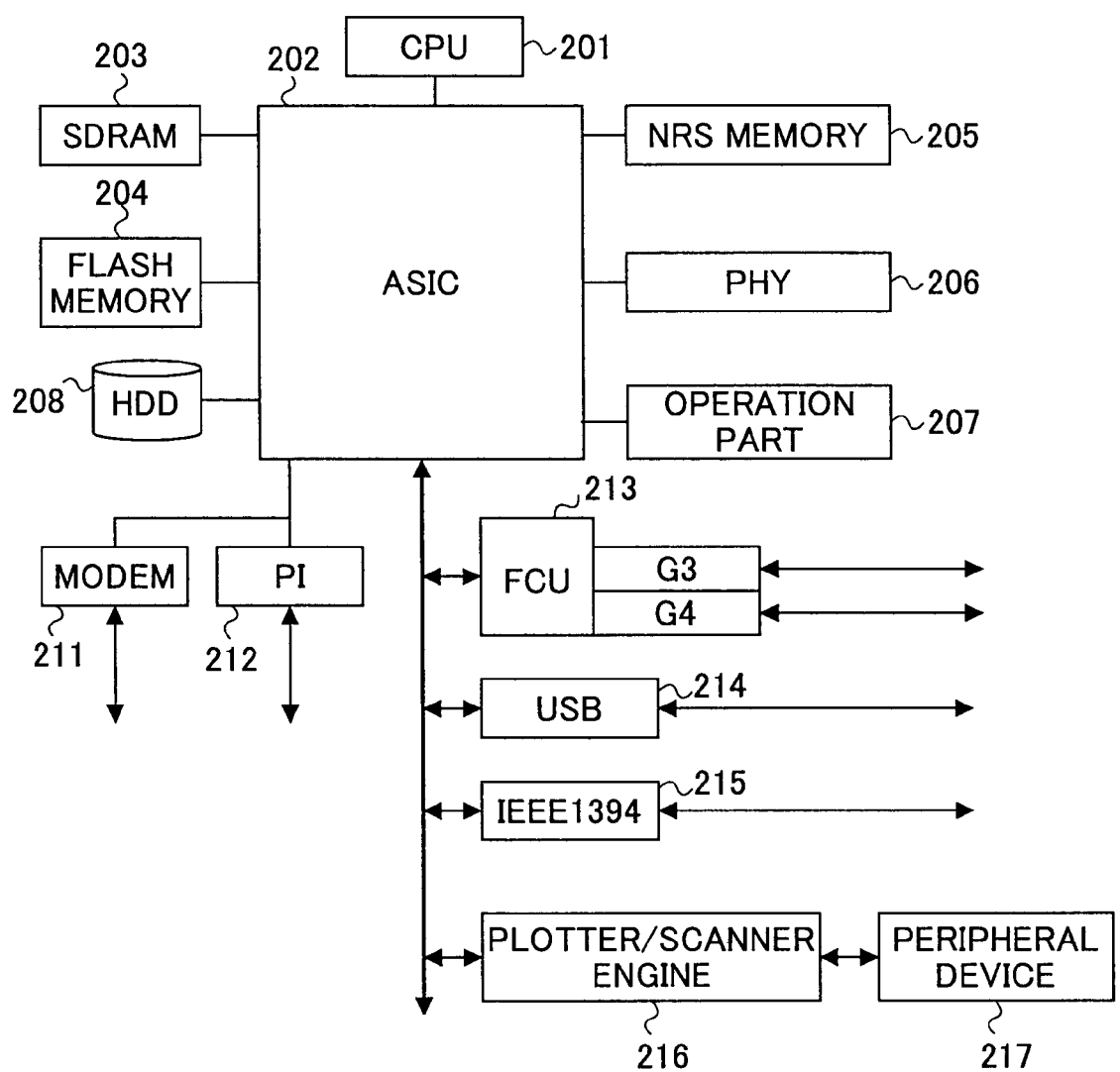
FIG. 4 is a block diagram showing a hardware configuration of an image-forming apparatus according to the present invention.

A description is given, with reference to FIG. 4, of a physical configuration of the image-forming apparatus 100 (any of the image-forming apparatus 100a through 100f).

FIG. 4 is a block diagram showing a hardware configuration of the image-forming apparatus 100.

The image-forming apparatus 100 includes a CPU 201, an ASIC (application specific integrated circuit) 202, an SDRAM 203, a flash memory (non-volatile memory) 204, an NRS memory 205 for the NRS, a PHY 206, an operation part 207, an HDD (hard disk drive) 208, a modem 211, a PI (personal interface) 212, an FCU (fax control unit) 213, a USB (universal serial bus) 214, an IEEE1394 interface 215, plotter and scanner engines (a plotter/scanner engine) 216, and a peripheral device 217. Each of these units is a hardware resource of the image-forming apparatus 100. The scanner and plotter engines 216, which are engine units, each contain a sensor for detecting an event such as an abnormality.

The CPU 201 is a processor that performs data processing (control of each function) through the ASIC 202.

The ASIC 202 is a multi-function device board composed of a CPU interface, an SDRAM interface, a local device interface, a PCI interface, a MAC (media access controller), and an HDD interface. The ASIC 202 causes a device to be controlled by the CPU 201 to be shared, and helps to increase efficiency in the development of application software in terms of architecture.

The SDRAM 203 is main memory employed as program memory for storing a variety of programs including an OS (operating system) or work memory that is used when the CPU 201 performs data processing. The SDRAM 203 may be replaced by a DRAM or an SRAM.

The flash memory 204 is non-volatile memory (a non-volatile memory part) employed as: fixed program memory for storing a boot loader (boot program) activating the image-forming apparatus 100 and an OS image; application memory for storing applications; service memory for storing services (service software); firm memory for storing firmware; and data memory for storing identification information for identifying an apparatus (the image-forming apparatus 100) whose operating condition is monitored and managed, such as an address (a network address) and a type and serial number, and the counter information (the data of a charging counter) of the apparatus. The flash memory 204 retains its contents (stored information) even when power is turned off. The flash memory 204 may be replaced by another non-volatile memory such as a non-volatile RAM integrating a RAM and a backup circuit using a battery or an EEPROM.

The NRS memory 205 is non-volatile memory for storing the below-described NRS. An NRS function can be added to the NRS memory 205 as an option.

The PHY 206 is an interface for communicating an external apparatus via the network.

The operation part 207 includes a variety of operation keys (also referred to as operation switches or operation buttons) and a character display formed of an LCD or CRT.

The HDD 208 is a non-volatile storage part (recording medium) that stores and retains data irrespective of whether power is on or off. The above-described programs stored in the flash memory 204 or other data may be stored on the HDD 208. Further, the HDD 208 may be employed as firm memory.

The modem 211 is a modulation and demodulation part. In the case of transmitting data to the managing apparatus 102 via the public line 103, the modem 211 modulates the data so that the data is transmittable on the public line 103. In the case of receiving modulated data transmitted from the managing apparatus 102, the modem 211 demodulates the received data.

The PI 212 includes an interface based on the RS-485 standard, and is connected to the public line 103 via a line-adapter (not graphically represented).

The FCU 213 controls, via the public line 103, communication with eternal apparatuses such as the managing apparatus 102 and an image-forming apparatus such as a facsimile machine, or a digital copier or a digital multi-function apparatus, including a modem function (a facsimile communication function).

When power is turned on, the CPU 201 activates the boot loader stored in the flash memory 204 via the ASIC 202, and reads out the OS image from the flash memory 204 in compliance with the boot loader. Then, the CPU 201 loads the read-out OS image into the SDRAM 203 so that the OS is usable. Once the loading of the OS is completed, the CPU 201 activates the OS. Thereafter, the CPU 201 reads out programs such as applications or services from the flash memory 204 or the NRS from the NRS memory 205 as required, loads the read-out programs or NRS into the SDRAM 203, and activates the read-out programs or NRS, thereby realizing a variety of functions.

Figure 5:
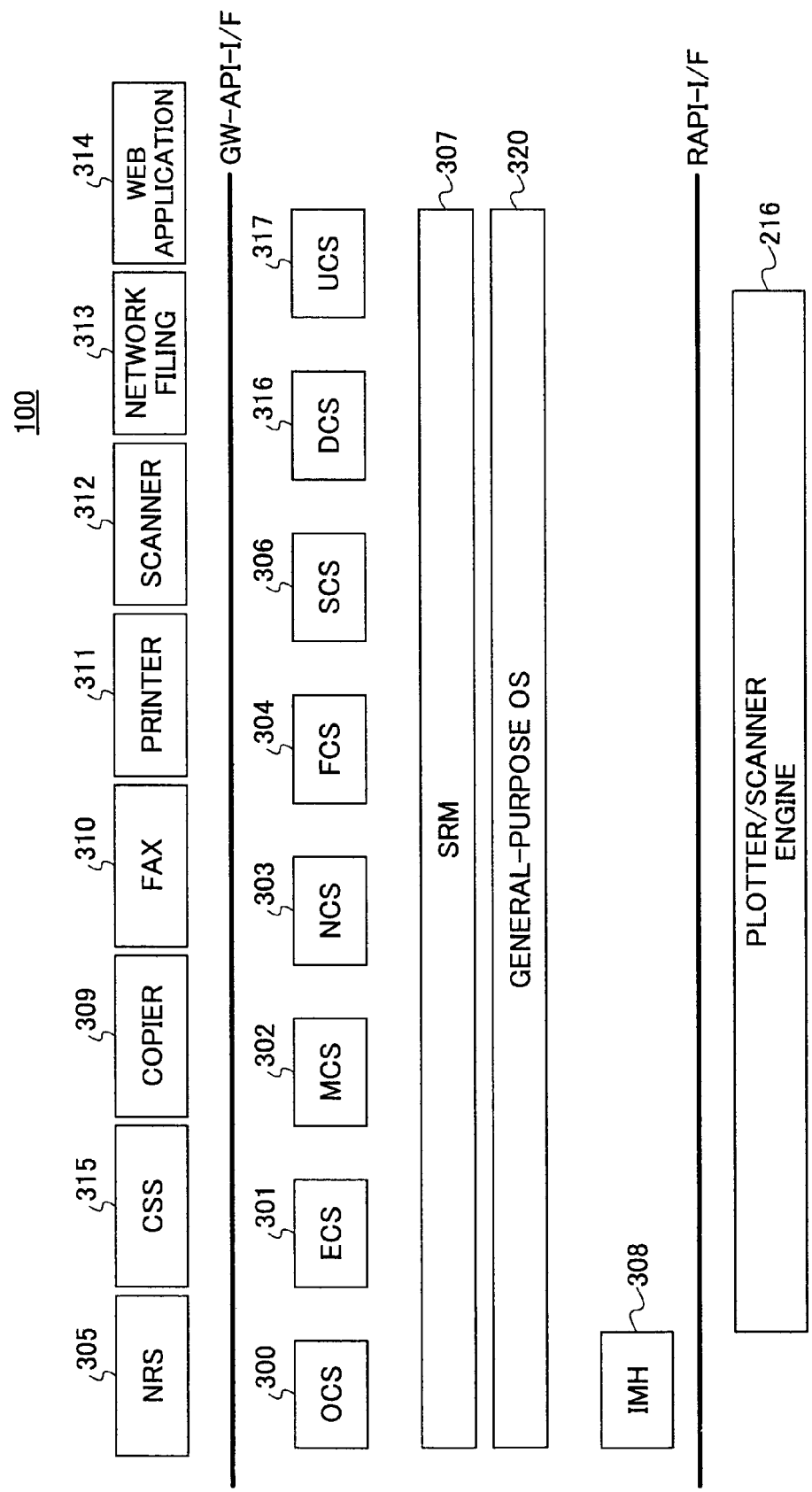
FIG. 5 is a block diagram showing a software configuration of the image-forming apparatus according to the present invention.

Next, a description is given, with reference to FIG. 5, of a software configuration of the image-forming apparatus 100 or 110 (any of the image-forming apparatuses 100a through 100f and 110a and 110b). The following description is based on the image-forming apparatus 100 for convenience of description.

FIG. 5 is a block diagram showing a software configuration of the image-forming apparatus 100.

The software configuration of the image-forming apparatus 100 is composed of an application module layer, a service module layer, and a general-purpose OS layer. The programs forming the software is stored in the flash memory 204 and the NRS memory 205, and are read out as required to be executed by the CPU 201. By executing these programs as required, the CPU 201 can realize a variety of functions according to the present invention as a software updating part, a response part, a deferment period managing part, a restart instruction part, and a power-on reporting part.

The software of the application module layer is composed of programs for causing the CPU 201 to function as a plurality of application control parts (processing executing parts) that cause hardware resources to operate to realize predetermined functions. The software of the service module layer is composed of programs for causing the CPU 201 to function as a service control part (processing executing part) that, intervening between the hardware resources and the application control parts, receives requests to cause hardware resources to operate (operation requests) from the application control parts, arbitrates between the operation requests, and performs and controls the operations of the hardware resources based on the operation requests.

Among these functions, the functions (as a communication part) relating to the communication with the managing apparatus 102 are realized differently between the image-forming apparatus 100 and the image-forming apparatus 110. That is, in the case of the image-forming apparatus 110, which has the function of the intermediary apparatus 101, the functions relating to the communication with the managing apparatus 102 can be realized by the CPU 201 executing the corresponding program. In the case of the image-forming apparatus 100, the functions relating to the communication with the managing apparatus 102 can be realized by the CPU 201 executing the corresponding program and using the intermediary apparatus 101.

In the service module layer, there are installed an operation control service (OCS) 300, an engine control service (ECS) 301, a memory control service (MCS) 302, a network control service (NCS) 303, a facsimile control service (FCS) 304, a system control service (SCS) 306, a system resource manager (SRM) 307, an image memory handler (IMH) 308, a delivery control service (DCS) 316, and a user control service (UCS) 317. Further, in the application module layer, there are installed an NRS application (hereinafter referred to simply as an NRS) 305, a CSS application (hereinafter referred to simply as a CSS) 315, a copier application 309, a facsimile application 310, a printer application 311, a scanner application 312, a network filing application 313, and a web application 314. Furthermore, a general-purpose OS 320 is installed in the general-purpose OS layer.

A more detailed description is given below of the above-described services and applications.

The OCS 300 is a module that controls the operation part 207.

The ECS 301 is a module that controls the engine units of the hardware resources.

The MCS 302, which is a module performing memory control, acquires and frees, for instance, image memory, and uses the HDD 201.

The NCS 303 is a module that causes mediation to be performed between the network and each application program of the application module layer.

The FCS 304 is a module that transmits and receives facsimile data, reads facsimile data, and prints out received facsimile data.

The SCS 306 is a module that manages the activation and termination of each application program of the application module layer in accordance with the contents of a command.

The SRM 307 is a module that performs system control and resource management.

The IMH 308 is a module that manages memory for temporarily storing image data.

The DCS 316 is a module that transmits and receives an image file stored or to be stored in the HDD 210 or the SDRAM 203 using SMTP (Simple Mail Transfer Protocol) or FTP (File Transfer Protocol).

The UCS 317 is a module that manages user information such as destination information or address information registered by an apparatus user.

The NRS 305 is an application program that integrates the functions relating to remote management via the network (functions relating to the communication with the managing apparatus 102), such as the function of performing data conversion at the time of transmitting and receiving data via the network.

The CSS 315 is an application program that integrates the functions relating to remote management via the public line 103 (functions relating to the communication with the managing apparatus 102), such as the function of performing data conversion at the time of transmitting and receiving data via the public line 103.

The copier application 309 is an application program for realizing a copy service.

The facsimile application 310 is an application program for realizing a facsimile service.

The printer application 311 is an application program for a printer service.

The scanner application 312 is an application program for realizing a scanner service.

The network filing application 313 is an application program for realizing a network filing service.

The web application 314 is an application program for realizing a web service.

The general-purpose OS 320 is an operating system such as UNIX®, and manages the operation of causing the programs of the service module layer and the application module layer to be executed. The employment of UNIX has the advantage of ensured security due to its open-sourceness and easy access to source codes. Further, the employment of UNIX has the practical merit in terms of network connection that no royalty payment to a protocol is required.

Figure 6:
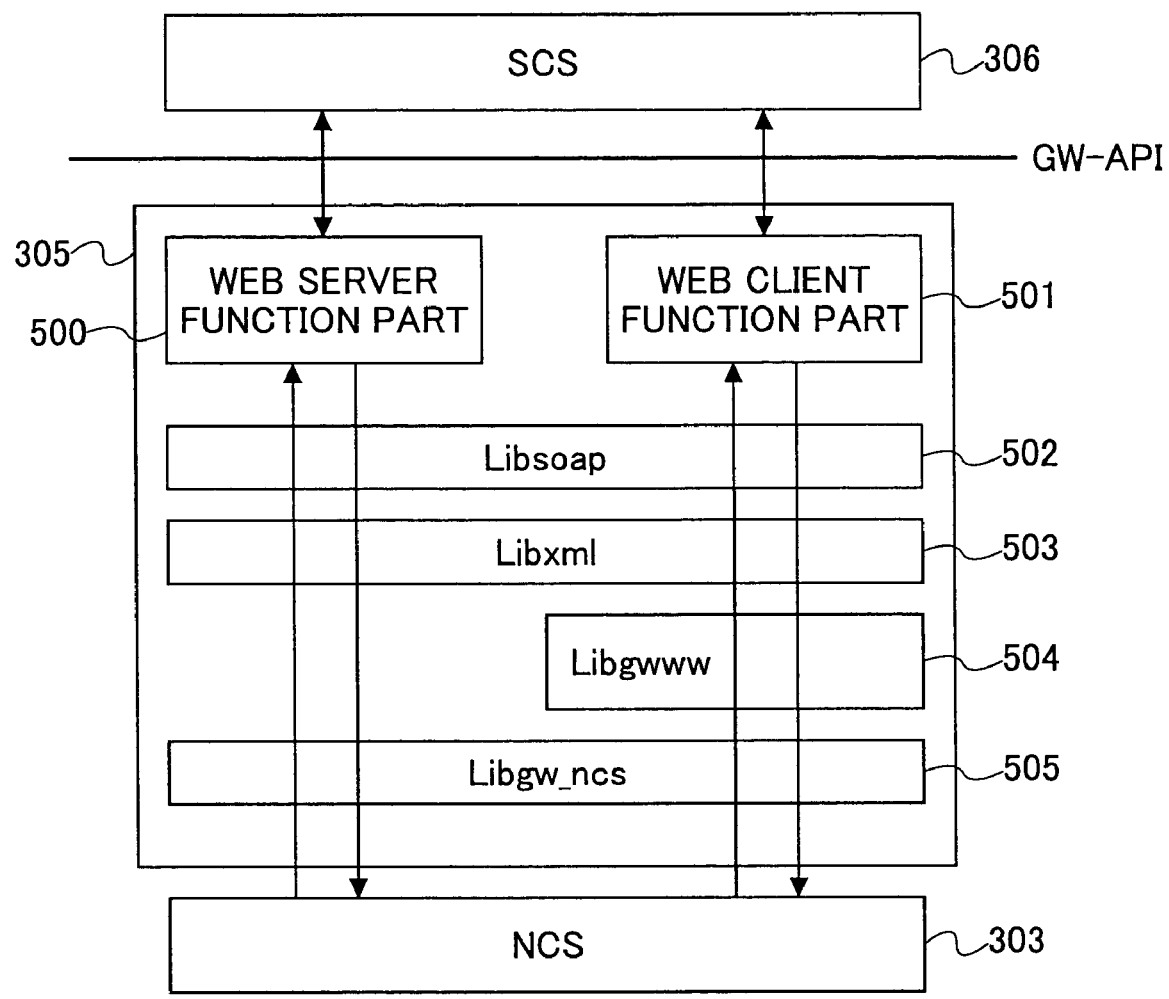
FIG. 6 is a functional block diagram showing a configuration of a new remote service (NRS) of the image-forming apparatus according to the present invention.

Next, a further description is given, with reference to FIG. 6, of an internal structure of the NRS module included in the software configuration of the image-forming apparatus 100.

FIG. 6 is a functional block diagram showing a configuration of the NRS 305. Referring to FIG. 6, the NRS 305 performs processing between the SCS 306 and the NCS 303. The NRS 305 includes a web server function part 500, a web client function part 501, a libsoap 502, a libxml 503, a libgwww 504, and a libgw_ncs 505. The web server function part 500 makes a response to a request received from the outside. The request may be, for instance, a SOAP request based on SOAP, written in the format of XML (extensible Markup Language), which is a structured language. The web client function part 501 issues a request to the outside. The libsoap 502 is a library that processes SOAP. The libxml 503 is a library that processes data written in XML. The libgwww 504 is a library that processes HTTP. The libgw_ncs 505 is a library that performs processing between the NRS 305 and the NCS 303.

Figure 7:
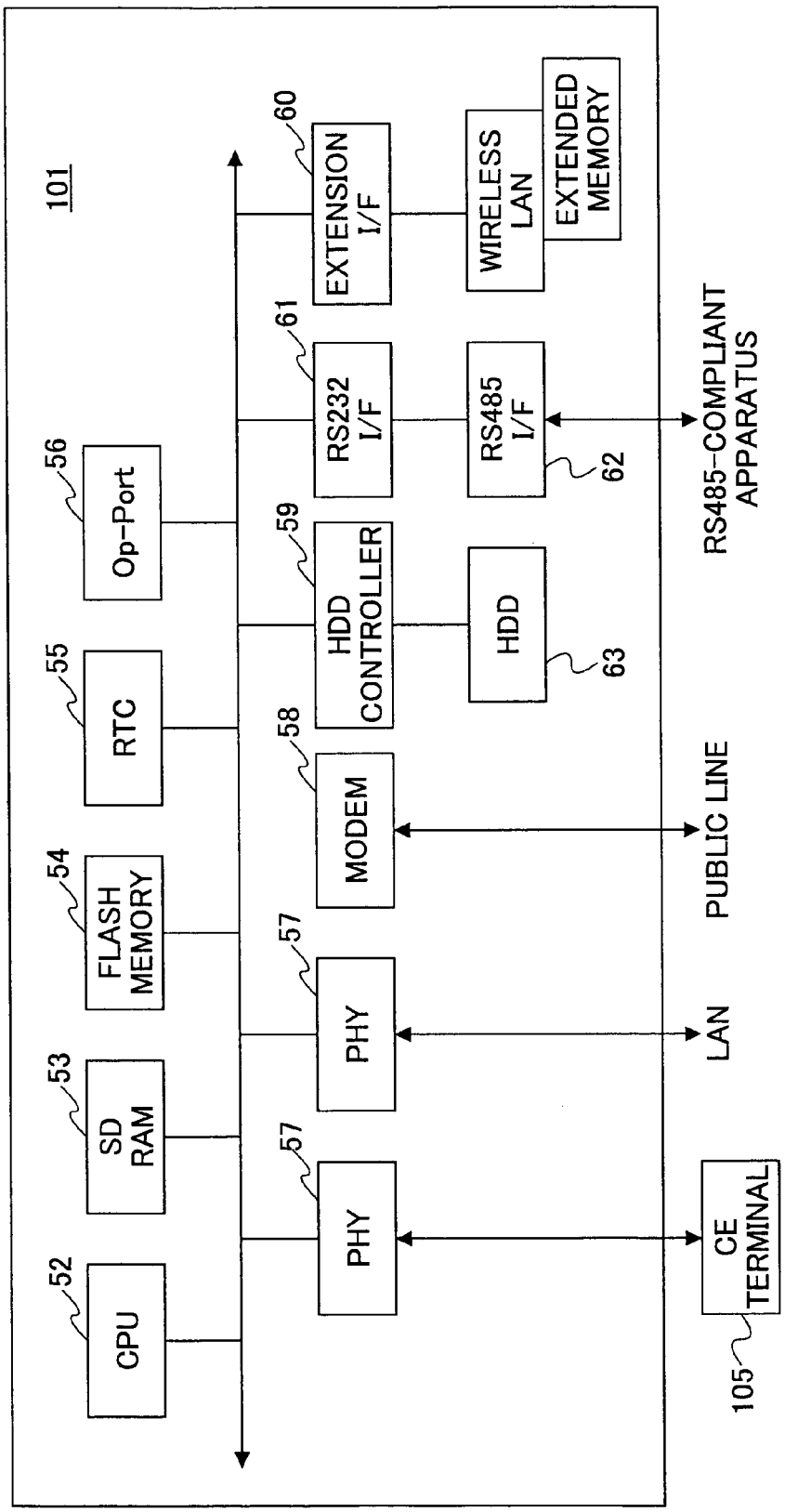
FIG. 7 is a block diagram showing a hardware configuration of an intermediary apparatus according to the present invention.

Next, a description is given, with reference to FIG. 7, of a physical configuration of the intermediary apparatus 101 (any of the intermediary apparatuses 101a through 101c).

FIG. 7 is a block diagram showing a hardware configuration of the intermediary apparatus 101.

As previously described, the intermediary apparatus 101 is installed in the office of an apparatus user. The intermediary apparatus 101 includes a CPU 52, an SDRAM 53, a flash memory (non-volatile memory) 54, an RTC (real-time clock circuit that is an internal clock) 55, an Op-Port (operation part connecting port) 56, PHYs 57, a modem 58, an HDD controller 59, an extension I/F 60, an RS-232 I/F 61, an RS-485 I/F 62, and an HDD 63. The intermediary apparatus 101 is connected via the PHYs 57 to a CE terminal 105 and the image-forming apparatus 100 on the network. Further, the intermediary apparatus 101 may also be connected to the image-forming apparatus 100 via the RS-232 I/F 61 and the RS-485 I/F 62, which are not used in this case. In the intermediary apparatus 101, as in the case of the image-forming apparatus 100, the SDRAM 53 may be replaced by a DRAM or a SRAM. Further, the flash memory 54 may be replaced by another non-volatile memory such as an EEPROM.

Figure 8:
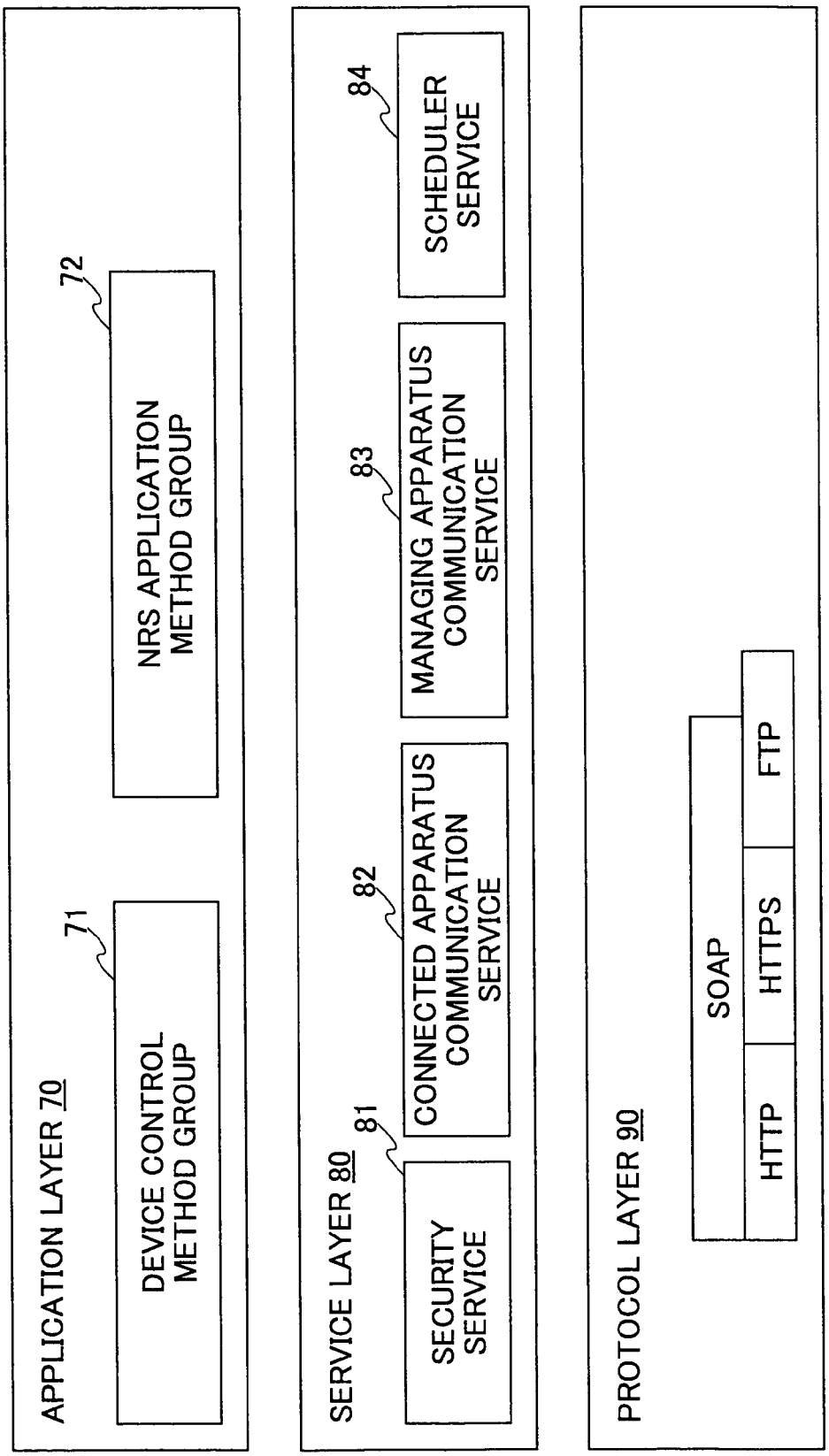
FIG. 8 is a block diagram showing a software configuration of the intermediary apparatus according to the present invention.

Next, a description is given, with reference to FIG. 8, of a software configuration of the intermediary apparatus 101.

FIG. 8 is a block diagram showing a software configuration of the intermediary apparatus 101.

Referring to FIG. 8, the software of the intermediary apparatus 101 is composed of an application layer 70, a service layer 80, and a protocol layer 90. The programs composing the software are stored on the HDD 63, in the SDRAM 53, or in the flash memory 54, and are read out as required to be executed by the CPU 52. By executing the programs as required and controlling the intermediary apparatus 101, the CPU 52 can realize a variety of functions according to the present invention as a software writing part, a software transmitting part, a schedule writing part, a transmission requesting part, a transmission rate measuring part, a transmission rate reporting part, a status checking part, an update date and time changing part, and an update necessity determining part.

In this software, the application layer 70 includes a device control method group 71 and an NRS application method group 72.

The device control method group 71, which includes a managed object information setting method (for setting information on an object to be managed), an apparatus setting method, a firmware updating method, a polling setting changing method, a log outputting method, and an activation method, is a program for performing firmware updating, which relates to a feature of the present invention, and establishing the settings of information management and communication of the image-forming apparatus 100, which is a managed apparatus.

The NRS application method group 72, which includes a log collecting method, a firmware downloading method, an apparatus command executing method, an apparatus setting changing method, a supply reporting method, an abnormality reporting method, a device activating and installing method, and a device status monitoring method, is a program for responding to a variety of notifications and requests from the image-forming apparatus 100 and causing the image-forming apparatus 100 to operate in accordance with a request from the managing apparatus 102.

Next, in the service layer 80, there are installed a security service 81, a connected apparatus communication service 82, a managing apparatus communication service 83, and a scheduler service 84.

The security service 81 is a module that generates and executes a job that prevents or hinders inside information from being illegally distributed outside.

The connected apparatus communication service 82 is a module that, in order to realize information exchange with a network-connected apparatus connected to the intermediary apparatus 101, generates and executes jobs such as searching for the connected apparatus whose information is to be obtained, managing the connection with the connected apparatus, transmitting and receiving a file to and from the connected apparatus, managing parameters, and managing APL.

The managed apparatus communication service 83 is a module that generates and executes jobs such as receiving a command from the managing apparatus 102, transmitting and receiving a file to and from the managing apparatus 102, requesting information from the managing apparatus 102, and transmitting (reporting) information to the managing apparatus 102.

The scheduler service 84 is a module that loads a remote control application based on predetermined set time information.

Next, the protocol layer 90 includes methods for generating and executing a job that performs information exchange using a protocol corresponding to an object with which information is exchanged. That is, the protocol layer 90 includes methods that can control SOAP, and HTTP, HTTPS (Hyper-Text Transfer Protocol Security), and FTP, which are employed as subordinate protocols to SOAP, so as to support a variety of communication environments of network-connected apparatuses via the network.

Figure 9:
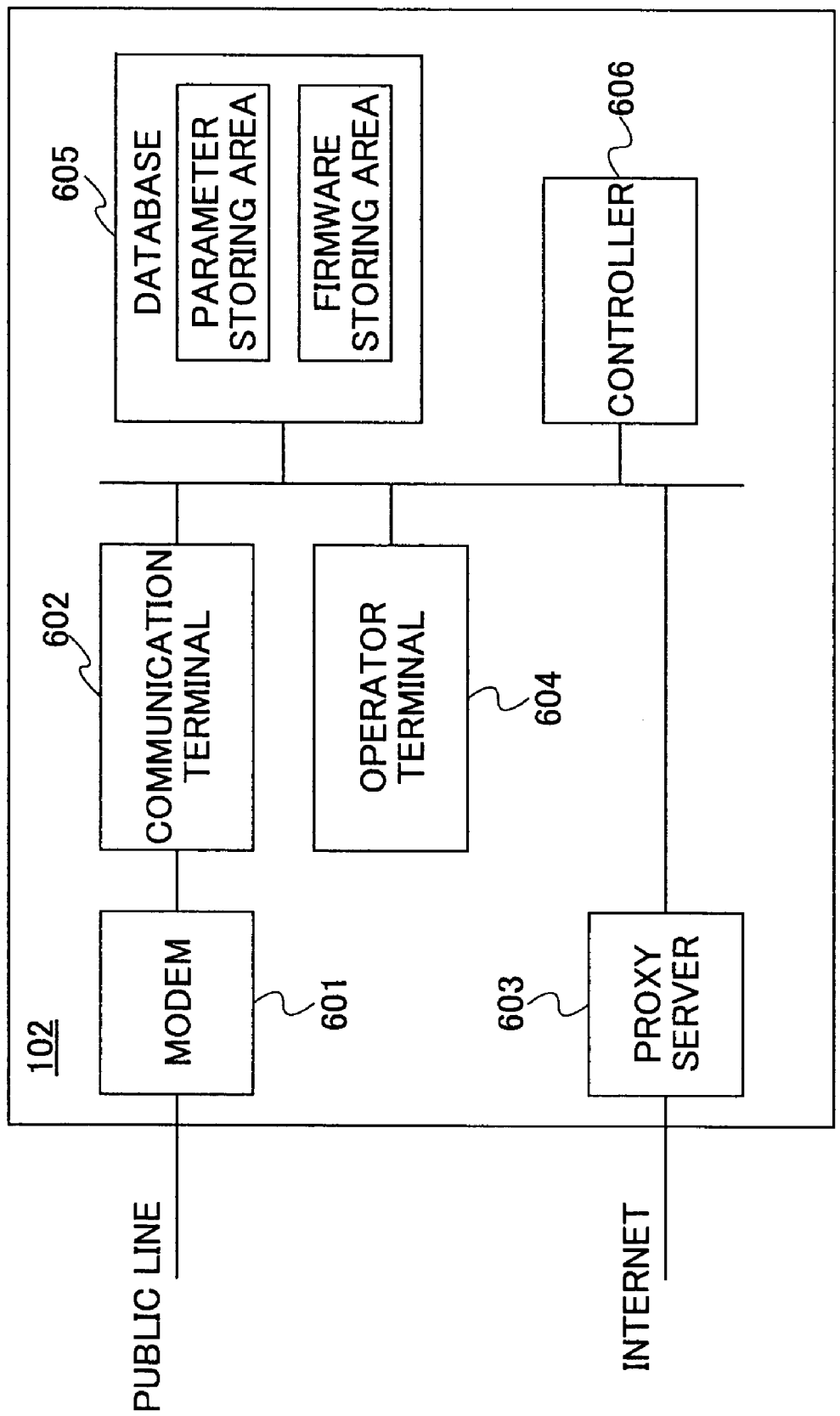
FIG. 9 is a block diagram showing a physical configuration of a managing apparatus according to the present invention.

Next, a description is given, with reference to FIG. 9, of a physical configuration of the managing apparatus 102.

FIG. 9 is a block diagram showing a physical configuration of the managing apparatus 102.

Referring to FIG. 9, the managing apparatus 102 includes a modem 601, a communication terminal 602, a proxy server 603, an operator terminal 604, a database 605, and a controller 606.

The modem 601 performs communication via the public line 103 with the intermediary apparatus 101 or the image-forming apparatus 110 on the apparatus user side (for instance, on the side of a user using the image-forming apparatus 100 or 110). The modem 601 modulates data to be transmitted and demodulates received data. The modem 601 and the communication terminal 602 function as a communication part.

The communication terminal 602 controls communication by the modem 601.

The proxy server 603 communicates with the intermediary apparatus 101 or the image-forming apparatus 110 on the apparatus user side, and performs security management. The proxy server 603 also functions as a communication part.

The operator terminal 604 receives the entry of a variety of data through the operator's operation of an input part such as a keyboard or a pointing device (for instance, a mouse).

The database 605 is provided in the storage device of a server (not graphically represented), such as a hard disk unit. The database 605 stores a variety of data such as data received from each intermediary apparatus 101 and each image-forming apparatus 110 on the apparatus user side, data input from the operator terminal 604, and programs. The database 605 has a predetermined region including a parameter storing region and a firmware storing region. The parameter storing region stores a variety of parameters including a line parameter. The firmware storing region stores replacement firmware (a new version of firmware) for firmware updating for the image-forming apparatuses 100 and 110.

The control apparatus 606 includes a microcomputer (not graphically represented) composed of a CPU, a ROM, and a RAM, and controls the entire managing apparatus 102. The CPU operates in accordance with the programs (or executes the programs as required), and selectively uses one of the modem 601, the communication terminal 602, and the proxy server 603, thereby realizing a variety of functions as a software transmitting part, a schedule generating part, and a schedule transmitting part.

Figure 10:
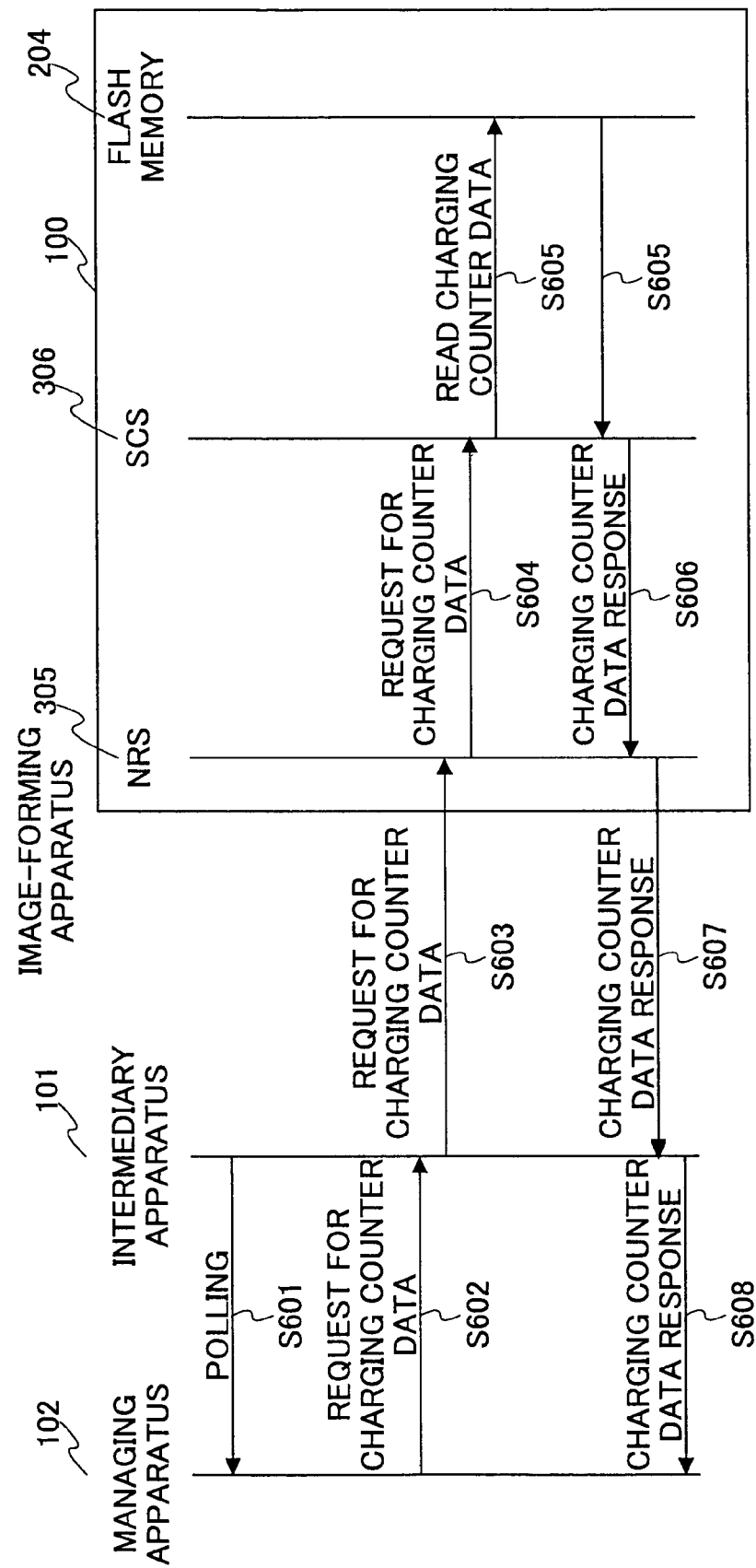
FIG. 10 is a diagram showing a communication sequence in data exchange performed in the image-forming apparatus management system of FIG. 3 according to the present invention.

Based on the above-described configurations, a description is given, with reference to FIG. 10, of a communication sequence in data transmission and reception (data exchange) in the image-forming apparatus management system of FIG. 3. Actually, the below-described operations performed by the SCS 306 and the NRS 305 are performed by the CPU 201 of FIG. 4 operating in accordance with the programs (SCS 306 and NRS 305). For convenience of description, however, the operations are performed by the programs in the following description.

In the following description, the intermediary apparatus 101 refers to any of the intermediary apparatuses 101a through 101c, and the image-forming apparatus 100 refers to any of the image-forming apparatuses 100a through 100f connected to the intermediary apparatus 100.

FIG. 10 is a diagram showing a communication sequence in data exchange among the managing-apparatus 102, the intermediary apparatus 101, and the image-forming apparatus 100.

In this case, first, in step S601, the intermediary apparatus 101 performs polling via the Internet 112 to inquire of the managing apparatus 102 whether the managing apparatus 102 has a transmission request. That is, the intermediary apparatus 101, based on a SOAP message containing polling information to which an identifier, which is self-identification information, is added, generates an HTTP message (including the SOAP message) and transmits the generated HTTP message to the managing apparatus 102 via the Internet.

In step S602, the managing apparatus 102, receiving the HTTP message from the intermediary apparatus 101, generates an HTTP message including a SOAP message containing information indicating a request for charging counter data, and transmits the generated HTTP message to the intermediary apparatus 101 (transmitter of the HTTP message received by the managing apparatus 102) via the Internet 112. At this point, the managing apparatus 102 identifies the intermediary apparatus 101 based on the identifier added to the SOAP message included in the HTTP message received by the managing apparatus 102.

In step S603, the intermediary apparatus 101, receiving the HTTP message from the managing apparatus 102, generates a SOAP message containing information indicating a request for charging counter data based on the received HTTP message, and transmits the generated SOAP message via the network to the NRS 305 of the image-forming apparatus 100 connected to the intermediary apparatus 101.

In step S604, the NRS 305 notifies the SCS 306 of the request for charging counter data described in the SOAP message received from the intermediary apparatus 101.

In step S605, the SCS 306, receiving the notification of the request for charging counter data from the NRS 305, reads the data of a charging counter stored in the flash memory 204 (or in the HDD 208). Then, in step S606, the SCS 306 transmits the read charging counter data (response data) to the NRS 305.

In step S607, the NRS 305, receiving the charging counter data (information indicating a counter value) from the SCS 306, generates a SOAP message containing the data (that is, converts the format of the data to the XML format, which is a structured language format), and transmits the SOAP message to the intermediary apparatus 101 via the network.

In step S608, the intermediary apparatus 101, receiving the SOAP message containing the charging counter data from the NRS 305, generates an HTTP message including the received SOAP message, and transmits the generated HTTP message to the managing apparatus 102 via the Internet.

Thus, data transmission and reception is performed by the above-described communication sequence.

Figure 11:
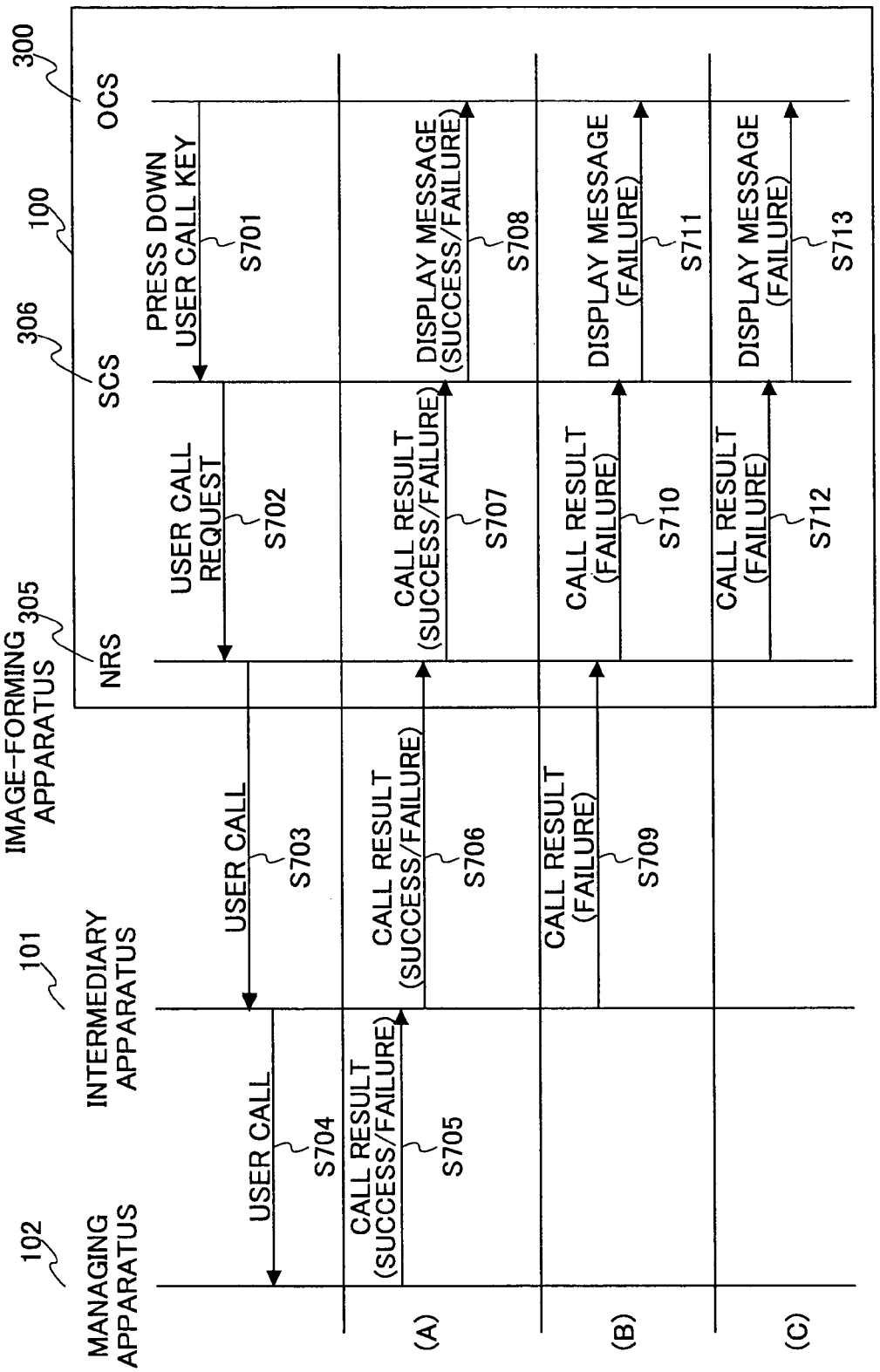
FIG. 11 is a diagram showing a communication sequence in the case of transmitting data from the image-forming apparatus to the managing apparatus according to the present invention.

Next, a description is given, with reference to FIG. 11, of a communication sequence in the case of, unlike the case of FIG. 10, transmitting data from the image-forming apparatus 100 to the managing apparatus 102 via the intermediary apparatus 101.

FIG. 11 is a diagram showing a communication sequence in the case of transmitting data from the image-forming apparatus 100 to the managing apparatus 102 via the intermediary apparatus 101.

In this case, first, in step S701, the OCS 300 notifies the SCS 306 that a user call key (not graphically represented) on the operation part 207 has been pressed down.

In step S702, the SCS 306, receiving the notification that the user call key has been pressed down from the OCS 300, notifies the NRS 305 of a user call request.

In step S703, the NRS 305, receiving the notification of the user call request from the SCS 306, generates a SOAP message containing user call information reporting the user call, and transmits the generated SOAP message to the intermediary apparatus 101 via the network.

In step S704, the intermediary apparatus 101, receiving the SOAP message transmitted from the NRS 305 in step S703, adds an identifier, which is self-identification information, to the received SOAP message. Further, the intermediary apparatus 101 generates an HTTP message including the SOAP message, and making a user call to the managing apparatus 102 via the Internet 112. That is, the intermediary apparatus 101 transmits the HTTP message including the SOAP message containing the user call information to which the identifier is added to the managing apparatus 102 via the Internet 112. A description is given below of three possible operation patterns (A) through (C) after step S704.

In the case of the operation pattern (A), in step S705, the managing apparatus 102 receives the HTTP message including the SOAP message containing the user call information from the intermediary apparatus 101, and generates an HTTP message including a SOAP message containing information indicating the result of the user call (call result information). The information reports the success of the user call if the reception of the HTTP message from the intermediary apparatus 101 ends normally, and the failure of the user call if the reception ends abnormally. Then, the managing apparatus 102 transmits the generated HTTP message to the intermediary apparatus 101 via the Internet 112.

In step S706, the intermediary apparatus 101, receiving the HTTP message including the SOAP message containing the call result information from the managing apparatus 102, generates a SOAP message containing the call result information based on the received HTTP message, and transmits the generated SOAP message via the network to the NRS 305 of the image-forming apparatus 100 in which the user call key was pressed down.

In step S707, the NRS 305, receiving the SOAP message transmitted from the intermediary apparatus 101 in step S706, interprets (or determines) the call result indicated by the SOAP message, and notifies the SCS 306 of the interpreted call result.

The SCS 306 receives the call result, and transmits the received call result to the OCS 300.

In step S708, the OCS 300, receiving the call result from the SCS 306, displays a message indicating the contents of the call result, that is, a message indicating whether the user call has succeeded or failed, on the character display on the operation part 207.

Next, in the case of the operation pattern (B), in step S709, if the intermediary apparatus 101 determines that no response is received from the managing apparatus 102 after a prescribed time (a preset predetermined time) has passed, the intermediary apparatus 101 generates a SOAP message containing call result information to the effect that the user call has failed, and transmits the generated SOAP message to the NRS 305.

In step S710, the NRS 305, receiving the SOAP message indicating the call result of failure, interprets the call result of failure described in the SOAP message, and notifies the SCS 306 of the interpreted call result.

The SCS 306 receives the call result from the NRS 305, and transmits the received call result to the OCS 300.

In step S711, the OCS 300, receiving the call result from the SCS 306, displays a message indicating the contents of the call result, that is, a message indicating the failure of the user call, on the character display on the operation part 207.

In the case of the operation pattern (C), in step S712, if the NRS 305 determines that no response is received from the intermediary apparatus 101 after a prescribed time has passed, the NRS 305 transmits a call result to the effect that the user call has failed to the SCS 306.

The SCS 306 receives the call result from the NRS 305, and transmits the received call result to the OCS 300.

In step S713, the OCS 300, receiving the call result from the SCS 306, displays a message indicating the contents of the call result, that is, a message indicating the failure of the user call, on the character display on the operation part 207.

In the image-forming apparatus 100, the CPU 201, which controls the hardware resources such as the plotter/scanner engine 216 and the operation part 207, monitors the status of each hardware resource. If a predetermined event such as an abnormality occurs in any hardware resource, the CPU 201 detects the event, and performs processing in accordance with the type of the event. Accordingly, reference information to be referred to in determining the type of the event is required. FIG. 12 is a diagram showing a data structure of a table showing reference information for determining the type of the event (abnormality). In FIG. 12, an "SC (serviceperson call)" corresponds to an "abnormality." As shown in FIG. 12, the type of the event is determined based on the detected SC. A description is given below of each type of event.

Events of "TYPE A" are those cannot be canceled by an apparatus user or an "SC reset" from the managing apparatus 102 of the events that require hardware resources to be disabled, displaying "SC" on the character display (display part) on the operation part 207. Such events include, for instance, an SC of the fixing system.

Events of "TYPE B" are SCs that disable a particular function in which an abnormality is detected. In the case of normal operation, that is, if a function in which an abnormality is detected is not selected, "SC" is not displayed on the character display on the operation part 207. However, if the function whose abnormality is detected is selected, "SC" is displayed on the character display. This occurs, for instance, in the case of selecting a duplex mode when a duplex unit includes an abnormality.

Events of "TYPE C" require no "SC" display on the character display on the operation part 207 even when an SC occurs, and only have the occurrence of the SC logged internally. This occurs, for instance, in the case where communication is disabled.

Events of "TYPE D" cause hardware resources to be disabled, displaying "SC" on the character display on the operation part 207. However, the SC can be canceled by switching first off and then on the main power supply (power supply unit) or operating a soft power supply key. The SC may be detected again after the main power supply (power) is turned on so that apparently, the SC may not be canceled. This occurs, for instance, in the case of a motor abnormality. The above-described reference information may be stored in a predetermined storage region of the flash memory 204 (or the HDD 208). The events of different units, such as the SCs of the scanner engine and the SCs of the plotter engine, are processed as different types of events.

In the image-forming apparatus management system of FIG. 3, the CPU 201 of the intermediary apparatus 101 can update (rewrite) the firmware (or other software) of the image-forming apparatus 100 at the request (command) of the managing apparatus 102, the CE terminal (CE apparatus) 105, or the image-forming apparatus 100.

An expatiation is given below, with reference to FIGS. 13 through 22, of a procedure for operating an input screen (display screen) for commanding the updating of the firmware of the image-forming apparatus 100 in the managing apparatus 102.

Figure 13:
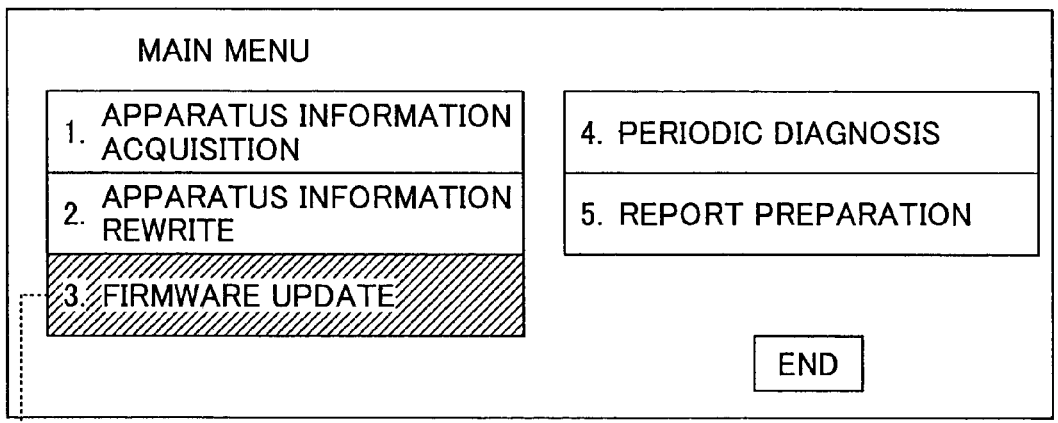
FIG. 13 is a diagram showing a main menu screen displayed on a display (display part) of an operator terminal of the managing apparatus according to the present invention.

FIG. 13 is a diagram showing a main menu screen displayed on the display (display part) of the operator terminal 604 of the managing apparatus 102.

On the main menu screen, there are arranged an APPARATUS INFORMATION ACQUISITION button, an APPARATUS INFORMATION REWRITE button, a FIRMWARE UPDATE button, a PERIODIC DIAGNOSIS button, a REPORT PREPARATION button, and an END button.

When the APPARATUS INFORMATION ACQUISITION button is selected (specified) on the main menu screen by operating the input part such as a pointing device, the operator terminal 604 of the managing apparatus 102 performs the function of acquiring status information that indicates the status of a particular one of the image-forming apparatuses 100. The selected button is displayed in reverse video (shown hatched in the drawings).

When the APPARATUS INFORMATION REWRITE button is selected, the operator terminal 604 performs the function of rewriting (changing) the installation information of a particular one of the image-forming apparatuses 100.

When the FIRMWARE UPDATE button is selected, the operator terminal 604 performs the function of commanding (requesting) the updating of firmware. This firmware updating operation characterizes the present invention.

When the PERIODIC DIAGNOSIS button is selected, the operator terminal 604 performs the function of automatically determining whether a particular one of the image-forming apparatuses 100 is normal or requires maintenance.

When the REPORT PREPARATION button is selected, the operator terminal 604 performs the function of displaying information such as the history of the usage condition and the history of the state of jam of a particular one of the image-forming apparatuses 100.

Figure 14:
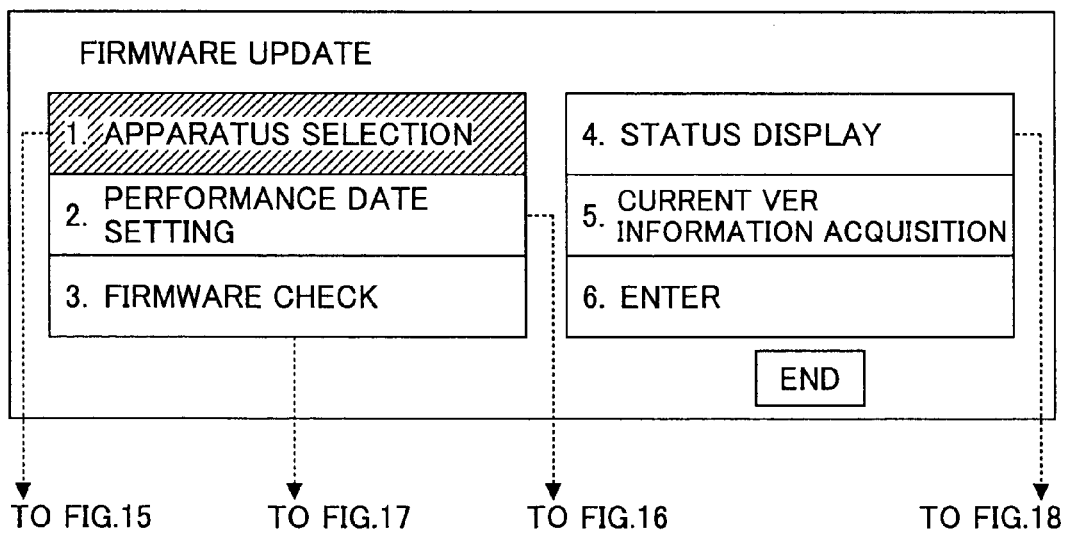
FIG. 14 is a diagram showing a firmware update screen displayed on the display of the operator terminal of the managing apparatus according to the present invention.

FIG. 14 is a diagram showing a firmware update screen displayed on the display of the operator terminal 604 of the managing apparatus 102.

The screen of FIG. 14 is displayed by selecting the FIRMWARE UPDATE button on the main menu screen of FIG. 13. On the screen of FIG. 14, there are arranged an APPARATUS SELECTION button, a PERFORMANCE DATE SETTING button, a FIRMWARE CHECK button, a STATUS DISPLAY button, a CURRENT VERSION (VER) INFORMATION ACQUISITION button.

When the APPARATUS SELECTION button is selected by operating the input part, the operator terminal 604 of the managing apparatus 102 switches (changes) the display screen on the display to an apparatus selection menu screen (FIG. 15) for selecting one of the image-forming apparatuses 100 whose firmware is to be updated (an object apparatus).

When the PERFORMANCE DATE SETTING button is selected, the operator terminal 604 switches the display screen on the display to a performance date setting screen (FIG. 16) for determining the date and time for starting firmware transmission and updating.

When the FIRMWARE CHECK button is selected, the operator terminal 604 switches the display screen on the display to a firmware check screen (FIG. 17) for checking the version of the firmware of each image-forming apparatus 100, the version of the released firmware, and technical information.

When the STATUS DISPLAY button is selected, the operator terminal 604 switches the display screen on the display to a status menu screen (FIG. 18) for displaying the current status of firmware updating.

When the CURRENT VERSION INFORMATION ACQUISITION button is selected, the operator terminal 604 switches the display screen on the display to a screen for acquiring the type and serial number of a selected (specified) one of the image-forming apparatuses 100 and information (version information) indicating the version of the firmware of the selected image-forming apparatus 100.

FIG. 15 is a diagram showing an example of the apparatus selection menu screen displayed on the display of the operator terminal 604 of the managing apparatus 102.

The apparatus selection menu screen is displayed by selecting the APPARATUS SELECTION button on the firmware update screen of FIG. 14. A FILE SPECIFYING button and a MANUAL INPUT button are arranged on the apparatus selection menu screen.

When the FILE SPECIFYING button is selected by operating the input part, the operator terminal 604 of the managing apparatus 102 can capture an object apparatus list file (the file of a list of object apparatuses or apparatuses to be updated) prepared previously in the database 605, and simultaneously specify (select) two or more of the image-forming apparatuses 100 whose firmware is to be updated (object apparatuses) in accordance with the description of the file.

FIG. 22 is a diagram showing a configuration of the object apparatus list file in the database 605. The list file describes a type and serial number, a transmission date and time, an update date and time, and firmware to be updated for each image-forming apparatus 100 whose firmware is to be updated.

The transmission date and time is a date and time (software update date and time) at which the managing apparatus 102 transmits firmware to the intermediary apparatus 101. The transmission date and time is composed of such elements as year, month, day, hour, and minute.

The update date and time is a date and time (software update date and time) at which the firmware of the image-forming apparatus 100 is updated. The update date and time is composed of such elements as year, month, day, hour, and minute.

When the MANUAL INPUT button is selected on the apparatus selection menu screen by operating the input part, the operator terminal 604 of the managing apparatus 102 can specify the image-forming apparatuses 100 whose firmware is to be updated individually by their types and serial numbers.

The specified information is fixed by selecting a SET button.

FIG. 16 is a diagram showing an example of the performance date setting screen displayed on the display of the operator terminal 604 of the managing apparatus 102.

The performance date setting screen is displayed by selecting the PERFORMANCE DATE SETTING button on the firmware update screen of FIG. 14. The transmission date and time and the update date and time of firmware can be input on the performance date setting screen. In the case of FIG. 16, the schedule information of the transmission date and time and the update date and time can be specified (generated) by the managing apparatus 102. The specifying of the schedule information is necessary in order to improve the usability of the entire system by performing firmware updating specifying a time period when the user services provided by the image-forming apparatuses 100 are not used, such as a late-night period. If the contents of the information specified by the object apparatus list file are not identical to the contents of the information input on the performance date setting screen, the contents of the information specified by the object apparatus list file are given priority.

Figure 17:
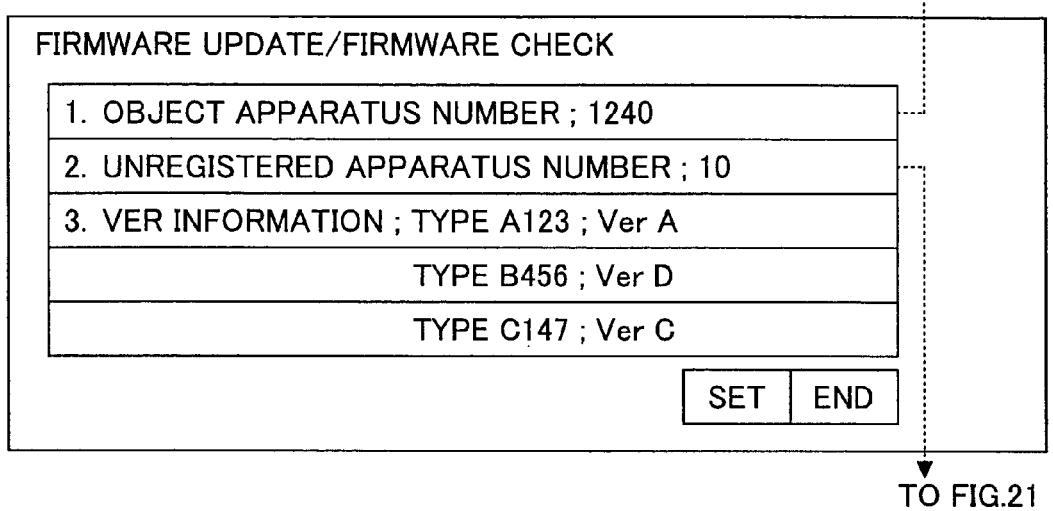
FIG. 17 is a diagram showing a firmware check screen displayed on the display of the operator terminal of the managing apparatus according to the present invention.

FIG. 17 is a diagram showing an example of the firmware check screen displayed on the display of the operator terminal 604 of the managing apparatus 102.

The firmware check screen is displayed by selecting the FIRMWARE CHECK button on the firmware update screen of FIG. 14. The firmware check screen can display information indicating the number of image-forming apparatuses 100 whose firmware is to be updated (the number of object apparatuses), the number of unregistered image-forming apparatuses 100 (the number of unregistered apparatuses), and the version of the firmware currently installed in each image-forming apparatus 100.

The number of object apparatuses is the number of image-forming apparatuses 100 defined by the object apparatus list file or directly input on the apparatus selection menu screen.

The number of unregistered apparatuses is the number of those whose firmware cannot be updated among the image-forming apparatuses 100 whose firmware is to be updated. The firmware may not be downloadable via the Internet 112 depending on the communication environment in which the image-forming apparatus 100 and the intermediary apparatus 101 are installed or the contents of their software. For instance, the firmware is not downloadable via the Internet 112 in an installation environment where communication is performable only via a public line. In the case of FIG. 16, the number of image-forming apparatuses 100 whose firmware cannot be updated for such a reason is presented as the number of unregistered apparatuses.

The version information represents the version of the firmware of each image-forming apparatus 100.

When the number of object apparatuses is selected on the firmware check screen by operating the input part, the operator terminal 604 of the managing apparatus 102 switches the display screen to an object apparatus number detailed screen (FIG. 20). When the number of unregistered apparatuses is selected, the operator terminal 604 switches the display screen to an unregistered apparatus number detailed screen (FIG. 21).

FIG. 20 is a diagram showing an example of the object apparatus number detailed screen displayed on the display of the operator terminal 604 of the managing apparatus 102.

The object apparatus number detailed screen displays, in a list, the type and serial number, the transmission date and time, the update date and time, and the versions of the firmware before and after its update specified for each image-forming apparatus 100 whose firmware is to be updated.

FIG. 21 is a diagram showing an example of the unregistered apparatus number detailed screen displayed on the display of the operator terminal 604 of the managing apparatus 102.

The unregistered apparatus number detailed screen displays, in a list, the type and serial number, the transmission date and time, the update date and time, and the reason why the firmware cannot be updated for each unregistered image-forming apparatus 100.

Figure 18:
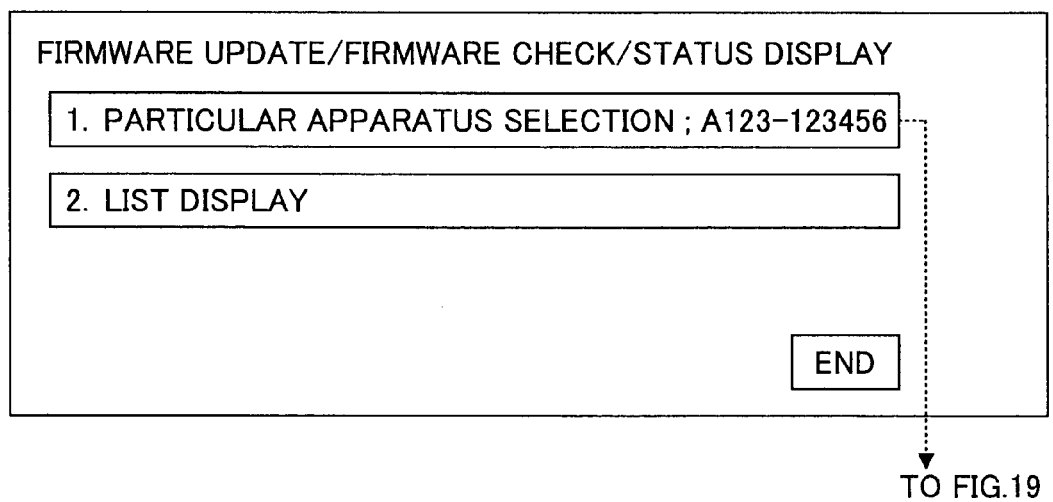
FIG. 18 is a diagram showing a status menu screen displayed on the display of the operator terminal of the managing apparatus according to the present invention.

FIG. 18 is a diagram showing an example of the status menu screen displayed on the display of the operator terminal 604 of the managing apparatus 102.

The status menu screen is displayed by selecting the STATUS DISPLAY button on the firmware update screen of FIG. 14. By inputting the type and serial number of a particular one of the image-forming apparatuses 100 (a particular apparatus) whose status is desired to be checked, the particular image-forming apparatus 100 can be selected and its status can be displayed.

Figure 19:
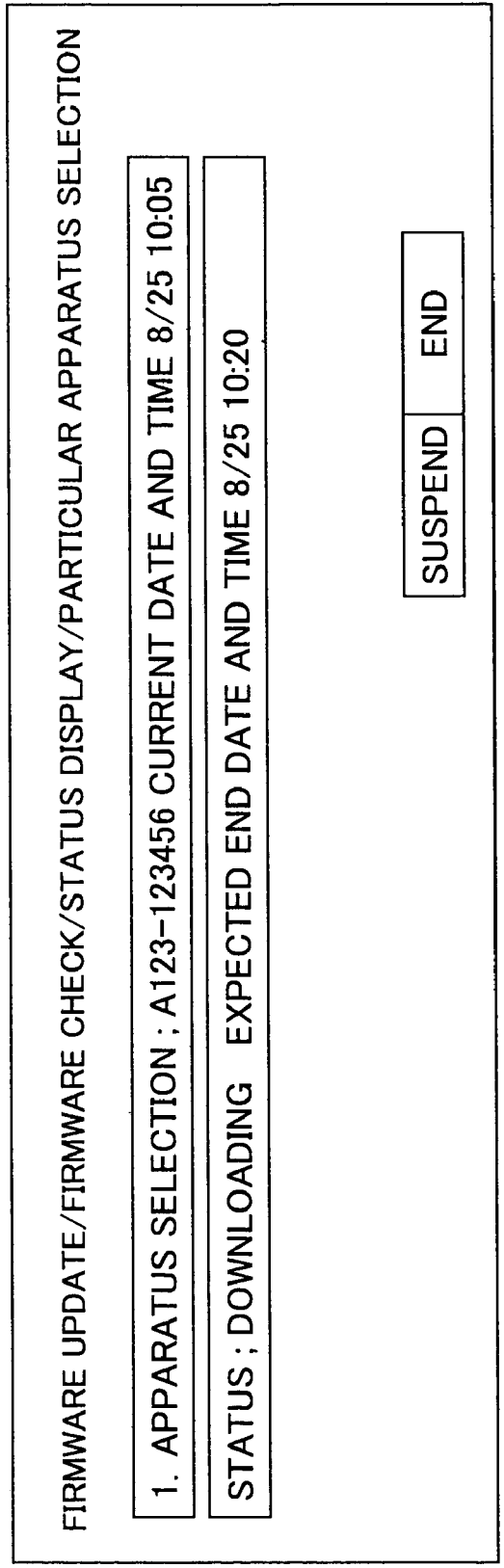
FIG. 19 is a diagram showing an apparatus status screen displayed on the display of the operator terminal of the managing apparatus according to the present invention.

FIG. 19 is a diagram showing an apparatus status screen displayed on the display of the operator terminal 604 of the managing apparatus 102.

The apparatus status screen is displayed by inputting the type and serial number of a particular one of the image-forming apparatuses 100 on the status menu screen of FIG. 18. The apparatus status screen can display the status of the particular image-forming apparatus 100, that is, the current status of firmware downloading to the particular image-forming apparatus 100.

In addition to DOWNLOADING shown in FIG. 19, there are six other types of statuses, which are represented by: CONNECTING, WAITING FOR UPDATING, WAITING FOR DOWNLOADING, UPDATING, UPDATING SUCCEEDED, and UPDATING FAILED. Further, the downloading may be suspended (canceled) by selecting a SUSPEND button in the lower part of the apparatus status screen.

If a touch panel is superimposed on the surface of the display of the operator terminal 604, by directly touching (selecting) buttons provided on the display, the functions corresponding to the touched buttons can be performed.

Next, a description is specifically given of embodiments of the image-forming apparatus 100, the intermediary apparatus 101, and the image-forming apparatus management system, that is, the processing characterizing the present invention (the firmware updating operation by the image-forming apparatus 100).

As previously described, the image-forming apparatus 100 includes the communication part corresponding to the public line 103 and the communication part corresponding to the Internet communication.

The image-forming apparatus 100 is adapted to be able to be subjected to remote management (RS) by a CSS method that communicates with the managing apparatus 102 via the intermediary apparatus 101 and the public line 103 and by an NRS method that communicates with the managing apparatus 102 via the intermediary apparatus 101 and the Internet 112.

The image-forming apparatus 100 includes the NRS 305 corresponding to the NRS method and the CSS 315 corresponding to the CSS method as programs for communicating with the managing apparatus 102.

For convenience of description, embodiments of the processing characterizing the present invention in the case of the image-forming apparatus 100 using the NRS 305 are illustrated below. The processing characterizing the present invention may be performed by the image-forming apparatus 100 using the CSS 315.

First Embodiment

A description is given, with reference to FIGS. 23 through 38, of a first embodiment of the basic operation of the firmware updating operation in the image-forming apparatus management system according to the present invention.

Figure 23:
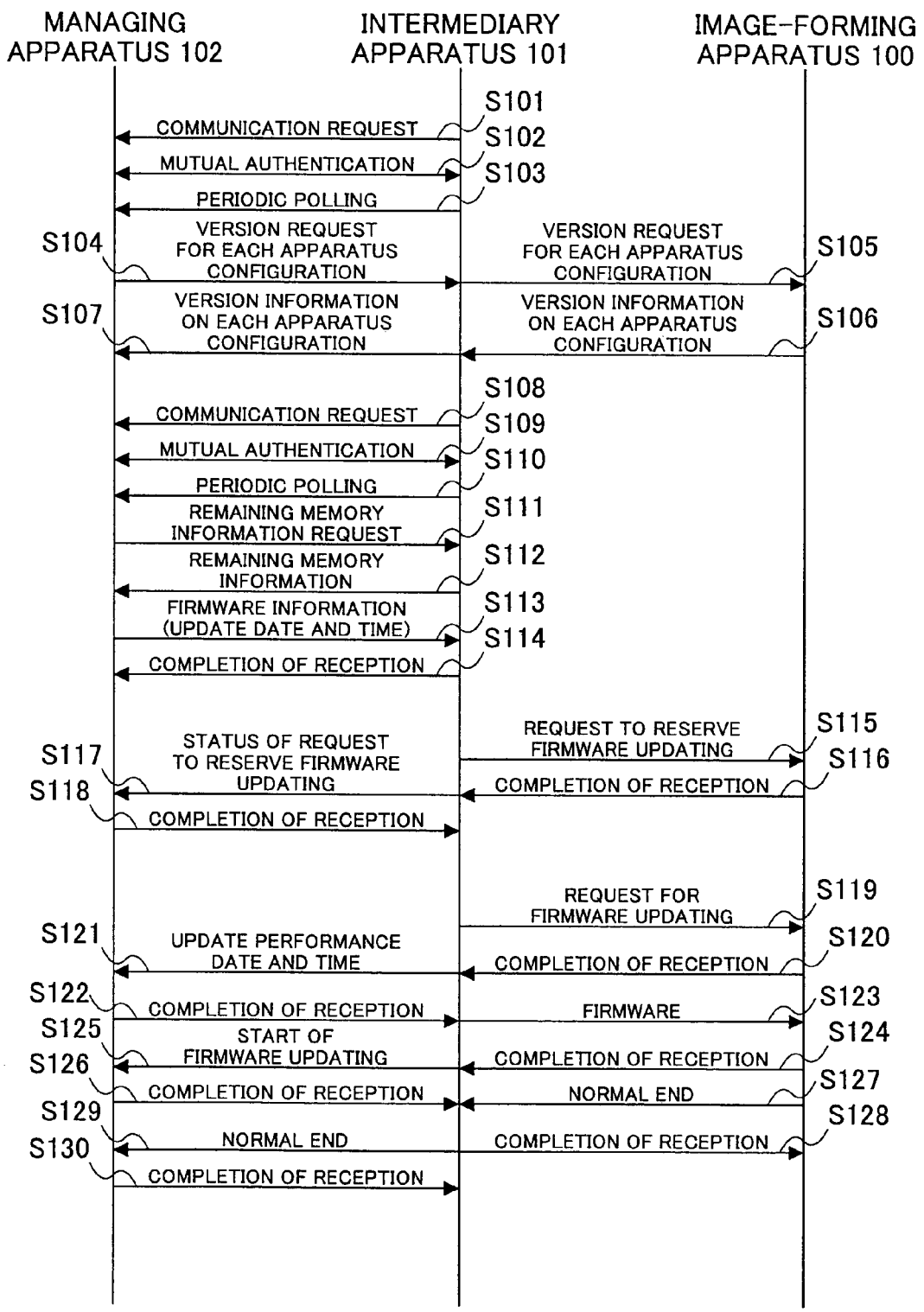
FIG. 23 is a diagram showing a first communication sequence at the time of an firmware updating operation (a first embodiment) in the image-forming apparatus management system according to the present invention.

FIG. 23 is a diagram showing a first communication sequence at the time of the firmware updating operation in the image-forming apparatus management system.

Each intermediary apparatus 101 periodically performs polling to the managing apparatus 102 via the Internet 112.

The managing apparatus 102 sets necessary information (conditions necessary for firmware updating) including the type and serial number, the transmission date and time, and the update date and time of each image-forming apparatus 100 whose firmware is to be updated (object image-forming apparatus 100) input through each of the above-described input screens displayed on the display of the operator terminal 604. Then, the managing apparatus 102 updates a status table (FIG. 25) in the database 605 based on the necessary information. At this point, the managing apparatus 102 adds the records corresponding to the object image-forming apparatuses 100 to the status table, and stores the necessary information including the type and serial number, the transmission date and time, and the update date and time of each object image-forming apparatus 100.

Thereafter, in the case where the ENTER button of the firmware update screen of FIG. 14 is selected, when the current date and time obtained by an RTC (not graphically represented) reaches the transmission date and time specified on the performance date setting screen of FIG. 16 or by the object apparatus list file of FIG. 22, at the timing of a request for communication (a communication request) from any intermediary apparatus 101 (step S101 of FIG. 23), the managing apparatus 102 performs mutual authentication with the intermediary apparatus 101 (step S102) in consideration of security.

In step S103, when the mutual authentication with the managing apparatus 102 is completed, each intermediary apparatus 101 performs periodic polling to the managing apparatus 102. That is, each intermediary apparatus 101 generates an HTTP message including a SOAP message containing polling information (to which an identifier, which is the identification information of the intermediary apparatus 101, is added) and transmits the generated HTTP message to the managing apparatus 102 via the Internet 112. The intermediary apparatus 101 accesses the managing apparatus 102 because access to the intermediary apparatus 101 from the managing apparatus 102 is blocked by the firewall 104.

In step S104, the managing apparatus 102, receiving the HTTP message including the SOAP message containing the polling information from any intermediary apparatus 101 by its periodic polling, generates an HTTP message including a SOAP message containing information indicating a request for the version of the firmware of each image-forming apparatus 100 (version request information), and transmits the generated HTTP message via the Internet 102 to the intermediary apparatus 101 that is the transmitter of the HTTP message including the SOAP message containing the polling information. At this point, the managing apparatus 102 identifies the intermediary apparatus 101 based on the identifier added to the SOAP messaged included in the received HTTP message.

In step S105, the intermediary apparatus 101, receiving the HTTP message including the SOAP message containing the version request information from the managing apparatus 102, generates a SOAP message containing the version request information based on the received HTTP message, and transmits the generated SOAP message via the network to each image-forming apparatus 100 connected to the intermediary apparatus.

In step S106, each image-forming apparatus 100, receiving the SOAP message containing the version request information from the intermediary apparatus 101, reads out the version information of each firmware stored in the flash memory 204 (or the HDD 208) (each firmware program installed in the image-forming apparatus 100), generates a SOAP message containing the version information of each firmware (program), and transmits (reports) the generated SOAP message to the intermediary apparatus 101.

In step S107, the intermediary apparatus 101, acquiring (receiving) the SOAP message of the version information from each image-forming apparatus 100, generates an HTTP message including the SOAP messages containing the version information of the image-forming apparatuses (to which the identifier of the intermediary apparatus 101 is added), and transmits the generated HTTP message to the managing apparatus via the Internet 112. The version information of each image-forming apparatus 100 indicated by the SOAP messages of the HTTP message transmitted to the managing apparatus 102 is reflected on the firmware check screen of FIG. 17, the object apparatus number detailed screen of FIG. 20, and the unregistered apparatus number detailed screen of FIG. 21.

The managing apparatus 102, receiving the HTTP message transmitted from the intermediary apparatus 101 in step S107, recognizes each new version of the firmware for updating for each image-forming apparatus whose firmware requires to be updated (each object image-forming apparatus) based on the received version information.

At the timing of a communication request from the intermediary apparatus 101 (step S108), the managing apparatus 102 again performs mutual authentication with the intermediary apparatus 101 (step S109).

In step S110, when the mutual authentication with the managing apparatus 102 is completed, the intermediary apparatus 101 performs periodic polling to the managing apparatus 102.

In step S111, by the periodic polling from the intermediary apparatus 101, the managing apparatus 102 generates an HTTP message including a SOAP message containing information indicating a request for remaining memory capacity (a request for remaining memory information), and transmits the generated HTTP message to the intermediary apparatus 101 via the Internet 112. The remaining memory information indicates the remaining capacity of the flash memory 54 (or the HDD 63) of the intermediary apparatus 101.

In step S112, the intermediary apparatus 101, receiving the HTTP message transmitted from the managing apparatus 102 in step S111, generates an HTTP message including a SOAP message containing information indicating the remaining capacity of the flash memory 54 (or the HDD 63) (remaining memory information) (to which SOAP message the identifier of the intermediary apparatus 101 is added), and transmits the generated HTTP message to the managing apparatus 102 via the Internet.

In step S113, the managing apparatus 102, receiving the HTTP message transmitted from the intermediary apparatus 101 in step S112, determines whether the remaining capacity of the flash memory 54 of the intermediary apparatus 101 is sufficient for the size of the firmware for updating (the new versions of the firmware) to be transmitted. If the remaining capacity of the flash memory 54 is sufficient, that is, if the entire firmware for updating is storable in the flash memory 54, the managing apparatus 102 generates an HTTP message including a SOAP message containing firmware information including the firmware (programs) for updating, the type and serial number of each object image-forming apparatus 100, and the update date and time specified on the performance date setting screen or by the object apparatus list file, and transmits (downloads) the generated HTTP message to the intermediary apparatus 101 via the Internet 112.

In step S114, the intermediary apparatus 101, receiving the HTTP message transmitted from the managing apparatus 102 in step S113, writes the firmware information to the flash memory 54 (or the HDD 63). At this point, the intermediary apparatus 101 writes the update date and time included in the firmware information to the field of UPDATE DATE AND TIME of the record for the corresponding image-forming apparatus 100 in a status table (FIG. 24) in the flash memory 54. Further, the intermediary apparatus 101 generates an HTTP message including a SOAP message containing information indicating the completion of the reception of the firmware information (to which SOAP message the identifier of the intermediary apparatus 101 is added), and transmits the generated HTTP message to the managing apparatus 102 via the Internet 112.

Thereafter, in step S115, when the current date and time obtained by the RTC 55 reaches the update date and time in the record of the object image-forming apparatus 100, the intermediary apparatus 101 generates a SOAP message containing information indicating a request to reserve firmware updating (reservation request information), and transmits the SOAP message to the object image-forming apparatus 100 via the network.

In step S116, the image-forming apparatus 100, receiving the SOAP message of the reservation request information from the intermediary apparatus 101, causes a time measuring counter (not graphically represented) to start to measure time at the time of the reception, generates a SOAP message containing information indicating the completion of the reception of the request to reserve firmware updating, and transmits the generated SOAP message to the intermediary apparatus 101.

In step S117, the intermediary apparatus 101, receiving the SOAP message transmitted from the image-forming apparatus 100 in step S116, generates an HTTP message including a SOAP message containing information indicating the status of the request to reserve firmware updating to which information the identifier of the intermediary apparatus 101 is added, and transmits the generated HTTP message to the managing apparatus 102 via the Internet 112.

The status of the request to reserve firmware updating of each object image-forming apparatus 100 is stored and managed in the flash memory 54 as a status table as shown in FIG. 24 in the intermediary apparatus 101. On the other hand, the status of the request to reserve firmware updating is stored and managed in the database 605 as a status table as shown in FIG. 25 in the managing apparatus 102.

FIG. 24 is a diagram showing a status table (object apparatus management table) in the flash memory 54 of the intermediary apparatus 101.

FIG. 25 is a diagram showing a status table in the database 605 of the managing apparatus 102.

In the status table of FIG. 24, there are provided the fields of TYPE AND SERIAL NUMBER, UPDATE NECESSITY, UPDATE DATE AND TIME, and COMMENT for each image-forming apparatus 100 connected to the intermediary apparatus 101. In the status table of FIG. 24, seven records are described. This shows that the number of image-forming apparatuses 100 managed by the intermediary apparatus 101 is seven.

If YES is entered in the field of UPDATE NECESSITY, each piece of the firmware of the corresponding image-forming apparatus 100 is to be updated at the command of the managing apparatus 102. On the other hand, if NO is entered in the field of UPDATE NECESSITY, no firmware of the corresponding image-forming apparatus 100 is to be updated. Further, if YES is entered in the field of UPDATE NECESSITY, the update date and time of the firmware is to be entered in the corresponding field of UPDATE DATE AND TIME. In the field of COMMENT, the occurrence of a factor of the cancellation or deferment of firmware updating is entered.

In the status table of FIG. 25, there are provided the fields of TYPE AND SERIAL NUMBER, STATUS, TRANSMISSION RATE 1, TRANSMISSION RATE 2, TRANSMISSION DATE AND TIME, UPDATE DATE AND TIME, UPDATE PERFORMANCE DATE AND TIME, MAIN FIRMWARE, CONTROLLER FIRMWARE, AND DF FIRMWARE for each image-forming apparatus 100 connected to each intermediary apparatus 101. The types and serial numbers of the image-forming apparatuses 100 are entered in their respective fields of TYPE AND SERIAL NUMBER. One of the seven status information items of CONNECTING, DOWNLOADING, WAITING FOR UPDATING, WAITING FOR DOWNLOADING, UPDATING, UPDATING SUCCEEDED, AND UPDATING FAILED.

The transmission rate of the communication between the managing apparatus 102 and the intermediary apparatus 101 is entered in the corresponding field of TRANSMISSION RATE 1, and the transmission rate of the communication between the intermediary apparatus 101 and the image-forming apparatus 100 is entered in the corresponding field of TRANSMISSION RATE 2. Each intermediary apparatus 101 measures these transmission rates and inform the managing apparatus 102 of the measured transmission rates.

The values specified on the performance date setting screen of FIG. 16 or by the object apparatus list file of FIG. 22 are entered in the respective fields of TRANSMISSION DATE AND TIME and UPDATE DATE AND TIME.

The types and versions of the firmware of each image-forming apparatus 100 are entered in the respective fields of MAIN FIRMWARE, CONTROLLER FIRMWARE, and DF FIRMWARE. This information is collected and transmitted to the managing apparatus 102 by each intermediary apparatus 101.

Referring back to FIG. 23, in step S118, the managing apparatus 102, receiving the HTTP message including the SOAP message of the information indicating the status of the request to reserve firmware updating, temporarily stores the received information in an internal memory. Then, the managing apparatus 102 generates an HTTP message including a SOAP message containing information indicating the completion of the reception of the status of the request to reserve firmware updating, and transmits the generated HTTP message to the intermediary apparatus 101 via the Internet 112.

In step S119, the intermediary apparatus 101, after the passage of a predetermined period of time since the reception of the HTTP message transmitted from the managing apparatus 102 in step S118, generates a SOAP message containing information indicating a request for firmware updating, and transmits the generated SOAP message to each object image-forming apparatus 100 (requiring firmware updating).

The object image-forming apparatus 100 has caused its time measuring counter to start to measure time when the object image-forming apparatus 100 received the SOAP message of the reservation request information from the intermediary apparatus 101 in step S116. In step S120, when the object image-forming apparatus 100 receives the SOAP message transmitted from the intermediary apparatus 101 in step S119 before the measured time exceeds a predetermined performance deferment period (predetermined period), the object image-forming apparatus 100, after the passage of the performance deferment period, generates a SOAP message containing information indicating the completion of the reception of the request for firmware updating, and transmits the generated SOAP message to the intermediary apparatus 101.

The object image-forming apparatus 100 waits for the passage of the performance deferment period before the updating of its firmware because the cancellation or deferment of the updating may be commanded or requested during the updating.

Figure 26:
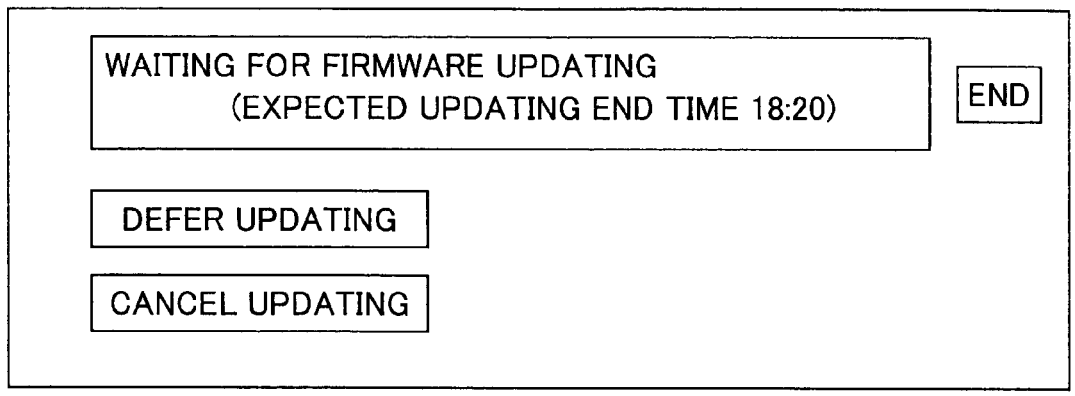
FIG. 26 is a diagram showing an update awaiting screen displayed on a display of an operation part of the image-forming apparatus according to the present invention.

During this performance deferment period, the object image-forming apparatus 100 displays an update awaiting screen as shown in FIG. 26 on the character display of the operation part 207. A message of WAITING FOR FIRMWARE UPDATING is displayed in the upper part of the screen, and below this message, a DEFER UPDATING button and a CANCEL UPDATING button are displayed on the screen.

If the DEFER UPDATING button is selected on the update awaiting screen by operating a key on the operation part 207, a request to defer firmware updating (a firmware updating deferment request) is issued. Therefore, the object image-forming apparatus 100 performs the operation of deferring the updating of its firmware. On the other hand, if the CANCEL UPDATING button is selected, a request to cancel firmware updating (a firmware updating cancellation request) is issued. Therefore, the object image-forming apparatus 100 performs the operation of deferring the updating of its firmware, which is described in detail below.

In step S121, the intermediary apparatus 101, receiving the SOAP message transmitted from the object image-forming apparatus 100 in step S120, employs the current date and time obtained by the RTC 55 as an update performance date and time, generates an HTTP message including a SOAP message containing information indicating the update performance date and time, and transmits the generated HTTP message to the managing apparatus 102 via the Internet 112.

In step S122, the managing apparatus 102, receiving the HTTP message transmitted from the intermediary apparatus 101 in step S121, writes the received update performance date and time to the field of UPDATE PERFORMANCE DATE AND TIME of the record for the corresponding object image-forming apparatus 100 in the status table shown in FIG. 25. The managing apparatus 102 also generates an HTTP message including a SOAP message containing information indicating the completion of the reception of the update performance date and time, and transmits the generated HTTP message to the intermediary apparatus 101 via the Internet 112.

In step S123, the intermediary apparatus 101, receiving the HTTP message transmitted from the managing apparatus 102 in step S122, reads out the firmware programs in the firmware information successively from the flash memory 54, and transmits SOAP messages containing the firmware programs successively to the corresponding object image-forming apparatuses 100.

In step S124, each object image-forming apparatus 100, receiving the SOAP message of the firmware from the intermediary apparatus 101, generates a SOAP message containing information indicating the completion of the reception of the firmware, and transmits the generated SOAP message to the intermediary apparatus 101. The object image-forming apparatus 100 also starts the operation of updating its firmware (stored in the flash memory 204 or the HDD 208) based on the received firmware.

Figure 27:
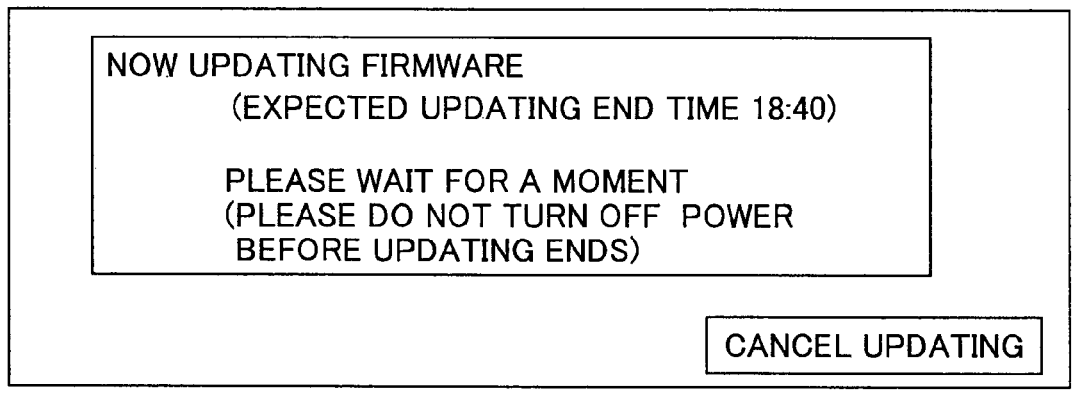
FIG. 27 is a diagram showing a firmware updating screen displayed on the display of the operation part of the image-forming apparatus according to the present invention.
Figure 28:
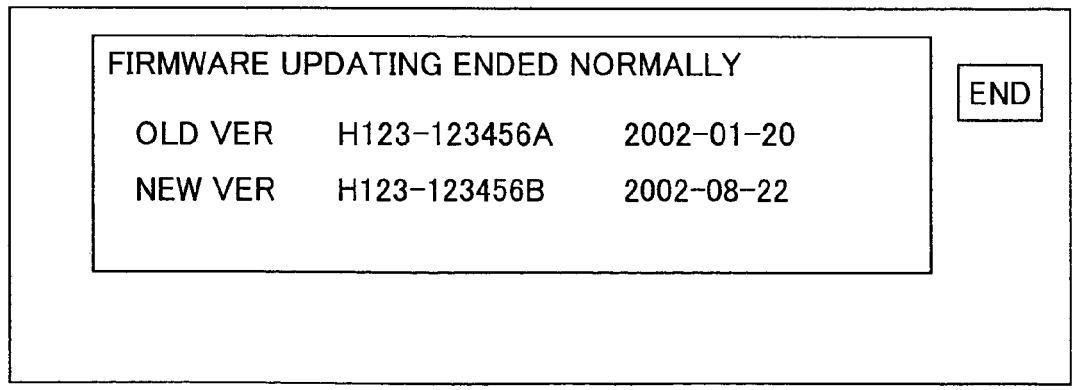
FIG. 28 is a diagram showing a firmware updating end screen displayed on the display of the operation part of the image-forming apparatus according to the present invention.

During the updating of the firmware, each object image-forming apparatus 100 displays a firmware updating screen as shown in FIG. 27 on the character display of the operation part 207. When the updating of the firmware is completed, the object image-forming apparatus 100 displays a firmware updating end screen as shown in FIG. 28 on the character display of the operation part 207. The firmware updating end screen of FIG. 28 corresponds to the completion of the updating of each firmware (program) of the object image-forming apparatus 100.

On the firmware updating screen of FIG. 27, a message of NOW UPDATING FIRMWARE is displayed in the upper part, and below this message, the expected end time of the updating is displayed. Further, below the expected end time, a message of PLEASE WAIT FOR A MOMENT (PLEASE DO NOT TURN OFF POWER BEFORE UPDATING ENDS) is displayed. Further, below this message, a CANCEL UPDATING button is displayed.

On the firmware updating end screen of FIG. 28, a message of FIRMWARE UPDATING HAS ENDED NORMALLY is displayed in the upper part, and below this message, the old version (before the updating) of the firmware and the date and time of its updating, and the new version (after the updating) of the firmware and the date and time of its updating are displayed.

Referring back again to FIG. 23, in step S125, each intermediary apparatus 101, receiving the SOAP message transmitted from the object image-forming apparatus 100 (that has started the updating of its firmware) in step S124, generates an HTTP message including a SOAP message indicating that the updating of the firmware has started in the object image-forming apparatus 100, and transmits the generated HTTP message to the managing apparatus 102 via the Internet 112.

In step S126, the managing apparatus 102, receiving the HTTP message transmitted from the intermediary apparatus 101 in step S125, generates an HTTP message including a SOAP message containing information indicating the completion of the reception of the information indicating that the updating of the firmware has started, and transmits the generated HTTP message to the intermediary apparatus 101 via the Internet 112.

On the other hand, in step S127, every time each object image-forming apparatus 100 receives the SOAP message of the firmware (program), the object image-forming apparatus 100 updates (rewrites) the corresponding firmware (program). After the updating of all the firmware (programs) is completed, the object image-forming apparatus 100 is automatically restarted (rebooted), and it is determined whether each updated firmware (program) is started. If the activation of each firmware (program) is confirmed, the object image-forming apparatus 100 generates a SOAP message containing information indicating that the updating of the firmware has ended normally (the normal ending of the updating), and transmits the generated SOAP message to the intermediary apparatus 102.

In step S128, the intermediary apparatus 101, receiving the SOAP message transmitted from the object image-forming apparatus 100 (that has completed the updating of its firmware), writes NO (UPDATED) to the field of UPDATE NECESSITY of the record corresponding to the object image-forming apparatus in the status table in the flash memory 54. The intermediary apparatus 101 also generates a SOAP message containing information indicating the completion of the reception of the normal ending, and transmits the generated SOAP message to the object image-forming apparatus. Further, in step S129, the intermediary apparatus generates an HTTP message including a SOAP message containing information indicating the normal ending, and transmits the generated HTTP message to the managing apparatus 102 via the Internet 112.

In step S130, the managing apparatus 102, receiving the HTTP message transmitted from the intermediary apparatus 102 in step S129, generates an HTTP message including a SOAP message indicating the completion of the reception of the information indicating the normal ending, and transmits the generated message to the intermediary apparatus 101 via the Internet 112.

Thereby, the basic operation of the firmware updating operation in the image-forming apparatus management system ends.

If two or more of the image-forming apparatuses 100 require the updating of their firmware, the intermediary apparatus 101 may perform the above-described operation on each of the image-forming apparatuses 100 requiring the updating of their firmware. In this case, at the time of reading out from the flash memory 54 (or the HDD 63) the firmware to be transmitted to the object image-forming apparatus 100 whose firmware is to be updated first, the intermediary apparatus 101 copies the firmware so as to prevent the firmware from being erased from the flash memory 54 (or the HDD 63).

At the time of updating the firmware, the image-forming apparatus 100 first writes the firmware received from the intermediary apparatus 101 to a preset predetermined storage region in the flash memory 204 (or the HDD 208), and then reads out the firmware from the storage region to load the firmware into the SDRAM 203, thereby making it possible to perform processing by the firmware.

Figure 29:
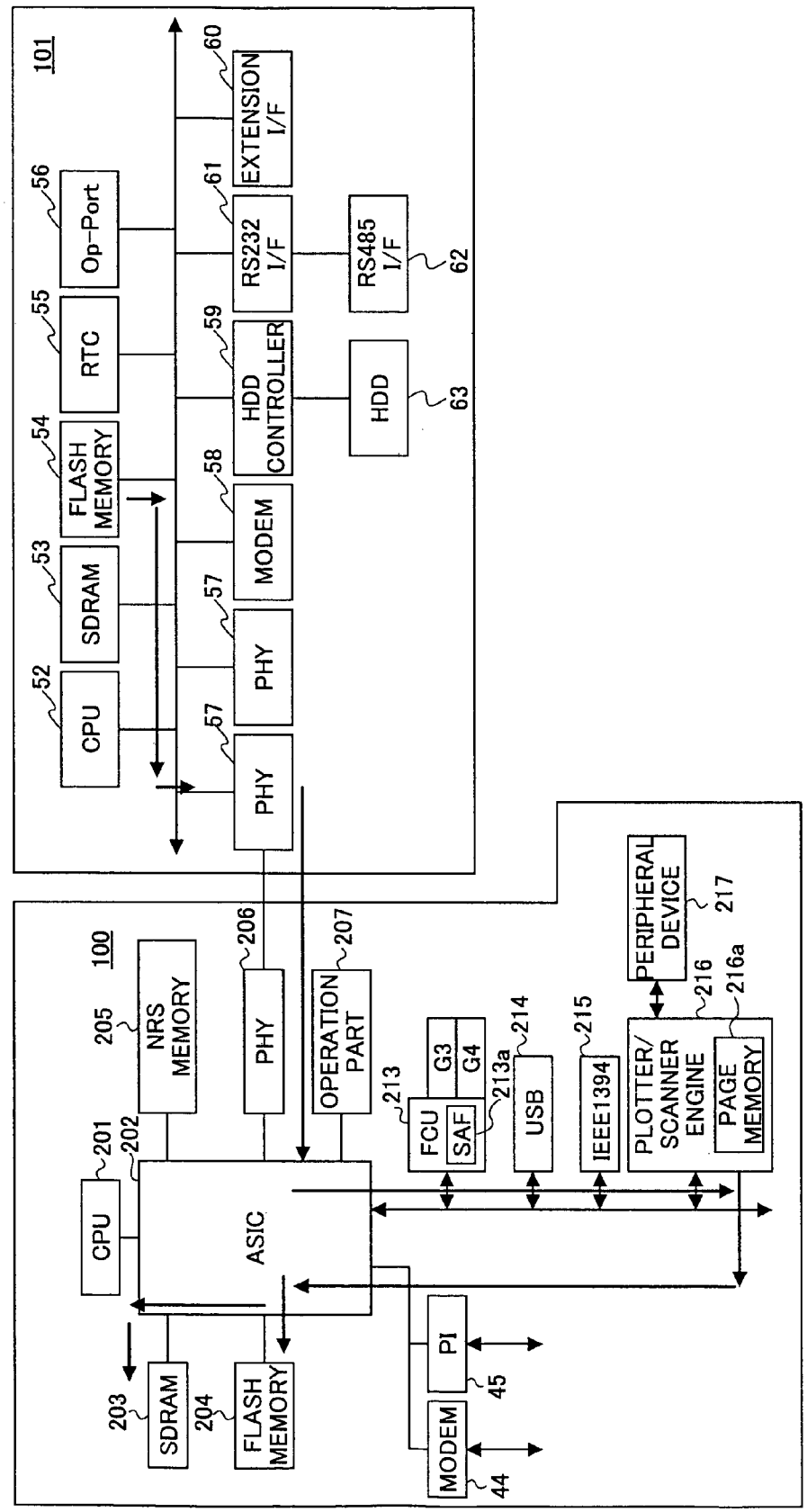
FIG. 29 is a block diagram showing a firmware transfer route from the flash memory of the intermediary apparatus to an SDRAM of the image-forming apparatus according to the present invention.

A description is briefly given, with reference to FIG. 29, of a firmware transfer route from the flash memory 54 of the intermediary apparatus 101 to the SDRAM 203 of the image-forming apparatus 100.

FIG. 29 is a block diagram showing a firmware transfer route from the flash memory 54 of the intermediary apparatus 101 to the SDRAM 203 of the image-forming apparatus 100. The firmware transfer route is indicated by the bold arrows in FIG. 29.

When a new version of the firmware (firmware for updating) stored in the flash memory 54 of the intermediary apparatus 101 is transferred to the image-forming apparatus 100 via the PHY 57 of the intermediary apparatus 101 and the network, the PHY 206 of the image-forming apparatus 100 receives the new version of the firmware, and the ASIC 202 temporarily writes the new version of the firmware to a page memory 216a provided in the plotter/scanner engine (a write/read part) 216. Thereafter, the new version of the firmware is transferred to the flash memory 204 (or the HDD 208) so that the firmware currently stored is updated (that is, the old version of the firmware is overwritten with the new version of the firmware).

Then, the image-forming apparatus 100 is automatically rebooted (restarted) so that the updated firmware in the flash memory 204 is transferred to the SDRAM 203 to be loaded thereinto. The new version of the firmware, which is stored in the flash memory 204 in the compressed form, is decompressed when transferred, and is loaded into the SDRAM 203 to be in the executable form.

The firmware may be updated by the PHY 206 of the image-forming apparatus 100 receiving the new version of the firmware from the intermediary apparatus 101 and the ASIC 202 transferring the received new version of the firmware directly to the flash memory 204 or the HDD 208. Alternatively, the firmware may also be updated by the PHY 206 receiving the new version of the firmware from the intermediary apparatus 101 and the ASIC 202 transferring the new version of the firmware to the flash memory 204 or the HDD 208 after temporarily writing the new version of the firmware to an SAF memory 213a in the FCU 213.

Basically, the updating of the firmware of the image-forming apparatus 100 is performed as described with reference to FIG. 23. However, the updating of the firmware may be suspended (canceled) or deferred at the request (or command) of the operation part 207 of the image-forming apparatus 100 or the managing apparatus 102.

A description is given below, with reference to FIGS. 30 through 38, of the operation of canceling or deferring the updating of the firmware.

Figure 30:
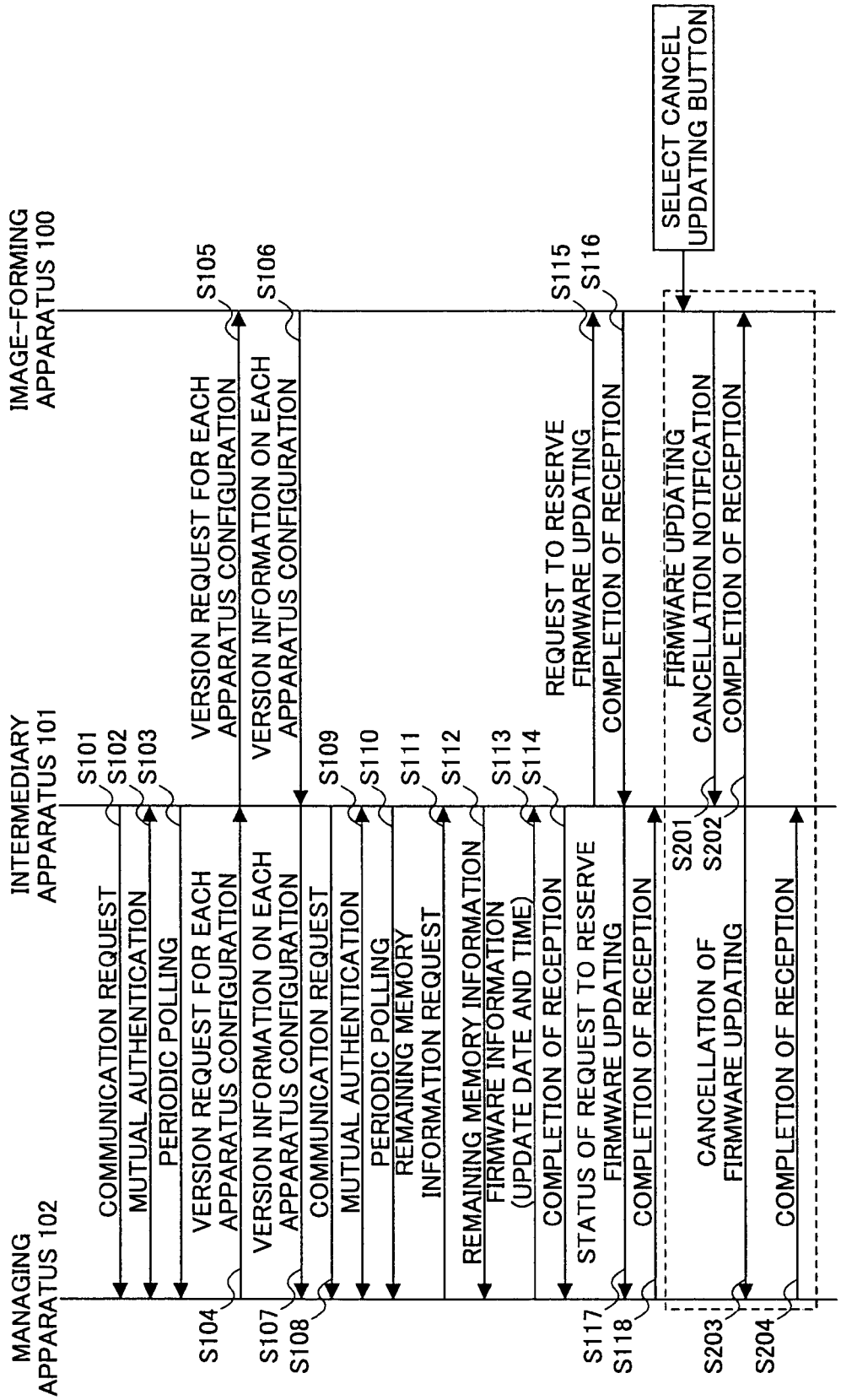
FIG. 30 is a diagram showing a second communication sequence at the time of the firmware updating operation (including an operation in the case where a firmware updating cancellation request is made in the image-forming apparatus) in the image-forming apparatus management system according to the present invention.

FIG. 30 is a diagram showing a second communication sequence at the time of the firmware updating operation in the image-forming apparatus management system. In this case, the firmware updating operation includes the operation in the case where a firmware updating cancellation request is made in the image-forming apparatus 100.

The cancellation of the updating of the firmware is performed when, for instance, a firmware updating cancellation request is issued by selecting the CANCEL UPDATING button on the update awaiting screen of FIG. 26.

The operations of steps S101 through S118 in FIG. 30 are equal to the basic operations of steps S101 through S118 in FIG. 23.

After the time measuring counter of the image-forming apparatus 100 has started to measure time at the time of receiving the SOAP message of the reservation request information from the intermediary apparatus 101 in step S116, if the CANCEL UPDATING button is selected on the update awaiting screen and a firmware updating cancellation request is issued before the measured time exceeds the performance deferment period, in step S201, the image-forming apparatus 100 cancels the updating of the firmware, and generates a SOAP message containing information indicating the updating cancellation request, transmitting the generated SOAP message to the intermediary apparatus 101.

In step S202, the intermediary apparatus 101, receiving the SOAP message transmitted from the image-forming apparatus in step S201, cancels (suspends) the transmission of the firmware. The intermediary apparatus 101 also generates a SOAP message containing information indicating the completion of the reception of the firmware updating cancellation request, and transmits the generated SOAP message to the image-forming apparatus 100. Further, the intermediary apparatus 101 updates the contents of the record of the image-forming apparatus 100 (whose firmware updating has been canceled) in the status table in the flash memory.

A description is given of the record updating.

FIG. 31 is a diagram showing an example of the contents before updating of the record corresponding to the image-forming apparatus 100 requiring the updating of its firmware in the status table in the flash memory 54 of the intermediary apparatus 101. FIG. 32 is a diagram showing an example of the contents of the updated record corresponding to the image-forming apparatus 100.

In the case of FIG. 31, BEFORE CANCELLATION is written to the field of COMMENT of the record No. 2, thereby showing that a firmware updating cancellation request has been issued in the corresponding image-forming apparatus 100.

In step S203, receiving the SOAP message transmitted from the image-forming apparatus 100 in step S202, the intermediary apparatus 101, for instance, as shown in FIG. 32, changes the flag of UPDATE NECESSITY of the record No. 2 to NO, and deletes the corresponding update date and time. Then, the intermediary apparatus 101 changes the description of the corresponding field of COMMENT to AFTER CANCELLATION. Further, the intermediary apparatus 101 generates an HTTP message including a SOAP message containing information indicating that the updating of the firmware of the image-forming apparatus 100 has been canceled (the cancellation of the updating of the firmware of the image-forming apparatus 100), and transmits the generated HTTP message to the managing apparatus 102 via the Internet 112.

Thereby, the entire operation ends.

Figure 33:
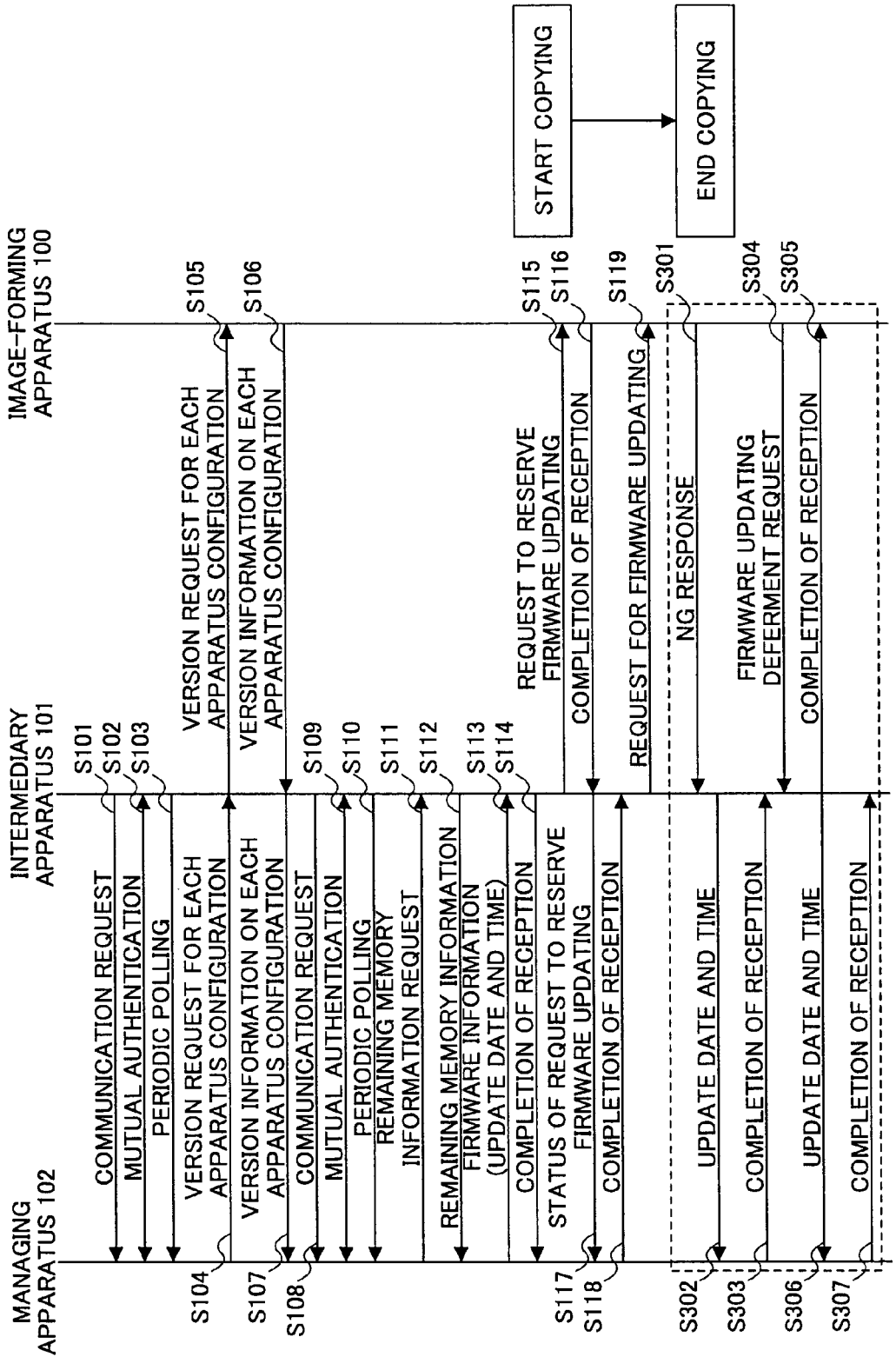
FIG. 33 is a diagram showing a third communication sequence at the time of the firmware updating operation (including an operation in the case where a request to start copying is issued in the image-forming apparatus) in the image-forming apparatus management system according to the present invention.

FIG. 33 is a diagram showing a third communication sequence at the time of the firmware updating operation in the image-forming apparatus management system. In this case, the firmware updating operation includes the operation in the case where a request to start copying (a copy start request) is issued in the image-forming apparatus 100.

The deferment of the updating of the firmware is performed when a copy start request is issued by a key operation (pressing a copy start key) on the operation part 207 or when a firmware updating deferment request is issued by selecting the DEFER UPDATING on the update awaiting screen of FIG. 26.

The operations of steps S101 through S119 in FIG. 33 are equal to the basic operations of steps S101 through S119 in FIG. 23.

When a copy start request is issued by a key operation on the operation part 207 before receiving the SOAP message of the information indicating the request for firmware updating from the intermediary apparatus 101, the image-forming apparatus 100 starts the copying operation of reading the image of an original and forming the image on a recording medium such as a sheet of paper.

When the image-forming apparatus 100 receives the SOAP message of the information indicating the request for firmware updating from the intermediary apparatus 101, in step S301, the image-forming apparatus 100 generates a SOAP message containing information indicating a negative (NG) response (denying the request), and transmits the generated SOAP message to the intermediary apparatus 101.

The intermediary apparatus 101 has the function of checking the status of the image-forming apparatus 100. The intermediary apparatus 101, receiving the SOAP message of the information indicating the NG response from the image-forming apparatus 100, recognizes that the updating of the firmware cannot be performed in the image-forming apparatus 100, and updates the contents of the record of the image-forming apparatus 100 in the status table in the flash memory 54.

FIG. 34 is a diagram showing an example of the contents before updating of the record corresponding to the image-forming apparatus 100 requiring the updating of its firmware in the status table in the flash memory 54 of the intermediary apparatus 101. FIG. 35 is a diagram showing an example of the contents of the updated record corresponding to the image-forming apparatus 100.

In the case of FIG. 34, BEFORE COPYING is written to the field of COMMENT of the record No. 2, thereby showing that a copy start request has been issued in the corresponding image-forming apparatus 100.

In step S302, receiving the SOAP message transmitted from the image-forming apparatus 100 in step S301, the intermediary apparatus 101, for instance, as shown in FIG. 35, rewrites the update date and time in the record corresponding to the image-forming apparatus 100 in the status table in the flash memory 54 with a preset deferment management parameter as shown in FIG. 36 (the update date and time is deferred for 20 minutes in this case), and changes the description of the corresponding field of COMMENT to AFTER COPYING. Then, the intermediary apparatus 101 generates an HTTP message including a SOAP message containing information indicating the new (rewritten) update date and time after the rewriting, and transmits the generated HTTP message to the managing apparatus 102 via the Internet 112 so that the managing apparatus 102 understands the new update date and time after the rewriting.

In step S303, the managing apparatus 102, receiving the HTTP message transmitted from the intermediary apparatus 101 in step S302, rewrites the update date and time in the record corresponding to the image-forming apparatus 100 in the status table in the database 605 with the received new update date and time, and transmits an HTTP message including a SOAP message containing information indicating the completion of the reception of the new update date and time after the rewriting to the intermediary apparatus 101. The new update date and time is to be reflected in the contents of the object apparatus number detailed screen of FIG. 20.

On the other hand, when the copying operation ends, in step S304, the image-forming apparatus 100 generates a SOAP message containing information indicating a firmware updating deferment request, and transmits the generated SOAP request to the intermediary apparatus 101.

The SOAP message of the information indicating the firmware updating deferment request is transmitted after the copying operation ends in order to prevent the occurrence of a deficiency due to updating the firmware immediately after the first copying job (copying operation) is completed in the case of, for instance, executing two or more copying jobs successively by a copy start request.

In step S305, the intermediary apparatus 101, receiving the SOAP message transmitted from the image-forming apparatus 100 in step S304, again rewrites the update date and time in the record corresponding to the image-forming apparatus 100 in the status table with the deferment management parameter. Then, the intermediary apparatus 101 generates a SOAP message containing information indicating the completion of the reception of the firmware updating deferment request, and transmits the generated SOAP message to the image-forming apparatus 100. Further, in step S306, the intermediary apparatus 101 generates an HTTP message including a SOAP message containing information indicating the new (rewritten) update date and time after the rewriting, and transmits the generated HTTP message to the managing apparatus 102 via the Internet 112.

In step S307, the managing apparatus 102, receiving the HTTP message transmitted from the intermediary apparatus 101 in step S306, again rewrites the update date and time in the record corresponding to the image-forming apparatus 100 in the status table in the database 605 with the received new update date and time, and transmits an HTTP message including a SOAP message containing information indicating the completion of the reception of the new update date and time after the rewriting to the intermediary apparatus 101.

Thereafter, when the new update date and time after the rewriting arrives (is reached), the operations of step S115 and the following steps described with reference to FIG. 23 are again performed so that the firmware of the image-forming apparatus 100 is updated.

Thereby, the entire operation ends.

If a firmware updating deferment request is issued by selecting the DEFER UPDATING button on the update awaiting screen of FIG. 26, the image-forming apparatus 100, as in step S304, generates a SOAP message containing information indicating the firmware updating deferment request, and transmits the generated SOAP message to the intermediary apparatus 101. Thereafter, the same operations as those of steps S305 through S307 are performed.

Figure 37:
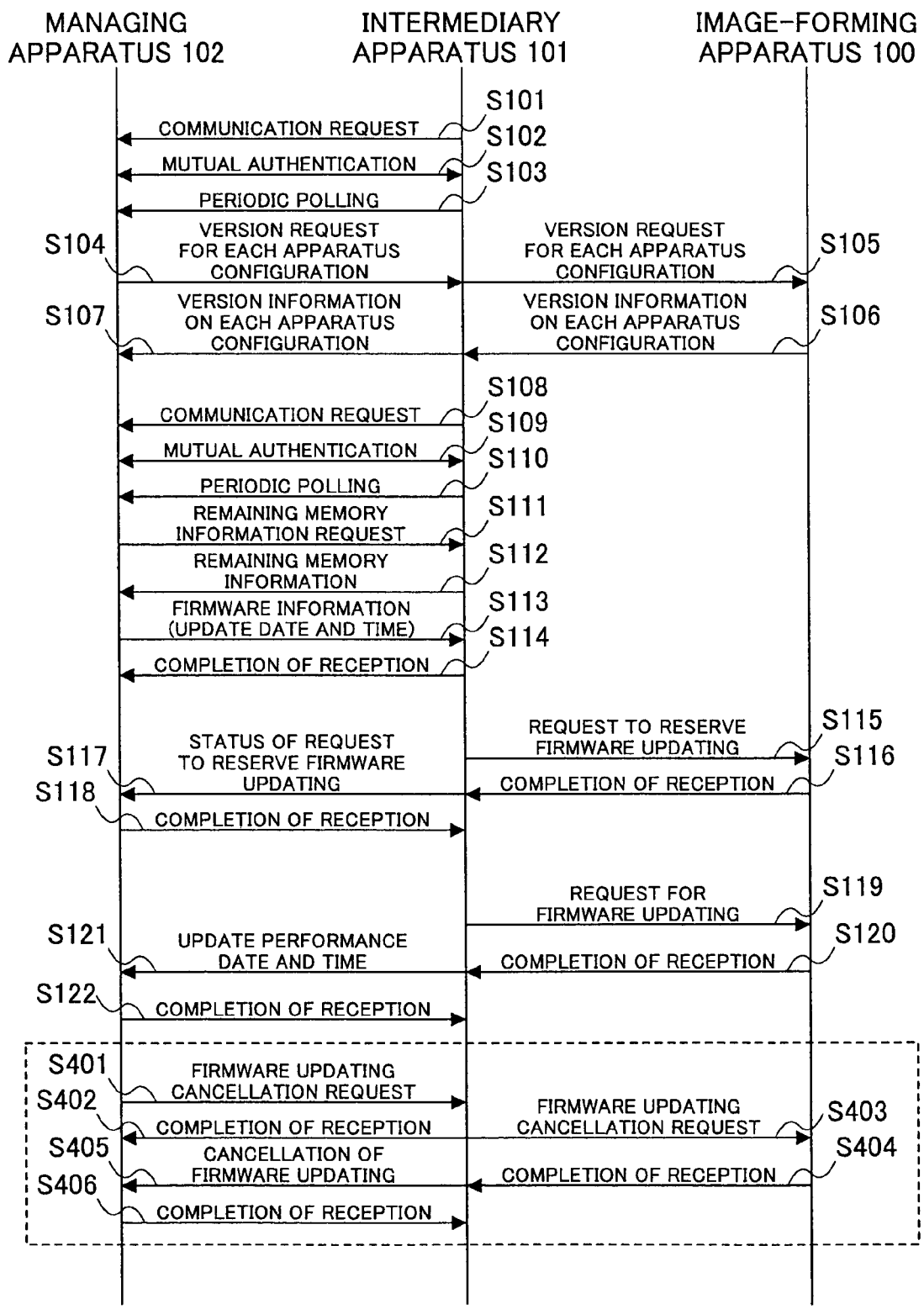
FIG. 37 is a diagram showing a fourth communication sequence at the time of the firmware updating operation (including an operation in the case where a request to cancel firmware updating is issued in the managing apparatus) in the image-forming apparatus management system according to the present invention.

FIG. 37 is a diagram showing a fourth communication sequence at the time of the firmware updating operation in the image-forming apparatus management system. In this case, the firmware updating operation includes the operation in the case where a request to cancel firmware updating (a firmware updating cancellation request) is issued in the managing apparatus 102.

The operations of steps S101 through S122 in FIG. 37 are equal to the basic operations of steps S101 through S122 in FIG. 23.

In step S122, the managing apparatus 102 transmits the HTTP message including the SOAP message of the information indicating the completion of the reception of the update performance date and time to the intermediary apparatus 101 via the Internet 112. Thereafter, if a firmware updating cancellation request is issued by an operation on the operator terminal 604, in step S401, the managing apparatus 102 generates an HTTP message including a SOAP message containing information indicating the firmware updating cancellation request, and transmits the generated HTTP message to the intermediary apparatus 101.

In step S402, the intermediary apparatus 101, receiving the HTTP message transmitted from the managing apparatus 102 in step S401, cancels the transmission of the firmware, generates an HTTP message including a SOAP message containing information indicating the completion of the reception of the firmware updating cancellation request, and transmits the generated HTTP message to the managing apparatus 102. Then, in step S403, the intermediary apparatus 101 transmits a SOAP message containing information indicating the firmware updating cancellation request to the image-forming apparatus 100. Further, the intermediary apparatus 101 updates the contents of the record corresponding to the image-forming apparatus in the status table in the flash memory 54 as previously described.

In step S404, the image-forming apparatus 100, receiving the SOAP message transmitted from the intermediary apparatus 101 in step S403, generates a SOAP message containing information indicating the completion of the reception of the firmware updating cancellation request, and transmits the generated SOAP message to the intermediary apparatus 101.

In step S405, the intermediary apparatus 101, receiving the SOAP message transmitted from the image-forming apparatus 100 in step S404, generates an HTTP message including a SOAP message containing information indicating the cancellation of the updating of the firmware, and transmits the HTTP message to the managing apparatus 102.

In step S406, the managing apparatus 102, receiving the HTTP message transmitted from the intermediary apparatus 101 in step S405, changes the update date and time in the record corresponding to the image-forming apparatus 100 in the status table in the database 605. The managing apparatus 102 also generates an HTTP message including a SOAP message containing information indicating the completion of the reception of the information indicating the cancellation of the updating of the firmware, and transmits the generated HTTP message to the intermediary apparatus 101.

Thereby, the entire operation ends.

Figure 38:
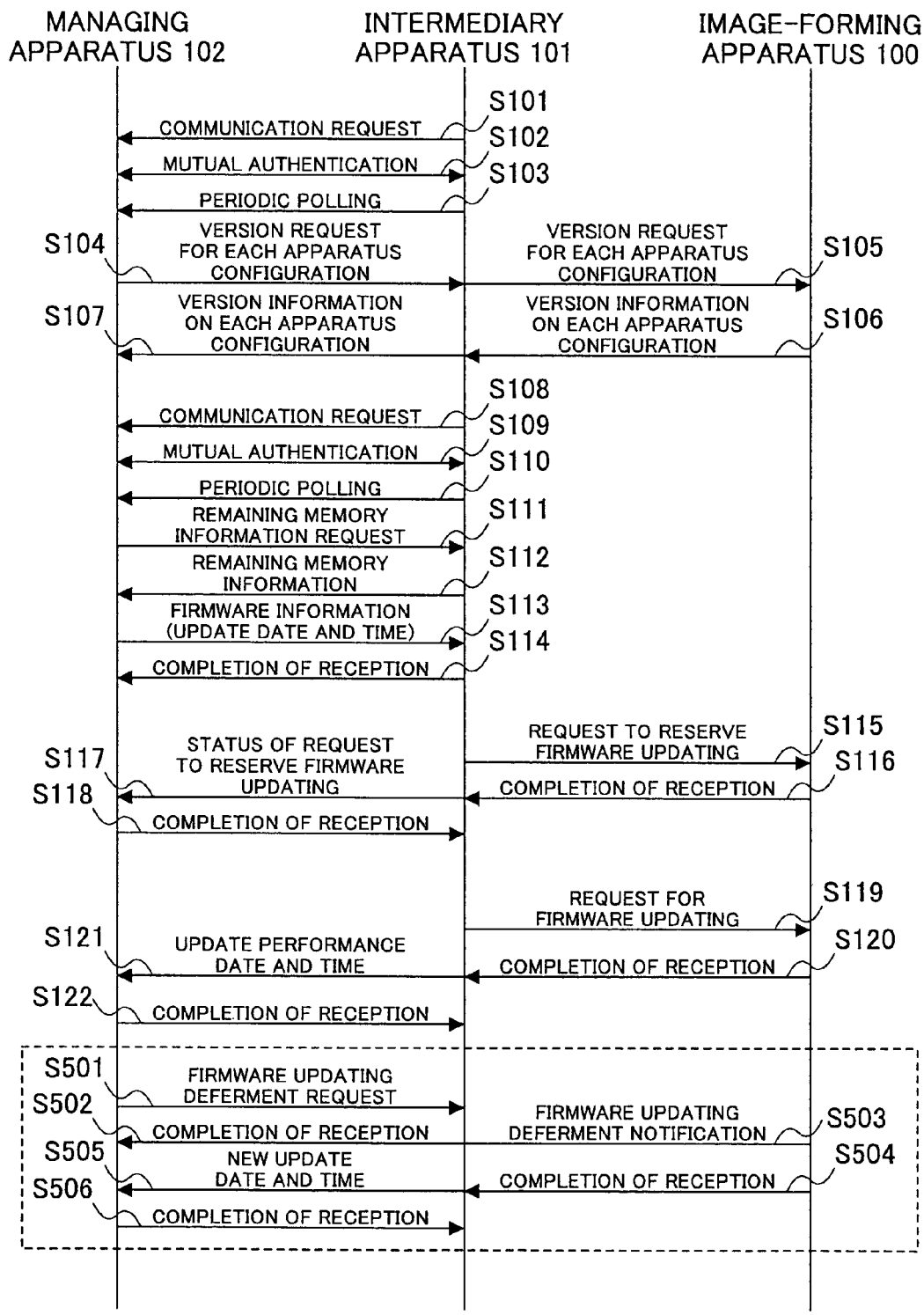
FIG. 38 is a diagram showing a fifth communication sequence at the time of the firmware updating operation (including an operation in the case where a request to defer firmware updating is issued in the managing apparatus) in the image-forming apparatus management system according to the present invention.

FIG. 38 is a diagram showing a fifth communication sequence at the time of the firmware updating operation in the image-forming apparatus management system. In this case, the firmware updating operation includes the operation in the case where a request to defer firmware updating (a firmware updating deferment request) is issued in the managing apparatus 102.

The operations of steps S101 through S122 in FIG. 38 are equal to the basic operations of steps S101 through S122 in FIG. 23.

In step S122, the managing apparatus 102 transmits the HTTP message including the SOAP message of the information indicating the completion of the reception of the update performance date and time to the intermediary apparatus 101 via the Internet 112. Thereafter, if a firmware updating deferment request is issued by an operation on the operator terminal 604, in step S501, the managing apparatus 102 generates an HTTP message including a SOAP message containing information indicating the firmware updating deferment request, and transmits the generated HTTP message to the intermediary apparatus 101.

In step S502, the intermediary apparatus 101, receiving the HTTP message transmitted from the managing apparatus 102 in step S501, cancels the transmission of the firmware, generates an HTTP message including a SOAP message containing information indicating the completion of the reception of the firmware updating deferment request, and transmits the generated HTTP message to the managing apparatus 102. Then, in step S503, as previously described with reference to FIGS. 35 and 36, the intermediary apparatus 101 rewrites the update date and time in the record corresponding to the image-forming apparatus in the status table in the flash memory 54 (the update date and time is deferred for 20 minutes in this case). Further, the intermediary apparatus 101 generates a SOAP message containing information indicating the notification of the firmware updating deferment (a firmware updating deferment notification), and transmits the generated SOAP message to the image-forming apparatus 100.

In step S504, the image-forming apparatus 100, receiving the SOAP message transmitted from the intermediary apparatus 101 in step S503, generates a SOAP message containing information indicating the completion of the reception of the firmware updating deferment notification, and transmits the generated SOAP message to the intermediary apparatus 101.

In step S505, the intermediary apparatus 101, receiving the SOAP message transmitted from the image-forming apparatus 100 in step S504, generates an HTTP message including a SOAP message containing information indicating the new (rewritten) update data and time after the rewriting, and transmits the HTTP message to the managing apparatus 102.

In step S506, the managing apparatus 102, receiving the HTTP message transmitted from the intermediary apparatus 101 in step S505, changes the update date and time in the record corresponding to the image-forming apparatus 100 in the status table in the database 605. The managing apparatus 102 also generates an HTTP message including a SOAP message containing information indicating the completion of the reception of the new update date and time after the rewriting, and transmits the generated HTTP message to the intermediary apparatus 101.

Thereafter, when the new update date and time after the rewriting arrives, the operations of step S115 and the following steps described with reference to FIG. 23 are again performed so that the firmware of the image-forming apparatus 100 is updated.

Thereby, the entire operation ends.

Second Embodiment

A description is given, with reference to FIGS. 30 through 43, of a second embodiment of the basic operation of the firmware updating operation in the image-forming apparatus management system according to the present invention.

According to the first embodiment, the firmware updating operation is started by selecting the ENTER button on the firmware update screen of FIG. 14 after specifying necessary conditions (necessary information) for firmware updating in the managing apparatus 102. On the other hand, according to the second embodiment, necessary conditions for firmware updating are specified in the image-forming apparatus 100, and the firmware updating operation is performed in conjunction with the specified conditions.

First, a description is given of each screen displayed on the operation part 207 (actually on the character display thereof) of each image-forming apparatus 100 for specifying the necessary conditions.

Figure 39:
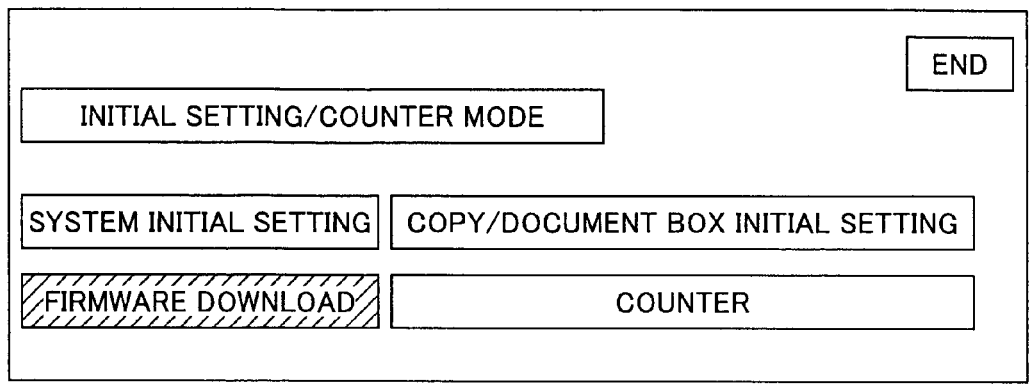
FIG. 39 is a diagram showing a main screen displayed on the operation part of the image-forming apparatus according to a second embodiment of the firmware updating operation of the present invention.

FIG. 39 is a diagram showing a screen (main screen) displayed on the operation part 207 of the image-forming apparatus 100.

Referring to FIG. 39, an INITIAL SETTING/COUNTER MODE button, a SYSTEM INITIAL SETTING button, a COPY/DOCUMENT BOX INITIAL SETTING button, a FIRMWARE DOWNLOAD button, and a COUNTER button are arranged on the screen. The necessary conditions for firmware updating can be input by selecting the FIRMWARE DOWNLOAD button among these buttons.

Figure 40:
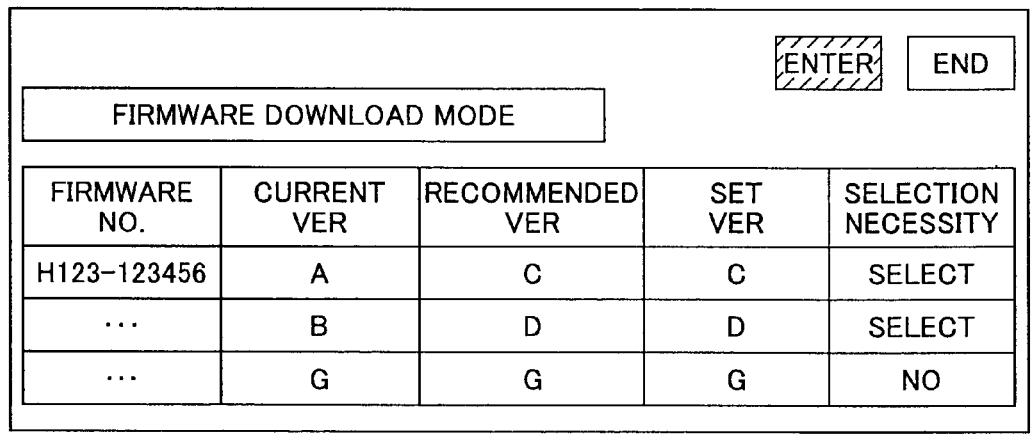
FIG. 40 is a diagram showing a firmware download screen displayed on the operation part of the image-forming apparatus according to the second embodiment of the firmware updating operation of the present invention.

FIG. 40 is a diagram showing a firmware download screen displayed on the operation part 207 of the image-forming apparatus 100.

The firmware download screen is displayed by selecting the FIRMWARE DOWNLOAD button on the main screen. Fields for entering a current version, a recommended version, a set version (a desired version to be set), and the necessity of selection (whether the firmware is to be selected for updating) for each type of the firmware of the image-forming apparatus 100 are arranged on the firmware download screen.

An apparatus user (an operator of the image-forming apparatus 100, using numeric keys, enters a desired version of the firmware to replace its current version in the field of SET VERSION of (the type of) the firmware desired to be updated, and sets SELECT (indicating that the firmware is to be selected for updating) in the corresponding field of SELECTION NECESSITY. Then, the apparatus user selects an ENTER button in the upper right corner of the firmware download screen. As a result, the firmware updating operation is started.

Figure 41:
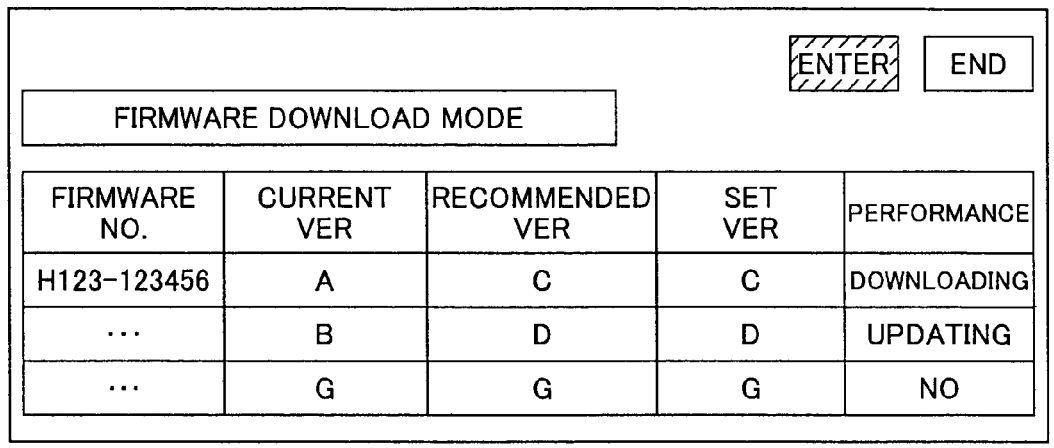
FIG. 41 is a diagram showing an example of the firmware download screen during firmware updating displayed on the operation part of the image-forming apparatus according to the second embodiment of the firmware updating operation of the present invention.

FIG. 41 is a diagram showing an example of the firmware download screen during the updating of the firmware displayed on the operation part 207 of the image-forming apparatus 100.

While the firmware of the image-forming apparatus 100 is being updated, the corresponding rightmost field of PERFORMANCE (PERFORMANCE STATUS) on the firmware download screen is switched from DOWNLOADING to UPDATING.

Figure 42:
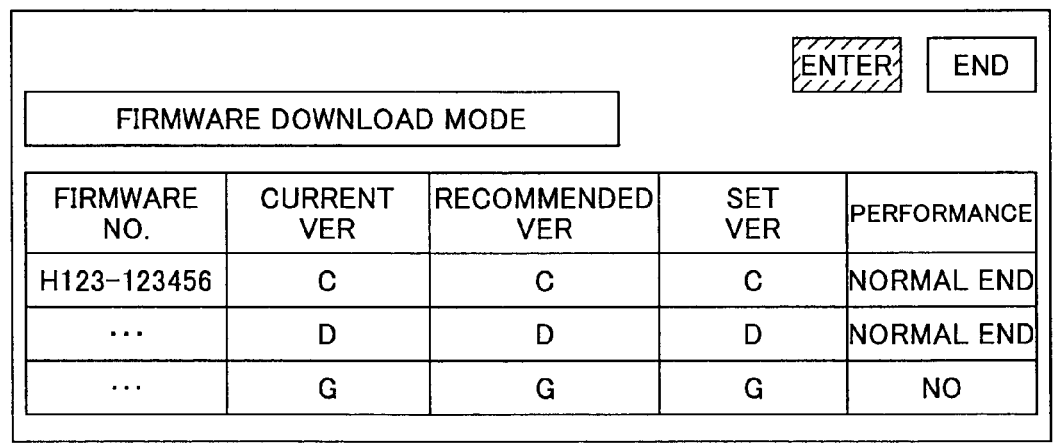
FIG. 42 is a diagram showing an example of the firmware download screen after the firmware updating displayed on the operation part of the image-forming apparatus according to the second embodiment of the firmware updating operation of the present invention.

FIG. 42 is a diagram showing an example of the firmware download screen after the updating of the firmware displayed on the operation part 207 of the image-forming apparatus 100.

After the firmware has been updated, NORMAL END (indicating that the updating of the firmware has been ended normally) is displayed in the corresponding rightmost field of PERFORMANCE.

Figure 43:
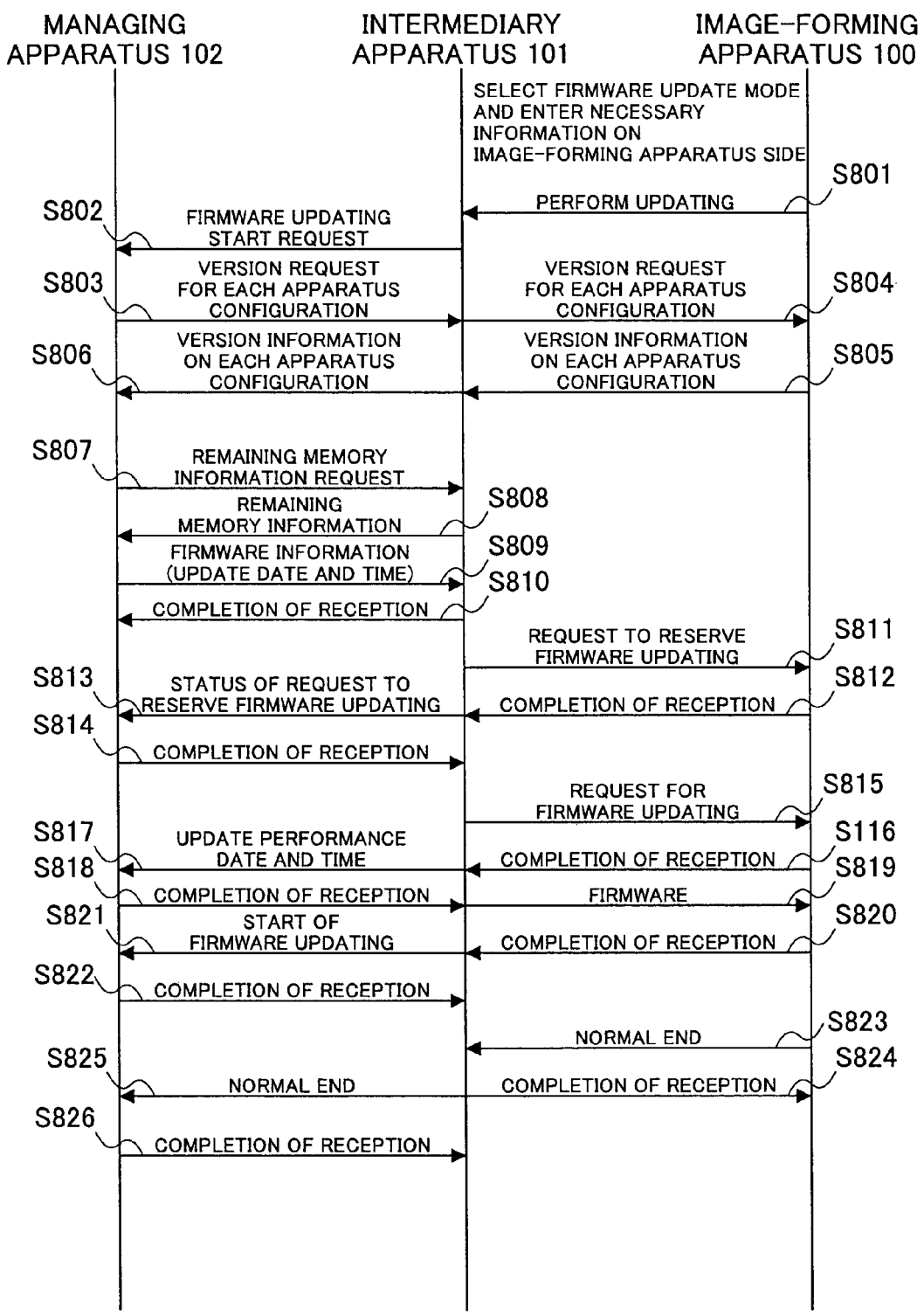
FIG. 43 is a diagram showing a sixth communication sequence at the time of the firmware updating operation (second embodiment) in the image-forming apparatus management system according to the present invention.

Next, a description is given, with reference to FIG. 43, of the second embodiment of the basic operation of the firmware updating operation in the image-forming apparatus management system.

FIG. 43 is a diagram showing a sixth communication sequence at the time of the firmware updating operation in the image-forming apparatus management system.

When the necessary information has been entered on the firmware download screen of FIG. 40, and the ENTER button is selected, in step S801, each image-forming apparatus 100 generates a SOAP message containing information indicating the performance of firmware updating, and transmits the generated SOAP message to the intermediary apparatus 101.

In step S802, the intermediary apparatus 101, receiving the SOAP message transmitted from any image-forming apparatus 100 in step S801, generates an HTTP message including a SOAP message containing information indicating a request to start firmware updating (to which the identifier of the intermediary apparatus 101 is added), and transmits the generated HTTP message to the managing apparatus 102 via the Internet 112.

In step S803, the managing apparatus 102, receiving the HTTP message transmitted from the intermediary apparatus 101 in step S802, generates an HTTP message including a SOAP message containing information a request for the version of the firmware of each image-forming apparatus 100 (version request information), and transmits the generated HTTP message to the intermediary apparatus 101 via the Internet 112. At this point, the managing apparatus 102 identifies the intermediary apparatus 101 based on the identifier added to the SOAP message included in the HTTP message received by the managing apparatus 102.

In step S804, the intermediary apparatus 101, receiving the HTTP message transmitted from the managing apparatus 102 in step S803, generates a SOAP message containing information indicating the version request information based on the received HTTP message, and transmits the generated SOAP message to each (corresponding) image-forming apparatus 100.

In step S805, each image-forming apparatus 100, receiving the SOAP message transmitted from the intermediary apparatus 101 in step S804, reads out the version information of each firmware stored in the flash memory 204 (or the HDD 208) (each firmware program installed in the image-forming apparatus 100) generates a SOAP message containing the version information of each firmware (program), and transmits the generated SOAP message to the intermediary apparatus 101.

In step S806, the intermediary apparatus 101, receiving the SOAP message of the version information from each image-forming apparatus 100, generates an HTTP message including the SOAP messages containing the version information of the image-forming apparatuses (to which the identifier of the intermediary apparatus 101 is added), and transmits the generated HTTP message to the managing apparatus via the Internet 112.

The managing apparatus 102, receiving the HTTP message transmitted from the intermediary apparatus 101 in step S806, recognizes each new version of the firmware for updating to be transmitted based on the received version information.

Next, in step S807, the managing apparatus 102 generates an HTTP message including a SOAP message containing information indicating a request for remaining memory capacity (remaining memory information), and transmits the generated HTTP message to the intermediary apparatus 101 via the Internet 112.

In step S808, the intermediary apparatus 101, receiving the HTTP message transmitted from the managing apparatus 102 in step S807, generates an HTTP message including a SOAP message containing information indicating the remaining capacity of the flash memory 54 (remaining memory information) (to which SOAP message the identifier of the intermediary apparatus 101 is added), and transmits the generated HTTP message to the managing apparatus 102 via the Internet.

In step S809, the managing apparatus 102, receiving the HTTP message transmitted from the intermediary apparatus 101 in step S808, determines whether the remaining capacity of the flash memory 54 of the intermediary apparatus 101 is sufficient for the size of the firmware for updating (the new versions of the firmware) to be transmitted. If the remaining capacity of the flash memory 54 is sufficient, that is, if the entire firmware for updating is storable in the flash memory 54, the managing apparatus 102 generates an HTTP message including a SOAP message containing firmware information including the firmware (programs) for updating and the update date and time specified on the performance date setting screen or by the object apparatus list file, and transmits the generated HTTP message to the intermediary apparatus 101 via the Internet 112.

In step S810, the intermediary apparatus 101, receiving the HTTP message transmitted from the managing apparatus 102 in step S809, writes the firmware information to the flash memory 54. At this point, the intermediary apparatus 101 writes the update date and time included in the firmware information to the field of UPDATE DATE AND TIME of the record for the corresponding image-forming apparatus 100 in the status table (FIG. 24) in the flash memory 54. Further, the intermediary apparatus 101 generates an HTTP message including a SOAP message containing information indicating the completion of the reception of the firmware information (to which SOAP message the identifier of the intermediary apparatus 101 is added), and transmits the generated HTTP message to the managing apparatus 102 via the Internet 112.

Thereafter, in step S811, when the current date and time obtained by the RTC 55 reaches the update date and time in the record of the object image-forming apparatus 100, the intermediary apparatus 101 generates a SOAP message containing information indicating a request to reserve firmware updating (reservation request information), and transmits the SOAP message to the object image-forming apparatus 100 via the network.

In step S812, the image-forming apparatus 100, receiving the SOAP message transmitted from the intermediary apparatus 101 in step S811, generates a SOAP message containing information indicating the completion of the reception of the request to reserve firmware updating, and transmits the generated SOAP message to the intermediary apparatus 101.

In step S813, the intermediary apparatus 101, receiving the SOAP message transmitted from the image-forming apparatus 100 in step S812, generates an HTTP message including a SOAP message containing information indicating the status of the request to reserve firmware updating to which information the identifier of the intermediary apparatus 101 is added, and transmits the generated HTTP message to the managing apparatus 102 via the Internet 112.

In step S814, the managing apparatus 102, receiving the HTTP message transmitted from the intermediary apparatus 101 in step S813, temporarily stores the received information in the internal memory. Then, the managing apparatus 102 generates an HTTP message including a SOAP message containing information indicating the completion of the reception of the status of the request to reserve firmware updating, and transmits the generated HTTP message to the intermediary apparatus 101 via the Internet 112.

In step S815, the intermediary apparatus 101, after the passage of a predetermined period of time since the reception of the HTTP message transmitted from the managing apparatus 102 in step S814, generates a SOAP message containing information indicating a request for firmware updating, and transmits the generated SOAP message to each object image-forming apparatus 100.

In step S816, the object image-forming apparatus 100, receiving the SOAP message transmitted from the intermediary apparatus 101 in step S818, generates a SOAP message containing information indicating the completion of the reception of the request for firmware updating, and transmits the generated SOAP message to the intermediary apparatus 101.

In step S817, the intermediary apparatus 101, receiving the SOAP message transmitted from the object image-forming apparatus 100 in step S816, employs the current date and time obtained by the RTC 55 as an update performance date and time, generates an HTTP message including a SOAP message containing information indicating the update performance date and time, and transmits the generated HTTP message to the managing apparatus 102 via the Internet 112.

In step S818, the managing apparatus 102, receiving the HTTP message transmitted from the intermediary apparatus 101 in step S817, writes the received update performance date and time to the field of UPDATE PERFORMANCE DATE AND TIME of the record for the corresponding object image-forming apparatus 100 in the status table shown in FIG. 25. The managing apparatus 102 also generates an HTTP message including a SOAP message containing information indicating the completion of the reception of the update performance date and time, and transmits the generated HTTP message to the intermediary apparatus 101 via the Internet 112.

In step S819, the intermediary apparatus 101, receiving the HTTP message transmitted from the managing apparatus 102 in step S818, reads out the firmware programs in the firmware information successively from the flash memory 54, and transmits SOAP messages containing the firmware programs successively to the corresponding object image-forming apparatuses 100.

In step S820, each object image-forming apparatus 100, receiving the SOAP message of the firmware from the intermediary apparatus 101, generates a SOAP message containing information indicating the completion of the reception of the firmware, and transmits the generated SOAP message to the intermediary apparatus 101. The object image-forming apparatus 100 also starts the operation of updating its firmware installed therein based on the received firmware.

During the updating of the firmware, each object image-forming apparatus 100 displays a firmware updating screen as shown in FIG. 41 on the character display of the operation part 207. When the updating of the firmware is completed, the object image-forming apparatus 100 displays a firmware updating end screen as shown in FIG. 42 on the character display of the operation part 207.

The following operations of steps S821 through S826 are equal to those of steps S125 through S130 of FIG. 23, and a description thereof is omitted.

Third Embodiment

A description is given, with reference to FIG. 44, of a third embodiment of the basic operation of the firmware updating operation in the image-forming apparatus management system according to the present invention.

According to the first embodiment, the firmware updating operation is started by selecting the ENTER button on the firmware update screen of FIG. 14 after specifying necessary conditions for firmware updating in the managing apparatus 102. According to the second embodiment, the firmware updating operation is started by selecting the ENTER button on the firmware download screen after specifying necessary conditions for firmware updating in the image-forming apparatus 100. On the other hand, according to the third embodiment, necessary conditions for firmware updating are specified in the CE terminal 105 of FIG. 7, and the firmware updating operation is performed in conjunction with the specified conditions.

FIG. 44 is a diagram showing a seventh communication sequence at the time of the firmware updating operation in the image-forming apparatus management system.

The CE terminal 105 is connected via the network to the intermediary apparatus 101. When a communication request such as a request for downloading is issued by operating the input part of the CE terminal 105, such as a keyboard or a pointing device such as a mouse, in step S901, the CE terminal generates a SOAP message containing information indicating the communication request, and transmits the generated SOAP message to the intermediary apparatus 101 via the network.

In step 8902, the intermediary apparatus 101, receiving the SOAP message transmitted from the CE terminal 105 in step S901, reads out initial screen information from the flash memory 54 (or the HDD 63), and transmits the initial screen information to the CE terminal 105. The initial screen information is prestored in the flash memory 54. At the time of prestoring the initial screen information, the intermediary apparatus 101 may acquire the initial screen information from the managing apparatus 102 by generating an HTTP message including a SOAP message containing information requesting for the initial screen information and transmitting the generated HTTP message to the managing apparatus 102. Alternatively, the intermediary apparatus 101 may acquire the initial screen information from the managing apparatus 102 when the intermediary apparatus 101 receives the SOAP message of the information indicating the communication request from the CE terminal 105.

When the CE terminal 105 receives the initial screen information from the intermediary apparatus 101, the CE terminal 105 displays an input screen including buttons for requesting firmware updating on a display based on the initial screen information. The input screen has substantially the same configuration as each of the screens of FIGS. 13 through 21. However, since the CE terminal 105 cannot use the function of preparing a report, the REPORT PREPARATION button cannot be displayed on the main menu screen. Further, the CE terminal 105 cannot use the function of acquiring current version information, the CURRENT VERSION INFORMATION ACQUISITION button cannot be displayed on the firmware update screen.

The CE terminal 105, which displays each input screen on the display, sets input necessary information (necessary conditions for updating) including the type and serial number, the transmission date and time, and the update date and time of each object image-forming apparatus 100, using each input screen, and updates a status table in a database (not graphically represented). Thereafter, when the ENTER button is selected on the firmware update screen, in step S903, the CE terminal 105 generates a SOAP message containing information indicating the necessary information (conditions) and a request to start firmware updating (a firmware updating start request), and transmits the generated SOAP message to the intermediary apparatus 101 via the network.

In step S904, the intermediary apparatus 101, receiving the SOAP message transmitted from the CE terminal 105 in step S903, generates an HTTP message including a SOAP message containing information indicating the firmware updating start request (including the necessary information) based on the received SOAP message, and transmits the generated HTTP message to the managing apparatus 102 via the Internet 112.

The managing apparatus 102, receiving the HTTP message transmitted from the intermediary apparatus 102 in step S904, stores the necessary information added to the firmware updating start request in the database 605. At this point, the managing apparatus 102 updates the status table (FIG. 25) in the database 605 based on the necessary information.

Thereafter, in step S905, the managing apparatus 102 generates an HTTP message including a SOAP message containing information indicating a request for the version of the firmware of each image-forming apparatus 100 (version request information), and transmits the generated HTTP message to the intermediary apparatus 101. At this point, the managing apparatus 102 identifies the intermediary apparatus 101 based on the identifier added to the SOAP messaged included in the received HTTP message.

The following operations of steps S906 through S928 are equal to those of steps S804 through S826 of FIG. 43.

According to the first through third embodiments, the managing apparatus 102 generates (stores in the status table in the database 605) the schedule information of the transmission date and time and the update date and time input through the corresponding input screens. However, the schedule information may be generated automatically as follows.

The intermediary apparatus 101 measures the transmission rate 1 between the intermediary apparatus 101 and the managing apparatus 102 and the transmission rates 2 between the intermediary apparatus 101 and the image-forming apparatuses 100 or only the object image-forming apparatuses 100 requiring firmware updating. Then, the intermediary apparatus 101 generates an HTTP message including a SOAP message containing information indicating the measured transmission rates 1 and 2, and transmits (reports) the generated HTTP message to the managing apparatus 102.

The managing apparatus 102 generates the schedule information based on the amount of data of the firmware to be transmitted to the intermediary apparatus 101 and the transmission rates 1 and 2 received from the intermediary apparatus 101.

By thus automatically generating the schedule information, workload on a center operator can be reduced.

Fourth Embodiment

Next, a description is given, with reference to FIGS. 45A through 47, of a fourth embodiment of the basic operation of the firmware updating operation in the image-forming apparatus management system according to the present invention.

According to the fourth embodiment, as in the first embodiment, the firmware updating operation is started by selecting the ENTER button on the firmware update screen of FIG. 14 after specifying necessary conditions (necessary information) for firmware updating in the managing apparatus 102. However, when the PERFORMANCE DATE SETTING button is selected on the firmware update screen of FIG. 14, the display screen on the display is switched to a performance date setting screen for determining an update start date and time (update date and time) for starting firmware updating and an update end date and time for forcing firmware updating to terminate. The performance date setting screen according to the fourth embodiment replaces the field of TRANSMISSION DATE AND TIME with the field of UPDATE END DATE AND TIME. In accordance with this change, in the status table (FIG. 25) in the database 605 of the managing apparatus 102, the field of TRANSMISSION DATE AND TIME is replaced with the field of UPDATE END DATE AND TIME.

As in the first through third embodiments, the communication between the intermediary apparatus 101 and each image-forming apparatus 100 on the apparatus user side is also performed based on SOAP in the fourth embodiment as well as the below-described fifth embodiment. A detailed description thereof is omitted. Further, this communication employs FTP as a subordinate protocol to SOAP. However, since FTP is well-known, a description thereof is omitted except for a part concerning an ID and a password for FTP. Further, as in the first through third embodiments, the communication between the intermediary apparatus 101 and the managing apparatus 102 is also performed using SOAP and HTTP as a subordinate protocol to SOAP in the fourth and fifth embodiments, and a description thereof is omitted. Further, a description of the internal communication of the managing apparatus 102, which also employs SOAP, is omitted.

Figure 45A:
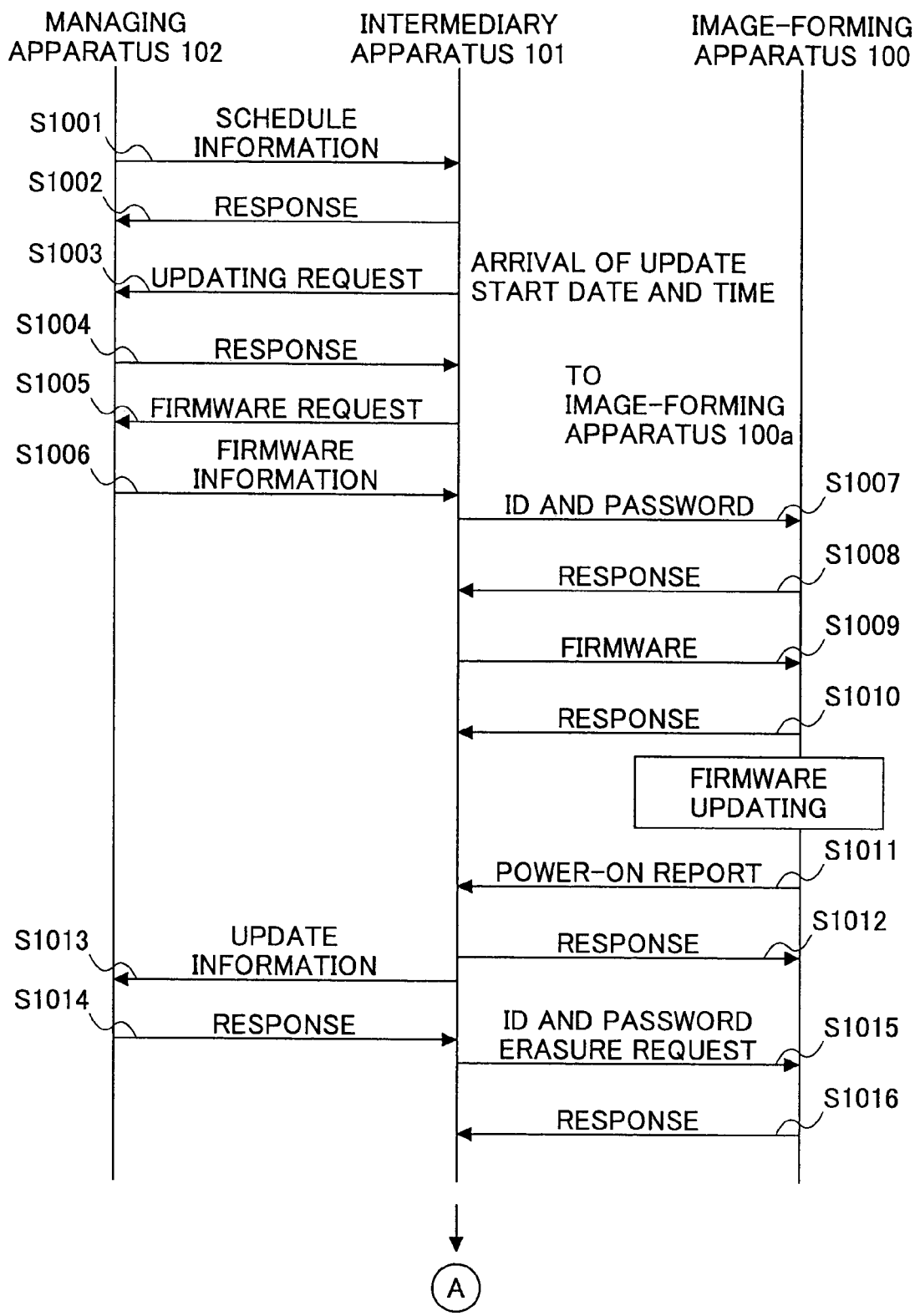

FIGS. 45A and 45B are diagrams showing an eighth communication sequence at the time of the firmware updating operation in the image-forming apparatus management system according to the present invention.

FIG. 46 is a diagram showing a status table (an object apparatus management table) in the flash memory 54 of the intermediary apparatus 101.

In the status table of FIG. 46, there are provided the fields of TYPE AND SERIAL NUMBER, UPDATE START DATE AND TIME, UPDATE END DATE AND TIME, AND UPDATE RESULT for each image-forming apparatus 100 connected to the intermediary apparatus 101. In FIG. 46, three records are described. This shows that the number of image-forming apparatuses 100 managed by the intermediary apparatus 101 are three.

The update start date and time corresponds to the above-described update date and time.

The update end date and time is an expiration date and time at which the validity of firmware updating expires and the firmware updating is forced to terminate.

The update result corresponds to the combination of update necessity and comment of FIG. 24. In the field of UPDATE RESULT, such a message as ERROR indicating the occurrence of a factor of the cancellation or deferment of firmware updating, UPDATING COMPLETED indicating the completion of firmware updating, or WAITING FOR RE-UPDATING indicating that the firmware waits to be re-updated.

FIGS. 47A and 47B are diagrams showing formats of information on the communication between the controller 606 of the managing apparatus 102 and the intermediary apparatus 101. FIG. 47A shows firmware updating request information (formed of a SOAP message) indicating a firmware updating request transmitted from the controller 606 to the proxy server 603. FIG. 47B shows schedule information (formed of, for instance, an HTTP message including a SOAP message) transmitted from the proxy server 603 to the intermediary apparatus 101. In FIG. 47B, intermediary apparatus information corresponds to the identifier or IP address of the intermediary apparatus 101 to which the object image-forming apparatus (apparatuses) 100 is (are) connected.

The controller 606 of the managing apparatus 102 sets necessary information (conditions necessary for firmware updating) including the type and serial number, the update start date and time, and the update end date and time of each object image-forming apparatus 100 (whose firmware is to be updated), the necessary information being input using each input screen displayed on the display of the operator terminal 604, and updates the status table in the database 605 based on the input necessary information. Thereafter, when the ENTER button is selected on the firmware update screen, the controller 606 generates firmware updating request information (the type and serial number, the update start date and time, and the update end date and time of each object image-forming apparatus 100) as shown in FIG. 47A, and transmits the generated information to the proxy server (communication server) 603 via the network such as a LAN. In this case, for convenience of description, the object apparatuses (requiring firmware updating) are the two image-forming apparatuses 100a and 100b shown in FIG. 3.

Referring to FIG. 45A, in step S1001, the proxy server 603 of the managing apparatus 102, receiving the firmware updating request information from the controller 606, generates schedule information (intermediary apparatus information, the type and serial number, the update start date and time, and the update end date and time of each of the image-forming apparatuses 100a and 100b) to be transmitted to the intermediary apparatus 101a as shown in FIG. 47B, and transmits the generated information to the intermediary apparatus 101a in timing with the polling therefrom. The proxy server 603 may perform mutual authentication with the intermediary apparatus 101a before the transmission of the generated schedule information.

In step S1002, the intermediary apparatus 10a, receiving the schedule information from the managing apparatus 102, writes the schedule information except for the intermediary apparatus information to the records corresponding to the image-forming apparatuses 100a and 100b in the status table in the flash memory 54 (or the HDD 63). The intermediary apparatus 101a also generates response information (or information indicating the completion of the reception of the schedule information), and transmits the response information to the managing apparatus 102. Thereafter, in step S1003, when the current date and time obtained by the RTC (internal clock) reaches the update start date and time of each of the records corresponding to the image-forming apparatuses 100a and 100b (FIG. 46), the intermediary apparatus 101a generates updating request information indicating a request for firmware updating, and transmits the generated information to the managing apparatus 102.

In step S1004, the proxy server 603 of the managing apparatus 102, receiving the updating request information from the intermediary information 101a after receiving the response information responding to the transmitted schedule information, generates response information (or information indicating the completion of the reception of the request for firmware updating), and transmits the response information to the intermediary apparatus 101a.

In step S1005, the intermediary apparatus 101a, receiving from the managing apparatus 102 the response information responding to the transmitted updating request information, generates firmware request information indicating a request for firmware (including the type and serial number and the version information of the firmware of each of the object image-forming apparatuses 10a and 100b), and transmits the generated information to the managing apparatus 102. The version information of the firmware of each of the image-forming apparatuses 100a and 100b connected to the intermediary apparatus 101a is prestored in the flash memory 54 (or the HDD 63).

The proxy server 603 of the managing apparatus 102, receiving the firmware request information from the intermediary apparatus 101a, transmits the firmware request information to the controller 606.

The controller 606, receiving the firmware request information from the proxy server 603, reads out the firmware for updating corresponding to the image-forming apparatuses 100a and 100b from the database 605. In this case, the same version of the firmware is required to update the firmware of each of the image-forming apparatuses 100a and 100b, and therefore, the number of firmware programs read out from the database 605 is one. Then, the controller 606 generates firmware information containing the read-out firmware and the type and serial number of each of the image-forming apparatuses 10a and 100b, and transmits the generated information to the proxy server 603.

In step S1006, the proxy server 603, receiving the firmware information from the controller 606, transmits the firmware information to the intermediary apparatus 101a.

The intermediary apparatus 101a, receiving the firmware information from the managing apparatus 102, writes the firmware information to the flash memory 54 (or the HDD 63), and transmits the firmware information to the image-forming apparatuses 10a and 100b successively, using FTP. Accordingly, prior to the transmission of the firmware information., in step S1007, the intermediary apparatus 101a first transmits an ID and a password for FTP to the image-forming apparatus 100a, requesting connection by FTP.

The ID and the password for FTP are preset in the intermediary apparatus 101, and are stored in both the intermediary apparatus 101 and the image-forming apparatuses 100. The ID and the password comply with the FTP standard. The image-forming apparatus 100 that is required to establish connection can authenticate the intermediary apparatus 100 to which the image-forming apparatuses 100 is connected by the ID and the password.

In step S1008, the image-forming apparatus 100a, receiving the ID and the password from the intermediary apparatus 101a, compares the received ID and password with the preset (stored) ID and password. If the received ID and password are identical to the preset ID and password, the image-forming apparatus 100a determines that the intermediary apparatus 101a has been successfully authenticated and establishes connection therewith, transmitting response information (or authentication success information indicating the success of authentication) to the intermediary apparatus 101a. If the received ID and password are not identical to the preset ID and password, the image-forming apparatus 100a does not transmit response information to the intermediary apparatus 101a. Alternatively, in this case, the image-forming apparatus 100a may transmit authentication failure information indicating the failure of authentication to the intermediary apparatus 101a.

In step S1009, the intermediary apparatus 101a, receiving the response information transmitted from the image-forming apparatus 100a in step S1008, transmits the firmware in the firmware information in the flash memory 54 together with the ID and the password to the image-forming apparatus 100a. At this point, the intermediary apparatus 101a copies the firmware so as to prevent the firmware from being erased from the flash memory 54.

In step S1010, the image-forming apparatus 100a, receiving the firmware from the intermediary apparatus 101a, generates response information (or information indicating the reception of the firmware) to the intermediary apparatus 101a, and starts the updating of the firmware installed in the image-forming apparatus 100a (the firmware stored in the flash memory 204 or the HDD 208) based on the received firmware.

In step S1011, when the updating of the firmware ends or is completed, the image-forming apparatus 101a is automatically rebooted (restarted), and it is determined whether the updated firmware starts. If it is determined that the updated firmware starts, the image-forming apparatus 101a generates power-on report information (including the version information of the updated firmware) reporting that power is turned on, and transmits the generated information to the intermediary apparatus 101a.

In step S1012, the intermediary apparatus 101a, receiving the power-on report information from the image-forming apparatus 100a after receiving the response information responding to the transmitted firmware, generates response information (or information indicating the reception of the power-on report information), and transmits the generated information to the image-forming apparatus 101a.

Further, in step S1013, the intermediary apparatus 101a compares the version information included in the received power-on report information with the version information of the firmware of the image-forming apparatus 100a prestored in the flash memory 54. If the received version information is identical to the prestored version information, the intermediary apparatus 101a determines that the updating of the firmware of the image-forming apparatus 100 has succeeded (or has ended normally), and enters UPDATING COMPLETED (UPDATED) in the field of UPDATE RESULT of the record corresponding to the image-forming apparatus 100a in the status table in the flash memory 54. Then, the intermediary apparatus 101a generates update information (including the type and serial number of the image-forming apparatus 100a) indicating the completion of the updating of the firmware of the image-forming apparatus 100a, and transmits the generated information to the managing apparatus 102.

If the received version information is not identical to the prestored version information, that is, if the version of the updated firmware is still the old (current) version, the intermediary apparatus 101a determines that the updating of the firmware of the image-forming apparatus 100a has failed (or has not ended normally), and enters WAITING FOR RE-UPDATING in the field of UPDATE RESULT of the record corresponding to the image-forming apparatus 100a in the status table in the flash memory 54. Then, the intermediary apparatus 101a generates update information (including the type and serial number of the image-forming apparatus 100a) indicating the completion of the updating of the firmware of the image-forming apparatus 100a, and transmits the generated information to the managing apparatus 102.

In step S1014, the proxy server 603 of the managing apparatus 102, receiving the update information from the intermediary apparatus 11a, generates response information (or information indicating the reception of the update information), and transmits the response information to the intermediary apparatus 101a.

In step S1015, the intermediary apparatus 101a, receiving the response information transmitted from the managing apparatus 102 in step S1014, transmits an erasure request command requesting the erasure of the ID and the password for FTP to the image-forming apparatus 100a so as to cause the image-forming apparatus 100a to erase the ID and the password.

In step S1016, the image-forming apparatus 100a, receiving the erasure request command from the intermediary apparatus 101a, erases the set (stored) ID and password for FTP. Then, the image-forming apparatus 100a generates response information (or information indicating the erasure of the ID and the password for FTP, and transmits the response information to the intermediary apparatus 101a.

Referring to FIG. 45B, the intermediary apparatus 101a, receiving the response information transmitted from the image-forming apparatus 100a in step S1016, performs the same operation as that for the image-forming apparatus 100a on the image-forming apparatus 10b. In step S1017, the intermediary apparatus 101a transmits the ID and the password for FTP to request the image-forming apparatus 100b to establish connection. However, if the intermediary apparatus 101a does not receive response information from the image-forming apparatus 100b within a predetermined period of time (that is, if the image-forming apparatus 100b does not respond), the intermediary apparatus 101a determined that the image-forming apparatus 100b is turned off, and repeats the transmission of the ID and the password for FTP to the image-forming apparatus 100b at predetermined intervals until the intermediary apparatus 101a receives response information from the image-forming apparatus 100b (steps S1018 and S1019).

Thereafter, when the image-forming apparatus 100b is turned on, in step S1020, the intermediary apparatus 101a receives from the image-forming apparatus 100b response information responding to the transmitted ID and password for FTP. Then, in step S1021, the intermediary apparatus 101a transmits the firmware in the firmware information in the flash memory 54 together with the ID and the password to the image-forming apparatus 101b.

Thereafter, in steps S1022 through S1028, the proxy server 603 of the managing apparatus 102, the intermediary apparatus 101a, and the image-forming apparatus 100b perform the same operations as those of steps S1010 through S1016.

After the updating of the firmware of the image-forming apparatus 101b is completed, the intermediary apparatus 101a transmits an erasure request command to the image-forming apparatus 100b in step S1027, and the image-forming apparatus 100b transmits response information to the intermediary apparatus 101a in step S1028. In step S1029, when the intermediary apparatus 101a receives the response information from the image-forming apparatus 100b, the intermediary apparatus 101b determines that the firmware of each of the image-forming apparatuses 100a and 100b has been updated, and erases the firmware information from the flash memory 54 (or the HDD 63). Then, the intermediary apparatus 101a transmits to the managing apparatus 102 update result information (including the type and serial number of each of the image-forming apparatuses 100a and 100b and an update completion date and time, which is a current date and time obtained by the RTC) indicating the update results in the records corresponding to the image-forming apparatuses 100a and 100b in the status table in the flash memory 54.

If the transmission of the ID and the password for FTP, that is, the transmission of the software, to the image-forming apparatus 100a or 100b requiring firmware updating has not been completed (the power-on report information has not been received by the intermediary apparatus 101a) before the update end date and time (a preset expiration date and time) in the record corresponding to the image-forming apparatus 100a or 100b in the status table in the flash memory 54, the intermediary apparatus 101a cancels the transmission, and enters ERROR in the field of UPDATE RESULT of the record corresponding to the image-forming apparatus 10a or 100b in the status table in the flash memory 54. Then, the intermediary apparatus 101a erases the firmware information from the flash memory 54. Thereafter, the intermediary apparatus 101a transmits to the managing apparatus 102 update result information (including the type and serial number of each of the image-forming apparatuses 100a and 100b) indicating the update results in the records corresponding to the image-forming apparatuses 100a and 100b in the status table in the flash memory 54 in step S1029. The period (or a start time and an end time thereof) for which the transmission of the ID and the password for FTP can be repeated may be set (stored) instead of the update end date and time.

In step S1030, the proxy server 603 of the managing apparatus 102, receiving the update result information from the intermediary apparatus 101a, temporarily stores the received update result information in the internal memory, generates response information (or information indicating the reception of the update result information), and transmits the response information to the intermediary apparatus 101a. Thereafter, the proxy server 603 transmits the update result information stored in the internal memory to the controller 606.

The controller 606, receiving the update result information from the proxy server 603, compares the received update result information with the firmware updating request information initially transmitted to the proxy server 603. Then, based on the comparison, the controller 606 generates information on the image-forming apparatus 100a or 100b whose firmware has been updated and the image-forming apparatus 100a or 100b whose firmware has not been updated, and transmits the generated information to the operator terminal 604 so that the information is displayed in a list on the display.

The center operator sees the display and operates the input part so that firmware updating is again performed on the image-forming apparatus 100a or 100b whose firmware has not been updated. Thereby, additional firmware updating may be performed on the image-forming apparatus 100a or 100b. If the firmware of the image-forming apparatus 100a or 100b cannot be updated by the additional firmware updating, a service engineer may be sent to a place in which the image-forming apparatus 100a or 100b whose firmware has not been updated is installed.

In the above-described case, the two image-forming apparatuses 100a and 100b shown in FIG. 3 require firmware updating. However, any of the other image-forming apparatuses 100 (100c through 100f) may also require firmware updating. In this case, for instance, the controller 606 of the managing apparatus 102 sets necessary information including the type and serial number, the update start date and time, and the update end date and time of any one of the other image-forming apparatuses 100 which one requires firmware updating, the necessary information being input using each input screen displayed on the display of the operator terminal 604. After updating the status table in the database 605 based on the input necessary information, if the ENTER button is selected on the firmware update screen, the controller 606 generates firmware updating request information as shown in FIG. 47A, and transmits the generated information to the proxy server (communication server) 603 via the network.

Alternatively, the updating of the firmware (programs) of a plurality of different types of image-forming apparatuses 100 may be performed simultaneously. In this case, for instance, the managing apparatus 102 needs to know the remaining capacity of the flash memory 54 (or the HDD 63) of the intermediary apparatus 101. Accordingly, as in the first embodiment, the managing apparatus 102 transmits a request for remaining memory information to the intermediary apparatus 101, and acquires the remaining memory information indicating the remaining capacity of the flash memory 54 (or the HDD 63) of the intermediary apparatus 101a. Then, the managing apparatus 102 determines whether the remaining capacity of the flash memory 54 of the intermediary apparatus 101 is sufficient for the size (amount of data) of the entire firmware (the firmware programs) necessary for updating the firmware (programs) of the different types of image-forming apparatuses 100. If it is determined that the remaining capacity of the flash memory 54 is sufficient, the managing apparatus 102 performs processing for transmitting (downloading) each firmware (program) to the intermediary apparatus 101.

Fifth Embodiment

Next, a description is given, with reference to FIG. 48, of a fifth embodiment of the basic operation of the firmware updating operation in the image-forming apparatus management system according to the present invention.

According to the fifth embodiment, as in the third embodiment, conditions necessary for firmware updating are specified in the CE terminal 105 of FIG. 7, and the firmware updating operation is performed in conjunction with the specified necessary conditions.

Figure 48A:
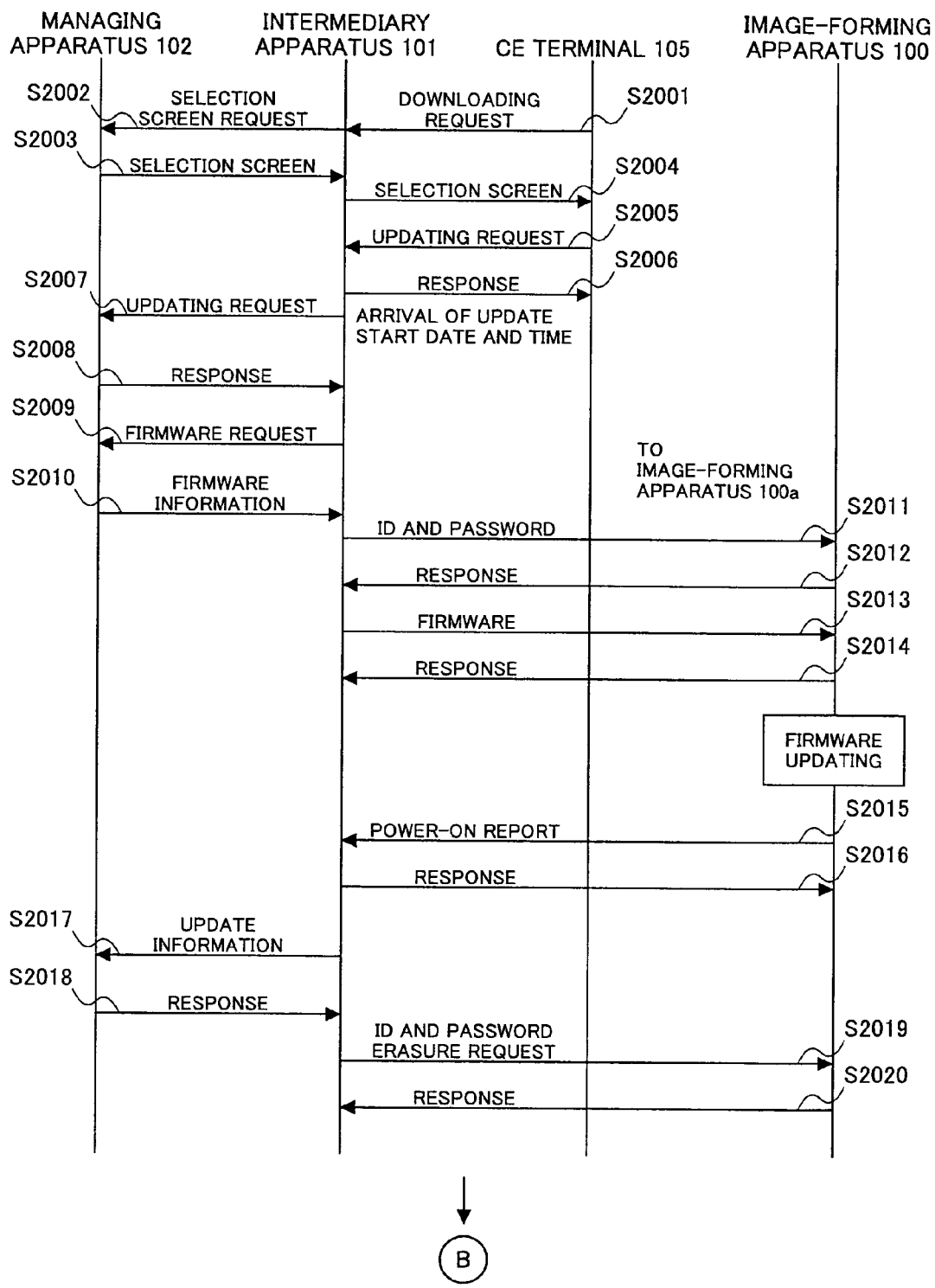
FIGS. 48A and 48B are diagrams showing a ninth communication sequence at the time of the firmware updating operation (fifth embodiment) in the image-forming apparatus management system according to the present invention.
Figure 48B:
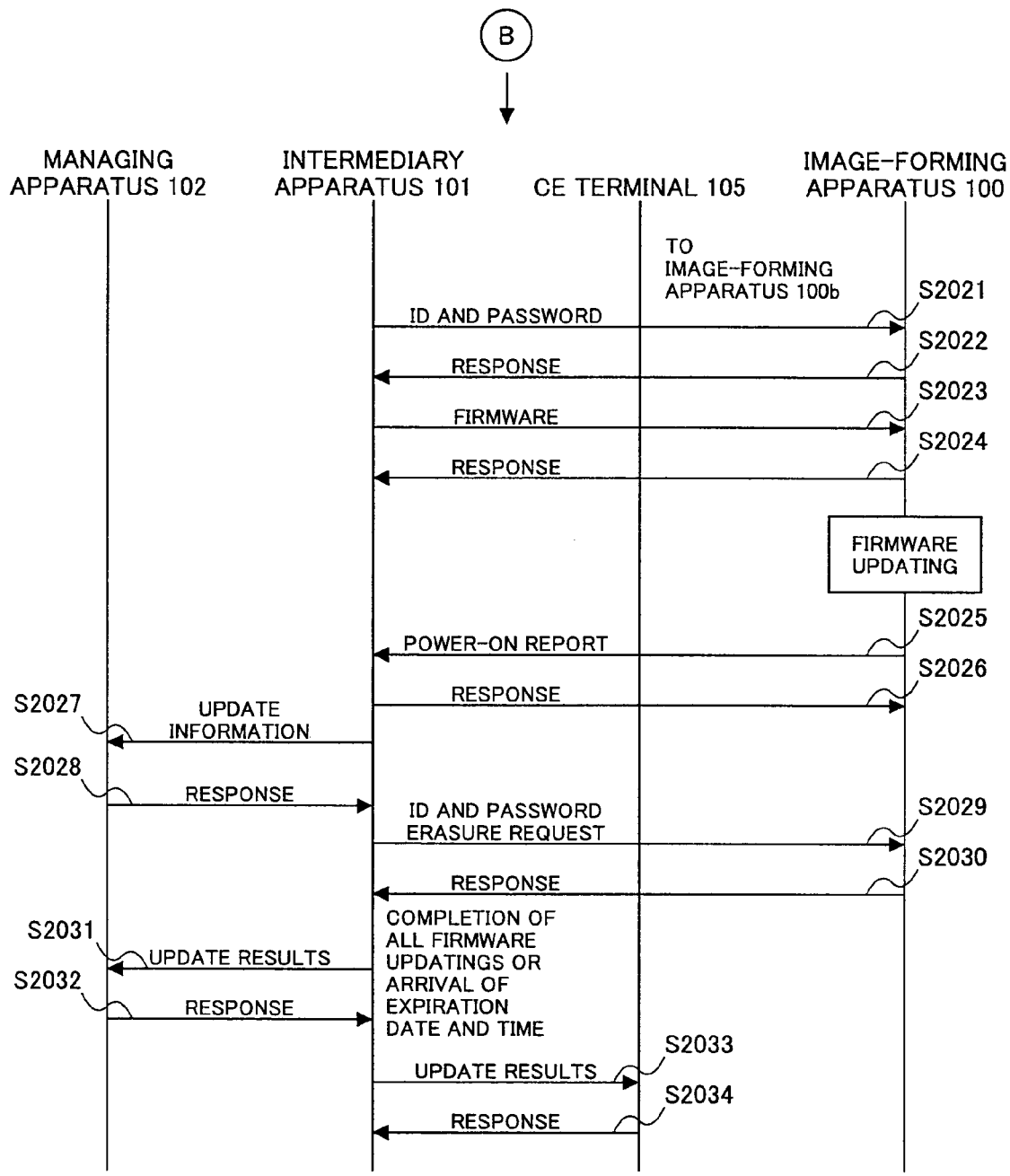

FIGS. 48A and 48B are diagrams showing a ninth communication sequence at the time of the firmware updating operation in the image-forming apparatus management system according to the present invention.

Referring to FIG. 48A, the CE terminal 105 is connected to the intermediary apparatus 101 via the network. When a request for downloading (a downloading request) is issued by operating the input part of the CE terminal 105, in step S2001, the CE terminal generates downloading request information indicating the downloading request, and transmits the generated information to the intermediary apparatus 101 via the network.

In step S2002, the intermediary apparatus 102, receiving the downloading request information from the CE terminal 105, generates selection screen request information requesting information (selection screen information) for displaying selection screens (input screens) as described in the fourth embodiment, and transmits the generated information to the managing apparatus 102.

The proxy server (communication server) 603 of the managing apparatus 102, receiving the selection screen request information from the intermediary apparatus 101, transmits the received information to the controller 606.

The controller 606, receiving the selection screen request information from the proxy server 603, reads out the selection screen information from the database 605, and transmits the read-out information to the proxy server 603.

Then, in step S2003, the proxy server 603, receiving the selection screen information from the controller 606, transmits the selection screen information to the intermediary apparatus 101.

In step S2004, the intermediary apparatus 101, receiving the selection screen information from the managing apparatus 102, writes the received information to the flash memory 54 (or the HDD 63), and transmits the received information to the CE terminal 105.

The CE terminal 105, receiving the selection screen information from the intermediary apparatus 101, writes the received information to an internal non-volatile memory or an HDD. As a result, the CE terminal can display substantially the same selection screens as those in the fourth embodiment on the display.

This function of the CE terminal 105 may be incorporated into the intermediary apparatus 101. In this case, for convenience of description, the object apparatuses (requiring firmware updating) are also the two image-forming apparatuses 100a and 100b shown in FIG. 3.

In step S2005, the CE terminal 105 sets necessary information (conditions necessary for firmware updating) including the type and serial number, the update start date and time, and the update end date and time of each of the object image-forming apparatuses 100a and 100b (whose firmware is to be updated), the necessary information being input using each input screen displayed on the display, and writes the necessary information to the non-volatile memory (or the HDD). When the ENTER button is selected on the firmware update screen, the controller 606 generates firmware updating request information (the type and serial number, the update start date and time, and the update end date and time of each of the object image-forming apparatuses 100a and 100b) as shown in FIG. 47A, and transmits the generated information to the intermediary apparatus 101a.

In step S2006, the intermediary apparatus 101a, receiving the firmware updating request information (schedule information) from the CE terminal 105, writes the received information to the records corresponding to the image-forming apparatuses 100a and 100b in the status table in the flash memory 54 (or the HDD 63). Then, the intermediary apparatus 101a generates response information (or information indicating the completion of the reception of the firmware update request information), and transmits the response information to the CE terminal 105. Thereafter, in step S2007, when the current date and time obtained by the RTC reaches the update start date and time of each of the records corresponding to the image-forming apparatuses 100a and 100b (FIG. 46), the intermediary apparatus 101a generates updating request information indicating a request for firmware updating, and transmits the generated information to the managing apparatus 102.

The following operations of steps S2008 through S2032 are substantially equal to those of steps S1004 through S1030 described with reference to FIGS. 45A and 45B, and a description thereof is basically omitted.

In step S2031, the intermediary apparatus 101a transmits to the managing apparatus 102 update result information (including the type and serial number of each of the image-forming apparatuses 100a and 100b) indicating the update results in the records corresponding to the image-forming apparatuses 100a and 100b in the status table in the flash memory 54. When the intermediary apparatus 101a receives response information transmitted from the managing apparatus 102 in step S2032 in response to the transmitted update result information, in step S2033, the intermediary apparatus 101a also transmits the update result information to the CE terminal 105.

In step S2034, the CE terminal 105, receiving the update result information from the intermediary apparatus 101a, the CE terminal 105 generates response information (or information indicating the reception of the update result information), and transmits the response information to the intermediary apparatus 101a. Further, the CE terminal compares the received update result information with the firmware updating request information initially transmitted to the intermediary apparatus 101a. Then, based on the comparison, the CE terminal 105 generates information on the image-forming apparatus 100a or 100b whose firmware has been updated and the image-forming apparatus 100a or 100b whose firmware has not been updated, and displays the generated information in a list on the display.

Accordingly, the apparatus user sees the display and operates the input part so that firmware updating is again performed on the image-forming apparatus 100a or 100b whose firmware has not been updated. Thereby, additional firmware updating may be performed on the image-forming apparatus 100a or 100b. Alternatively, the apparatus user may call up a service center to request a visit by a service engineer.

In the above-described case, the two image-forming apparatuses 100a and 100b shown in FIG. 3 require firmware updating. However, any of the other image-forming apparatuses 100 (100c through 100f) may also require firmware updating. In this case, for instance, the CE terminal 105 sets necessary information including the type and serial number, the update start date and time, and the update end date and time of any one of the other image-forming apparatuses 100 which one requires firmware updating, the necessary information being input using each input screen displayed on the display, and writes the necessary information to the non-volatile memory. Thereafter, if the ENTER button is selected on the firmware update screen, the CE terminal 105 generates firmware updating request information as shown in FIG. 47A, and transmits the generated information to the intermediary apparatus 101a.

Alternatively, the updating of the firmware (programs) of a plurality of different types of image-forming apparatuses 100 may be performed simultaneously. In this case, for instance, the managing apparatus 102 needs to know the remaining capacity of the flash memory 54 (or the HDD 63) of the intermediary apparatus 101. Accordingly, as in the first embodiment, the managing apparatus 102 transmits a request for remaining memory information to the intermediary apparatus 101, and acquires the remaining memory information indicating the remaining capacity of the flash memory 54 (or the HDD 63) of the intermediary apparatus 101a. Then, the managing apparatus 102 determines whether the remaining capacity of the flash memory 54 of the intermediary apparatus 101 is sufficient for the size (amount of data) of the entire firmware (the firmware programs) necessary for updating the firmware (programs) of the different types of image-forming apparatuses 100. If it is determined that the remaining capacity of the flash memory 54 is sufficient, the managing apparatus 102 performs processing for transmitting (downloading) each firmware (program) to the intermediary apparatus 101.

According to the above-described embodiments, the firmware of the image-forming apparatus 100 (an electronic apparatus) installed in the office of a client may be automatically updated.

If there are a large number of object image-forming apparatuses 100 that require firmware updating, the object image-forming apparatuses 100 may be individually subjected to firmware updating, using input screens of the operator terminal 604 of the managing apparatus 102 or the CE terminal 105 on the apparatus user side. On the other hand, the object image-forming apparatuses 100 may be simultaneously subjected to firmware updating by preparing and reading the object apparatus list file as shown in FIG. 22.

The intermediary apparatus 101 can collect information on any image-forming apparatus 100 installed in a dial-up connection environment or information on any image-forming apparatus 100 whose firmware cannot be automatically updated because the image-information apparatus 100 does not have software supporting the NRS, and transmit the collected information to the managing apparatus 102. Accordingly, the center operator (the operator of the managing apparatus 102) can be informed of any image-forming apparatus 100 whose firmware cannot be automatically updated.

In the case of updating the firmware of the image-forming apparatus 100, the managing apparatus 102 transmits large-capacity firmware information to the intermediary apparatus connected to the image-forming apparatus 100. Therefore, if the firmware information is transmitted on a line with a low transmission rate, the transmission takes time. Accordingly, if the transmission is performed while the image-forming apparatus 100 is being intensively used by an apparatus user, the transmission may disrupt the operation (for instance, a copying operation) currently performed by the user. According to the present invention, however, the transmission date and time for downloading firmware from the managing apparatus 102 to the intermediary apparatus 101 and the update date and time for transmitting the firmware from the intermediary apparatus 101 to the image-forming apparatus 100 to update its firmware may be specified as an update schedule in the managing apparatus 102, the CE terminal 105, or the image-forming apparatus 100. Accordingly, for instance, setting a night time as the update date and time can prevent the disruption of the operation by the apparatus user.

Further, the intermediary apparatus 101 collects information such as the version of the firmware of each image-forming apparatus 100 and current progress in firmware updating from each image-forming apparatus 100, and reports the collected information to the managing apparatus 102 as status information. Accordingly, the managing apparatus 102 can understand the firmware status and the progress in firmware updating of each image-forming apparatus 100 in real time.

As previously described, the managing apparatus 102 can specify the transmission date and time and the update date and time as schedule information. However, the image-forming apparatus 100 may be used for some operation during the updating of its firmware. Accordingly, in each of the above-described embodiments, in order to cope with such a situation, the managing apparatus 102 is adapted to receive a request to cancel or defer the updating of the firmware from the image-forming apparatus 100 even during the updating of the firmware.

In the above-described embodiments, the managing apparatus 102 or the CE terminal 105 generates the schedule information of the update date and time input using the corresponding input screen. However, the schedule information may be generated as follows.

The intermediary apparatus 101 measures the transmission rate 1 of the communication between the intermediary apparatus 101 and the managing apparatus 102 and the transmission rates 2 of the communications between the intermediary apparatus 101 and the image-forming apparatuses 100 or only the object image-forming apparatuses 100 requiring firmware updating. Then, the intermediary apparatus 101 transmits information indicating the measured transmission rates 1 and 2 to the managing apparatus 102 or the CE terminal 105.

The managing apparatus 102 or the CE terminal 105 generates the schedule information based on the amount of data of the firmware to be transmitted to the intermediary apparatus 101 and the transmission rates 1 and 2 received from the intermediary apparatus 101.

By thus automatically generating the schedule information, workload on the center operator can be reduced.

In the above description, the image-forming apparatus 100 is taken as an electronic apparatus according to the present invention. However, the present invention is not limitedly applicable to the image-forming apparatus 100. The present invention is also applicable to any types of electronic apparatuses, such as network appliances, automatic vending machines, medical equipment, power supply units, air conditioning systems, systems for measuring gas, water, and electricity, and network-connectable computers, with a communication function. Further, in the case of employing these apparatuses as the managed apparatuses, it is possible to operate the remote management system as described above. Furthermore, the configurations and the connections of the electronic apparatuses, the remote management intermediary apparatuses, and the managing apparatus in the electronic apparatus remote management system are not limited to the above-described embodiments.

Further, a program according to the present invention causes a computer controlling the intermediary apparatus 101 to realize a variety of functions according to the present invention as a software writing part, a software transmitting part, a schedule writing part, a transmission requesting part, a transmission rate measuring part, a transmission rate reporting part, a status checking part, an update date and time changing part, and an update necessity determining part. The above-described effects can be obtained by causing the computer to execute this program.

The program may be prestored in a storage part of the computer, such as a ROM or an HDD. Alternatively, it is also possible to provide the program by recording the program on a recording medium such as a CD-ROM or a non-volatile recording medium (memory) such as a flexible disk, an SRAM, an EEPROM, or a memory card. The above-described procedures may be performed by installing the program recorded on the memory into the computer and causing its CPU to execute the program or by causing the CPU to read out the program from the memory and execute the program.

It is also possible to execute the program by downloading the program from an external apparatus, connected to the network, including a recording medium on which the program is recorded or a storage part storing the program.

According to the present invention, it is possible to prevent a decrease in the rate of operation of an electronic apparatus due to the updating of its software. Further, it is also possible to reduce a processing load on and the communication costs of an external apparatus (the managing apparatus) resulting from the updating of the software of the electronic apparatus.

The present invention is not limited to the specifically disclosed embodiments, and variations and modifications may be made without departing from the scope of the present invention.

The present application is based on Japanese priority applications No. 2002-276482, filed on Sep. 24, 2002, and No. 2003-313730, filed on Sep. 5, 2003, the entire contents of which are hereby incorporated by reference.

What is claimed is:

1. A remote management system for performing remote management of a plurality of electronic apparatuses via a communication line and an intermediary apparatus by a remote managing apparatus, wherein:
   the remote managing apparatus comprises:
      a first storage part that stores first software configured to update second software stored by each of the electronic apparatuses; and
      a remote managing apparatus software transmitting part that transmits the first software retrieved from the fist storage part to the intermediary apparatus via the communication line;
      a schedule generating part that generates an update date and time for updating the second software; and
      a schedule transmitting part that transmits the generated update date and time to the intermediary apparatus;
   the intermediary apparatus comprises:
      a second storage part;
      a software writing part that writes the first software to the second storage part when acquiring the first software from the remote managing apparatus software transmitting part;
      an intermediary apparatus software transmitting part that transmits the first software stored in the second storage part to at least one of the electronic apparatuses when the at least one of the electronic apparatuses requires the second software stored therein to be updated;
      a transmission rate measuring part that measures a first transmission rate between the intermediary apparatus and the remote managing apparatus and a second transmission rate between the intermediary apparatus and the at least one of the electronic apparatus; and
      a transmission rate reporting part that reports the first and second transmission rates to the remote managing apparatus;
   the electronic apparatuses each comprises:
      a non-volatile storage part storing the second software controlling an operation of the electronic apparatus; and
      a software updating part that updates the second software stored in the non-volatile storage part based on the first software when receiving the first software from the intermediary apparatus software transmitting part, wherein
      the schedule generating part of the remote managing apparatus generates the update date and time based on an amount of data of the first software stored in the first storage part and the first and second transmission rates received from the intermediary apparatus.

2. The remote management system as claimed in claim 1, wherein, when two or more of the electronic apparatuses require the second software thereof to be updated, the software transmitting part of the intermediary apparatus transmits the first software stored in the second storage part to each of the two or more of the electronic apparatuses.

3. The remote management system as claimed in claim 2, wherein
   the first software stored in the first storage part of the remote managing apparatus comprises software programs of different types;
   the second software differs in type between two or more of the electronic apparatuses; and
   the intermediary apparatus software transmitting part transmits two or more of the software programs of the first software to the two or more of the electronic apparatuses in accordance with the types of the second software thereof.

4. The remote management system as claimed in claim 1, wherein:
   the remote managing apparatus software transmitting part transmits the first software stored in the first storage part to the intermediary apparatus at a request thereof; and
   the intermediary apparatus further comprises:
      a schedule writing part that writes the update date and time to the second storage part when receiving the update date and time from the remote managing apparatus; and a transmission requesting part that requests the remote managing apparatus to transmit the first software to the intermediary apparatus when the update date and time stored in the second storage part is reached.

5. The remote management system as claimed in claim 4, wherein:
the intermediary apparatus software transmitting part comprises a communication requesting part that makes a communication request to the at least one of the electronic apparatuses for communication with the intermediary apparatus before transmitting the first software stored in the second storage part to the at least one of the electronic apparatuses, and transmits the first software stored in the second storage part to the at least one of the electronic apparatuses when receiving a response to said communication request therefrom; and
each of the electronic apparatuses comprises a response part that responds to said communication request when receiving said communication request from the intermediary apparatus.

6. The remote management system as claimed in claim 4, wherein:
the intermediary apparatus software transmitting part comprises a communication requesting part that makes a communication request for the at least one of the electronic apparatuses to communicate with the intermediary apparatus before transmitting the first software stored in the second storage part to the at least one of the electronic apparatuses; and
each of the electronic apparatuses comprises:
a deferment period managing part that manages a performance deferment period from when said communication request from the intermediary apparatus is received to when it becomes possible to update the second software; and
a response part that responds to said communication request after passage of the performance deferment period.

7. The remote management system as claimed in claim 4, wherein:
the intermediary apparatus further comprises:
a status checking part that checks a status of the at least one of the electronic apparatuses; and
an update date and time changing part that changes the update date and time stored in the second storage part so that a start of the updating of the second software is deferred for a predetermined period of time when it is determined based on a result of the checking by the status checking part that the at least one of the electronic apparatuses is prevented from starting the updating of the second software immediately.

8. The remote management system as claimed in claim 4, wherein the intermediary apparatus further comprises an update date and time changing part that changes the update date and time stored in the second storage part so that a start of the updating of the second software is deferred for a predetermined period of time when receiving a request to defer the updating of the second software from outside the intermediary apparatus.

9. The remote management system as claimed in claim 1, wherein:
the remote managing apparatus software transmitting part transmits the first software stored in the first storage part and the generated update date and time to the intermediary apparatus when the generated transmission date and time is reached;
the software writing part of the intermediary apparatus writes the first software and the update date and time to the second storage part when receiving the first software and the update date and time from the remote managing apparatus transmitting part; and
the intermediary apparatus software transmitting part transmits the first software stored in the second storage part to the at least one of the electronic apparatuses when the update date and time stored in the storage part is reached.

10. The remote management system as claimed in claim 9, wherein:
the schedule generating part of the remote managing apparatus generates the transmission date and time and the update date and time based on an amount of data of the first software stored in the first storage part and the first and second transmission rates received from the intermediary apparatus.

11. The remote management system as claimed in claim 9, wherein:
the intermediary apparatus software transmitting part comprises a communication requesting part that makes a communication request to the at least one of the electronic apparatuses for communication with the intermediary apparatus before transmitting the first software stored in the second storage part to the at least one of the electronic apparatuses, and transmits the first software stored in the second storage part to the at least one of the electronic apparatuses when receiving a response to said communication request therefrom; and
each of the electronic apparatuses comprises a response part that responds to said communication request when receiving said communication request from the intermediary apparatus.

12. The remote management system as claimed in claim 9, wherein:
the intermediary apparatus software transmitting part comprises a communication requesting part that makes a communication request for the at least one of the electronic apparatuses to communicate with the intermediary apparatus before transmitting the first software stored in the second storage part to the at least one of the electronic apparatuses; and
each of the electronic apparatuses comprises:
a deferment period managing part that manages a performance deferment period from when said communication request from the intermediary apparatus is received to when it becomes possible to update the second software; and
a response part that responds to said communication request after passage of the performance deferment period.

13. The remote management system as claimed in claim 9, wherein:
the intermediary apparatus further comprises:
a status checking part that checks a status of the at least one of the electronic apparatuses; and
an update date and time changing part that changes the update date and time stored in the second storage part so that a start of the updating of the second software is deferred for a predetermined period of time when it is determined based on a result of the checking by the status checking part that the at least one of the electronic apparatuses is prevented from starting the updating of the second software immediately.

14. The remote management system as claimed in claim 9, wherein the intermediary apparatus further comprises an update date and time changing part that changes the update date and time stored in the second storage part so that a start of the updating of the second software is deferred for a predetermined period of time when receiving a request to defer the updating of the second software from outside the intermediary apparatus.

15. The remote management system as claimed in claim 1, wherein:
- the intermediary apparatus comprises a status checking part that checks a status of the at least one of the electronic apparatuses; and
- the intermediary apparatus software transmitting part comprises an updating necessity determining part that determines whether the updating of the second software of the at least one of the electronic apparatuses has normally ended based on a result of the checking by the status checking part, and repeats the transmission of the first software stored in the second storage to the at least one of the electronic apparatuses until the updating necessity determining part determines that the updating of the second software of the at least one of the electronic apparatuses has normally ended.

16. The remote management system as claimed in claim 15, wherein:
- the updating necessity determining part of the intermediary apparatus determines that the updating of the second software of the at least one of the electronic apparatuses has normally ended when receiving a power-on report indicating that power is turned on from the at least one of the electronic apparatuses; and
- each of the electronic apparatuses comprises:
    - a restart commanding part that causes the electronic apparatus to restart after the updating of the second software by the software updating part is completed; and
    - a power-on reporting part that reports to the intermediary apparatus that the power is turned on after the restarting of the electronic apparatus.

17. The remote management system as claimed in claim 15, wherein the software transmitting part of the intermediary apparatus comprises a part that stops the transmission of the first software to the at least one of the electronic apparatuses when the transmission is prevented from being completed by a preset expiration date and time.

18. The remote management system as claimed in claim 1, wherein the software updating part of each of the electronic apparatuses comprises a part that cancels the updating of the second software when receiving a request to cancel the updating of the software from outside the electronic apparatus.

\* \* \* \* \*